US012051313B2

(12) United States Patent
Mahmoud et al.

(10) Patent No.: US 12,051,313 B2
(45) Date of Patent: Jul. 30, 2024

(54) SYSTEM, SERVER AND METHOD FOR MONITORING UTILITY SYSTEMS

(71) Applicant: PACIFIC GAS AND ELECTRIC COMPANY, San Francisco, CA (US)

(72) Inventors: Omar Mahmoud, San Francisco, CA (US); Gavin Fong, San Francisco, CA (US); Dave Chua, San Francisco, CA (US); Richard Fields, Oakland, CA (US)

(73) Assignee: PACIFIC GAS AND ELECTRIC COMPANY, Oakland, CA (US)

(*) Notice: Subject to any disclaimer, the term of this patent is extended or adjusted under 35 U.S.C. 154(b) by 0 days.

(21) Appl. No.: 17/856,684

(22) Filed: Jul. 1, 2022

(65) Prior Publication Data

US 2022/0406158 A1  Dec. 22, 2022

Related U.S. Application Data

(63) Continuation-in-part of application No. 17/137,848, filed on Dec. 30, 2020.
(60) Provisional application No. 62/955,109, filed on Dec. 30, 2019.

(51) Int. Cl.
G08B 21/02 (2006.01)
G08B 21/18 (2006.01)

(52) U.S. Cl.
CPC .......... *G08B 21/02* (2013.01); *G08B 21/185* (2013.01)

(58) Field of Classification Search
CPC .............................. G08B 21/02; G08B 21/185
USPC ........................................................... 340/635
See application file for complete search history.

(56) References Cited

U.S. PATENT DOCUMENTS

| | | | | |
|---|---|---|---|---|
| 2010/0033345 A1* | 2/2010 | Polk | ......................... | H04Q 9/00 340/870.01 |
| 2012/0046799 A1* | 2/2012 | Alex | ...................... | G01R 15/142 700/298 |
| 2014/0278150 A1* | 9/2014 | Baesler | ................... | E04H 12/00 702/34 |
| 2016/0148499 A1* | 5/2016 | Hicks, III | ........... | H04L 12/6418 340/506 |
| 2019/0302143 A1* | 10/2019 | Katzir | ........................ | F16B 1/00 |
| 2020/0098513 A1* | 3/2020 | Zhang | ...................... | H01F 27/02 |

* cited by examiner

Primary Examiner — Kerri L McNally
(74) Attorney, Agent, or Firm — Greenberg Traurig, LLP

(57) ABSTRACT

The disclosure describes a system for monitoring and mitigating damage to electrical utility structures and the surrounding environment. In some embodiments, the system includes fire boxes, arc sensors, angle switches, and disconnect switches configured to generate alert signals when a hazard is detected. In some embodiments, the system includes cameras configured to detect a hazard such as a fire or moving object. In some embodiments, the system includes light transmitters and light receivers positioned at a predetermined location away from power lines to detect objects that interrupt a line of site. In some embodiments, the system can electrically isolate a power line before a detected hazard impacts a power line.

17 Claims, 47 Drawing Sheets

| Equipment | | Capabilities | Benefits |
|---|---|---|---|
| Camera | | • Creates a long-range live video feed<br>• Recording<br>• Remote access | • Real-time situational awareness<br>• Immediate visual on powerlines without deploying field crews<br>• Remote vegetation management |
| Sensor (*Lidar*) | | • Creates a long-range laser field<br>• Calculates the time for beams of light to hit an object or surface and reflects back to the sensor | • Isolates the pin-point location of a powerline obstruction (tree branch, avian)<br>• Captures sagging or downed line |
| Sensor (*Tilt*) | | • Picks up precise degree changes when mounted to a surface | • Instant reading on a leaning or downed pole |
| Fire detector | | • Detects small variances in light | • Picks up spark or minor light disturbance (early fire detection) |
| Control box | | • Holds the controllers and batteries for the DTS-FAST equipment | • Self contained easy-to-access unit that houses all the data controllers |

FIG. 2

| Wildfire risks | Technology Applied |
|---|---|
| Vegetation grow-in, fall-in, blow-in conditions | System is configured to use Lidar to detect vegetation impeding pre-defined space |
| Conductor falling (tree trunk falls on conductor) | System is configured to use Lidar to detect when conductors are missing from pre-defined space |
| Pole leaning or falling, Cross arm falling | System is configured to use one or more tilt sensors to alert if pole moved from the original position |
| Local fires | System is configured to use one or more flame or fire detectors to detect any fires near pole. |
| Situational awareness | System is configured to use one or more cameras with photo/video/audio to provide real time situational awareness |
| Environmental awareness | System is configured to use one or more weather sensors to provide temperature, humidity, wind, etc., for pinpoint environmental conditions. |

FIG. 3

Tech: PTZ Camera
Mfr: Hanwha

Model: XNP-6550RH 55 x 2MP IR
Part No. XNP-6550RH

| | |
|---|---|
| Resolution | 2 megapixel (1920 x 1080) |
| Zoom | Optical 55x |
| | Digital 32x |
| IR Range | 500 m (1,640 ft) |
| Pan Range | 360° |
| Pan Speed | Preset: 400°/sec |
| | Manual: 0.024°/sec to 250°/sec |
| Tilt Range | 95° |
| Tilt Speed | Preset: 250°/sec |
| | Manual: 0.024°/sec to 250°/sec |
| Minimum Object Distance | 5 m (16.4 ft) |

Tech: 2D LIDAR Sensor  
Model: LMS 511 PRO OUTDOOR

Mfr: SICK AG  
Part No. LMS511-10100 PRO

| | |
|---|---|
| Light Source/Class | Infrared 905 nm/1 (IEC/EN 60825-1:2014) |
| Aperture Angle | Horizontal 190° |
| Scanning Frequency | 25 Hz |
| Angular Resolution | 0.1667° with 0.042° Interlaced |
| Working Range | 1m to 80 m |
| Scanning Range | 40 m at 10% Remission |
| Response Time | 10 ms |
| Evaluation Strategy | Blanking, Pixel |
| Delay Time | 0 ms, 8000 ms |

Tech: Multi-Spectrum Fire and Flame Detector UV/Dual IR/VIS
Model: FS20X

Mfr: Honeywell
Part No. FS20X-211-21-2

| | |
|---|---|
| Spectral Sensitivity | UV: 185 to 260nm<br>Near IR: 0.7 to 1.1 microns<br>Wide IR: 1.1 to 3.5 microns<br>Visible: 400 to 700 nm |
| Field of View | 90° Horizontal, 80° Vertical |
| Working Range | 200 ft (60 m) for 1 sq. ft. Heptane Fire |
| Response Time | 3-5 s to 1 sq. ft. n-Heptane Fire at 100 ft |
| Verify Timer | 5 s |

Tech: Dual-Axis Inclinometer Sensor　　　　　Mfr: Level Developments

Model: DAS Inclinometer　　　　　　　　　　Part No. DAS-90-A

| | |
|---|---|
| Measuring Range | ±90deg |
| Sensitivity | 35 mV/deg |
| Temperature Error: | ±0.0015 deg/°C |
| Zero Drift | ±0.0030 %/°C |
| Sensitivity Drift | ±0.34 deg |
| Accuracy (-10 to 60°C) | |
| Resolution | ±0.003 deg |
| Analog Output Range | 0.4 to 4.5 V |

DTS-FAST Display    Asset: 006/045

ALARMS

| Name | Value | Time | Name | DTS-FAST Tower Information |
|---|---|---|---|---|
| 006/045|CIRCUIT A_SUB 2_CB_POSITI | CLOSE | 11/29/2021 12:53:05 PM | 006/045|CIRCUIT A_NAME | OLEUM-MARTINEZ - 115 KV |
| 006/045|CIRCUIT B_SUB 2_CB_POSITI | CLOSE | 11/29/2021 12:52:52 PM | 006/045|CIRCUIT B_NAME | MARTINEZ-SOBRANTE 115 KV |
| 006/045|SEL 751 rly comm wdog | Normal | 10/31/2021 5:46:35 AM | 006/045|DESCRIPTION | 006/045 LATTICE STEEL TOWER |
| 006/045|bottom laser trip side A | ALARM | 10/21/2021 10:07:47 AM | 006/045|ELEVATION_MSL | 555.407 |
| 006/045|bottom laser trip side B | ALARM | 10/21/2021 5:46:57 AM | 006/045|ETGIS_ID | TWRS00034821 |
| 006/045|top laser trip side A | ALARM | 10/20/2021 6:25:14 PM | 006/045|FIREINDEXAREA | 530 |
| 006/045|top laser trip side B | ALARM | 9/28/2021 5:31:38 PM | 006/045|FRAME_TYPE | SUSP |
| 006/045|right laser trip side A | ALARM | 9/28/2021 11:48:47 PM | 006/045|FRAME_TYPE_DETAILS | SUSPENSION (TWR) |
| 006/045|right laser trip side B | ALARM | 9/28/2021 9:09:22 PM | 006/045|GLOBALID | {2A778159-6C71-4999-99FE-2AC61F8E9B7C} |
| 006/045|left laser trip side A | ALARM | 9/28/2021 10:23:54 AM | 006/045|HEIGHT_MSL | 666.10700000000001 |
| 006/045|left laser trip side B | ALARM | 9/28/2021 10:19:00 AM | 006/045|HFTD | 2 |
| 006/045|fire detector health | ALARM | 9/28/2021 10:15:19 PM | 006/045|HOST_TLINE_ETGSID | ETL10001049 |
| 006/045|SEL 751 rly enabled | Pt Created | 2/17/2021 2:09:57 PM | 006/045|LATITUD | 37.997 |
| 006/045|battery low | Pt Created | 2/17/2021 2:09:57 PM | 006/045|LONGITUDE | -122.14 |
| 006/045|backup battery power on | Pt Created | 2/17/2021 2:09:57 PM | 006/045|SAP_EQUIP_ID | 40681511 |
| 006/045|arc flash loop 7 trip | Pt Created | 2/17/2021 2:09:57 PM | 006/045|SAP_FUNC_LOC_NO | ETL3170 |
| 006/045|arc flash loop 6 trip | Pt Created | 2/17/2021 2:09:57 PM | 006/045|SAP_STRUCTURE_NO | 006/045 |
| 006/045|arc flash loop 5 trip | Pt Created | 2/17/2021 2:09:57 PM | 006/045|STRUCTURE_ID | 15272 |
| 006/045|arc flash loop 4 trip | Pt Created | 2/17/2021 2:09:57 PM | 006/045|STRUCTURE_NM | 034 |

LINKS
ArcGIS Live Map Link
DTS-FAST Schematic Link

006/044   006/045 State Riding Hiking Trail   007/046

FIG. 36

SYSTEM, SERVER AND METHOD FOR MONITORING UTILITY SYSTEMS

CROSS REFERENCE TO RELATED APPLICATIONS

This application is a Continuation-in-Part Application of U.S. patent application Ser. No. 17/137,848, filed on Dec. 30, 2020, which claims priority from Provisional Application No. 62/955,109, filed Dec. 20, 2019, the entire contents of which are incorporated herein by reference.

BACKGROUND

Electricity is often distributed or transmitted through a network of power lines that are supported by several towers. Fires, strong winds, and other environmental factors may damage or otherwise negatively affect one or more towers or power lines leading to damaged or weakened energized power lines that may damage the nearby environment. References to towers and utility structures can comprise, towers, poles, and any other suitable support structure(s). As a safety precaution, a utility company may proactively de-energize power lines, e.g., by instituting a public safety power shutoff (PSPS) to reduce the risk from environmental factors damaging or weakening towers or power lines. PSPS may lead to power outages that last for several days but are currently necessary for public safety. Current approaches to addressing the effects of environmental factors on a power line network can place significant burdens on customers or users in the interest of enhancing public safety.

SUMMARY

In some embodiments, a utility structure monitoring system includes one or more sensors, one or more utility power lines, and/or one or more utility structures. In some embodiments, the one or more sensors are configured to detect a hazard at a predetermined distance from the one or more utility power lines and generate a hazard signal. In some embodiments, the utility structure monitoring system is configured to generate a hazard alert upon receiving the hazard signal generated by the one or more sensors.

In some embodiments, the one or more sensors includes one or more light emitting elements configured to transmit a light signal, and one or more light receiving elements each configured to receive the light signal from a respective one of the one or more light emitting elements. In some embodiments, each of the one or more light receiving elements receives the light signal from respective one of the one or more light emitting element along a line of site.

In some embodiments, the one or more sensors includes a laser sensor. In some embodiments, the laser sensor includes one or more of a through-beam sensor, retro-reflective sensor, and a diffuse reflection sensor. In some embodiments, the one or more sensors includes a photoelectric sensor.

In some embodiments, the one or more sensors includes one or more cameras. In some embodiments, the utility structure monitoring system is configured to generate a hazard alert upon detecting one or more moving objects within a field of view at least one of the one or more cameras. In some embodiments, the one or more cameras include one or more thermal cameras. In some embodiments, the utility structure monitoring system is configured to generate an alert upon detecting a temperature above a predetermined limit using the one or more thermal cameras.

In some embodiments, the one or more sensors includes one or more thermocouples. In some embodiments, the utility structure monitoring system is configured to generate an alert upon detecting a temperature above a predetermined limit using the one or more thermocouples.

In some embodiments, the one or more sensors includes one or more angle switches (or other angle sensors). In some embodiments, the one or more angle switches are configured to generate the hazard signal in response to the one or more utility structures shifting beyond a predetermined angle.

In some embodiments, the utility structure monitoring system includes one or more sensors, one or more utility power lines configured to conduct more than 1000 volts of electricity, and one or more utility structures configured to suspend the one or more utility power lines at a predetermined vertical distance from a ground base of the one or more utility structures. In some embodiments, the one or more sensors are configured to detect a hazard to the one or more utility power lines and generate a hazard signal. In some embodiments, the utility structure monitoring system is configured to generate a hazard alert action upon receiving the hazard signal generated by the one or more sensors. In some embodiments, the hazard includes one or more of a utility structure position shift, a line of site break, an electrical arc, and a fire In some embodiments, the system further includes a fire box. In some embodiments, the one or more sensors includes an arc sensor configured to generate the hazard signal in response to an arc emanating from the one or more utility power lines. In some embodiments, the fire box is configured to prevent a fire by containing the arc emanating from the one or more utility power lines.

In some embodiments, the one or more sensors includes one or more light emitting elements and one or more light receiving elements. In some embodiments, the one or more light receiving elements are each configured to receive a light signal from a respective one of the one or more light emitting elements along a line of sight. In some embodiments, the utility structure monitoring system is configured to generate the hazard alert action in response to an object passing between the one or more light receiving elements and respective one of the one or more light emitting elements thereby breaking the respective line of site. In some embodiments, the one or more light emitting elements and one or more light receiving elements are each positioned such that the line of site extends at a predetermined distance away from the one or more utility power lines.

In some embodiments, in addition to the one or more light emitting elements and one or more light receiving elements, the one or more sensors include one or more cameras. In some embodiments, the utility structure monitoring system is configured to generate the hazard alert action upon detecting the object within a field of view at least one of the one or more cameras and/or upon detecting a fire within a field of view at least one of the one or more cameras.

In some embodiments, the one or more sensors includes one or more angle switches configured to generate the hazard signal in response to the one or more utility structures shifting beyond a predetermined angle. In some embodiments, the one or more sensors includes one or more disconnect switches. In some embodiments, the one or more disconnect switches are configured to generate a hazard signal upon at least a portion the utility structure including an insulator, an insulator hook, and/or the one or more power lines, move from a fixed position. In some embodiments, moving from a fixed position causes at least a portion of the one or more disconnect switches to electrically decouple from a sensor connection. In some embodiments, the angle switch includes the disconnect switch. In some embodiments, the angle switch is configured to electrically decouple in response to at least a portion of the one or more utility structures and/or one or more power lines shifting from a fixed position.

In some embodiments, a tower comprises one or more cameras. In some embodiments, the one or more cameras are configured to be remotely controlled by a client device. For example, a user can pivot or otherwise control the directional orientation of the camera remotely over a communication network according to some embodiments. In some embodiments, the camera can begin to automatically record or capture image data in response to a predetermined condition. In some embodiments, the predetermined condition can be the identification of a proximate or distal object.

In some embodiments, a plurality of power line towers are configured to include sensors that are configured to detect whether an object breaks a line of sight. For example, the sensors can comprise one or more lasers used to establish an optical path, which, when broken, triggers a message to be transmitted over a communication network.

In some embodiments, lasers are configured and arranged to create a shield of coverage to detect intruding objects that penetrate the shield of coverage. In some embodiments, lasers that project a planar light beam and corresponding laser sensors or detectors can be used. In some embodiments, the shield of coverage is positioned around a tower and/or around a power line. In some embodiments, a support structure is used to position the plurality of lasers within a predetermined distance around the tower. In some embodiments, lasers are configured to monitor a range that extends tower-to-tower. In some embodiments, the system is configured such that where a breaking of a light beam triggers notification and/or detection of an intrusive object or natural occurrence. In some embodiments, remedial action is initiated by the system based on the sensor data. In some embodiments, the system is configured to determine a location of a defect so that remedial action can be taken quickly and efficiently.

In some embodiments, the system includes a cloud-based monitoring application configured to monitor sensor data originating from a plurality of towers. In some embodiments, the monitoring application is configured to provide real-time monitoring of a power line network. In some embodiments, the monitoring application is configured to provide the location of a potential contact with a tower. In some embodiments, the monitoring application identifies a power line condition such as, for example, a sagging power line, a downed power line, a failed jumper cable, etc. In some embodiments, the monitoring application is configured to detect an object or environmental condition such as, for example, smoke or fire near a tower or power line or other utility structure.

In some embodiments, the monitoring application is configured to analyze sensor data to determine whether an object is obstructing a tower or whether a tower is damaged. Objects may be, as non-limiting examples, mylar balloons or large birds according to some embodiments. Such objects may break the laser light beam, signaling that an object is proximate to the tower or other utility structure. In response to a broken laser beam, a message is sent from a sensor to the monitoring application according to some embodiments. In some embodiments, the monitoring application is configured to de-energize a power line supported by the tower before the object contacts the tower or power line. In some embodiments, visual data provided by a camera mounted on the tower is captured and automatically displayed by the system so that a user may assess whether an object proximate to the tower or power line poses a significant threat. In some embodiments, the de-energizing action is taken quickly enough to prevent ignition of any materials. In some embodiments, the time needed to de-energize the power line is less than five seconds from when the sensor data is first communicated, and less than one second in some other embodiments.

In some embodiments, the monitoring application is configured to analyze sensor data to determine whether an object is obstructing a tower or whether a tower is damaged. For example, in some embodiments, the monitoring application is configured to analyze a signature or pattern associated with the sensor data to determine the nature of the obstruction. For example, the monitoring application is configured to detect the duration of the breakage of the laser beam or the frequency of the breakage of the laser beam (and/or array of laser beams) to determine whether the object is moving or relatively stationary according to some embodiments. In some embodiments, the monitoring application analyzes visual data to determine whether device maintenance or power line de-energization is needed.

Some embodiments are directed to supporting Public Safety Power Shutoffs (PSPS) events. During a PSPS event, circuits identified as having elevated risk may be proactively de-energized in the interest of public safety according to some embodiments. In some embodiments, when relevant environmental conditions subside, the sensor systems attached or otherwise coupled to towers are configured to determine whether particular towers have clear spans and present a low risk of potential damage. For example, in some embodiments, the system is configured to use sensors such as lasers or cameras to confirm that no objects are proximate to the tower or power line, thereby eliminating or lessening the need to send inspectors and aircraft, which saves cost. Accordingly, a power line associated with a tower having a clear span may be quickly re-energized according to some embodiments. In some embodiments, this may lead to expedited inspections and reenergizing during or after PSPS events. In some embodiments, outside of PSPS events, at least a portion of the laser detection and coverage system is configured to be activated to remotely monitor power lines. Thus, the monitoring application is configured to identify real-time line damage, assist in prioritizing enhanced vegetation management work, and support preventive maintenance and routine inspection of assets according to some embodiments.

In some embodiments, the monitoring application is configured to receive a message comprising a binary detection signal from a sensor mounted on the tower. In some embodiments, the binary detection signal may be generated in response to a broken laser beam. In some embodiments, each message is time stamped and recorded in a data store for audit and traceability.

In some embodiments, one or more cameras are mounted on a tower and used to assist in re-energization decision making. In some embodiments, camera output and/or reception is enabled in response to detecting a break in the laser beam. In some embodiments, the system is configured to deliver camera footage to users via fiber optics or any conventional communication technology. For example, a user may access camera footage using a client device connected over the communication network according to some embodiments. Accordingly, in some embodiments, users are able to review a camera in real-time to dispatch appropriate crews for remediation and/or provide authorization for re-energizing the power line.

In some embodiments, the arrangement of sensors and/or cameras on towers coupled to a communication network provide a variety of benefits. These benefits may be, for example, intelligent shutdown in response to detecting proximate object, real-time traceability, prioritized remediation work, real-time visual data, power line sag detection, downed pole or power line detection, object detection, long range detection, detection speed, fire/smoke detection, jumper or hook failure detection, aviation detection, determination of the location of a potential object near a power line tower, status monitoring, and sensors that operate continuously in daytime and nighttime according to some embodiments.

In some embodiments, the monitoring application is configured to automatically perform remediation in response to a laser beam breakage event. For example, in some embodiments, the monitoring application is configured to de-energize one or more power lines supported by towers associated with the laser beam breakage. In addition, in some embodiments, the monitoring application is configured to generate one or more instructions to rebalance the power grid so that energy customers experience no or limited impact due to the de-energized line.

Various embodiments provide advantages over prior art systems. For example, some embodiments enable the detection and remediation of objects contacting energized lines. Some embodiments provide rapid de-energization of power lines prior to fire ignition and fast network-energy re-balancing. Some embodiments allow for visibility of detection with pinpoint location of potential proximate objects. Some embodiments permit improved vegetation management near power lines. Some embodiments improve the customer experience from planned power shut offs. Some embodiments enable reduced outage restoration times and risk to life or property. Finally, some embodiments provide real-time monitoring with pinpoint-location detection of fire risks.

In some embodiments, the system comprises: one or more sensors, one or more utility structures, and one or more conductors. In some embodiments, the one or more conductors are configured to transmit electrical energy greater than 1000 volts. In some embodiments, the one or more utility structures are coupled to at least a portion of the one or more conductors. In some embodiments, the one or more sensors are coupled to the one or more utility structures. In some embodiments, the one or more sensors are configured to monitor a proximate area to the one or more utility structures. In some embodiments, the one or more sensors are configured to generate one or more hazard signals when a hazard is detected in the proximate area.

In some embodiments, the system further comprises one or more communication networks. In some embodiments, the one or more utility structures include a plurality of utility structures. In some embodiments, the one or more utility structures include a first utility structure and a second utility structure. In some embodiments, the one or more hazard signals include a first structure hazard signal and a second structure hazard signal. In some embodiments, the first utility structure is configured to generate the first structure hazard signal. In some embodiments, the second utility structure is configured to generate the second structure hazard signal. In some embodiments, the system is configured to send the second structure hazard signal from the second utility structure to the first utility structure via the one or more communication networks.

In some embodiments, the system can include any number of utility structures each configured as described herein. In some embodiments, the one or more utility structures comprise a third utility structure. In some embodiments, the third utility structure is configured to generate a third structure hazard signal. In some embodiments, the system is configured to send the second structure hazard signal and the third structure hazard signal to the first utility structure via the one or more communication networks.

In some embodiments, the one or more communication networks include a first communication network and a second communication network. In some embodiments, the first utility structure comprises the first communication network. In some embodiments, the second utility structure comprises the second communication network. In some embodiments, the system is configured to send the second structure hazard signal from the second communication network to the first communication network.

In some embodiments, the one or more utility structures comprise a third utility structure. In some embodiments, the one or more communication networks include a third communication network. In some embodiments, the third utility structure comprises the third communication network. In some embodiments, the third utility structure is configured to generate a third structure hazard signal. In some embodiments, the system is configured to send the third structure hazard signal to the first communication network.

In some embodiments, the system comprises a supervisory control and data acquisition system (SCADA). In some embodiments, the system includes a SCADA communication network. In some embodiments, the first communication network is configured to transmit the second structure hazard signal to the SCADA communication network. In some embodiments, the SCADA communication network is configured to send a second structure response signal to deenergize the one or more conductors to the first communication network. In some embodiments, the first communication network is configured to receive the second structure response signal from the SCADA communication network. In some embodiments, the first communication network is configured to transmit the received second structure response signal to the second communication network.

In some embodiments, the second communication network is configured to receive the second structure response signal from the first communication network. In some embodiments, the second utility structure is configured to deenergize the one or more conductors in response to the second structure response signal. In some embodiments, the third communication network is configured to send the third structure hazard signal to the second communication network. In some embodiments, the third communication network is not configured to send the third structure hazard signal to the first communication network. In some embodiments, the second communication network is configured to relay the third structure hazard signal to the first communication network.

In some embodiments, the first communication network is configured to transmit the third structure hazard signal to the SCADA communication network. In some embodiments, the SCADA communication network is configured to send a third structure response signal to deenergize the one or more conductors to the first communication network. In some embodiments, the first communication network is configured to relay the third structure response signal to the second communication network. In some embodiments, the second communication network is configured to relay the third structure response signal to the third communication network. In some embodiments, the third utility structure is configured to deenergize the one or more conductors in response to the third structure response signal.

In some embodiments, the system further comprises one or more controllers. In some embodiments, the one or more controllers are configured to automatically deenergize the one or more utility structures in response to the one or more hazard signals. In some embodiments, the one or more controllers are coupled to the one or more utility structures. In some embodiments, the one or more utility structures are a plurality of utility structures. In some embodiments, each of the plurality of utility structures include a controller. In some embodiments, each controller is configured to automatically deenergize a respective one of the plurality of utility structures in response to the one or more hazard signals.

In some embodiments, the one or more sensors include one or more LiDAR sensors configured to detect an object passing through a spacial plane. In some embodiments, the one or more sensors include one or more cameras configured to transmit photographic images. In some embodiments, the one or more sensors include one or more fire detectors configured to identify if an area is above a predetermined temperature. In some embodiments, the system includes one or more tilt sensors configured determine if the one or more utility structures have moved beyond a predetermined angle and/or have been exposed beyond a predetermined force.

In some embodiments, the one or more utility structures includes a first utility structure. In some embodiments, the first utility structure includes a first communication network. In some embodiments, the first communication network comprises a cellular network and a radio network. In some embodiments, the cellular network is configured to send and/or receive signals at a higher electromagnetic frequency than the radio network. In some embodiments, the cellular network is configured to send images from the one or more cameras. In some embodiments, the radio network is not configured to send images from the one or more cameras. In some embodiments, the first communication network is configured to be accessed remotely via the cellular network even upon loss of the radio network.

DESCRIPTION OF THE DRAWINGS

FIG. 2 shows a non-limiting sensor overview according to some embodiments.

FIG. 3 shows a non-limiting table summarizing wildfire risk and associated mitigation technology according to some embodiments.

FIG. 36 shows a sample PI Vision display according to some embodiments.

DETAILED DESCRIPTION

Figure 1:
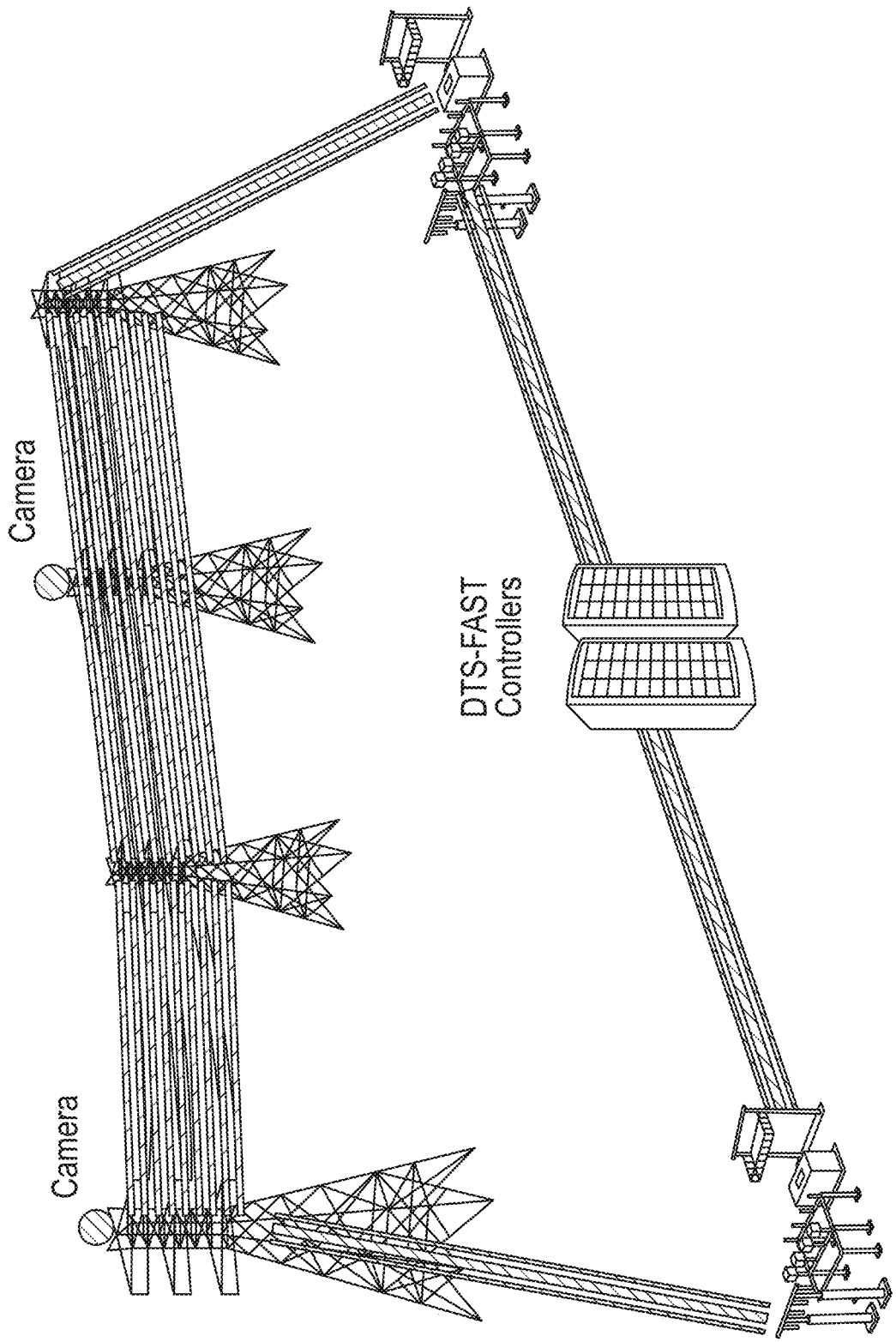
FIG. 1 shows a non-limiting example overview of a system implementation according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily-apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

As used herein, a "user" can be a single user or a plurality of users using a power line resource. Further, a user can be defined as a member of the public, and/or the creator, and/or a consumer, and/or a customer, and/or a client, or an entity such as a limited liability company. Other user types can include, but not be limited to, an administrative user and/or a system user. The user can comprise a mobile user engaging the platform.

Embodiments of the invention described herein generally recite non-conventional approaches for monitoring, detecting, analyzing, responding to, and remediating environmental issues affecting power lines or power line towers. Moreover, the specific functional features are a significant technological improvement over conventional methods and systems, including at least the operation and functioning of a computing system that are technological improvements. This technological improvement includes the one or more aspects of the systems and method described herein that describe the specifics of how mechanical structures operate, which the Federal Circuit makes clear is the essence of statutory subject matter.

The description herein further describes some embodiments that provide novel features that improve the performance of communication and software, systems and servers by providing automated functionality that effectively and more efficiently manage sensor data, generate communications, and arrange various components. Therefore, the person of ordinary skill can easily recognize that these functions provide the automated functionality, as described herein, in a manner that is not well-known and certainly not conventional. As such, the embodiments of the invention described herein are not directed to an abstract idea and further provide significantly more tangible innovation. Moreover, the functionalities described herein were not imaginable in previously existing computing systems and did not exist until some embodiments of the invention solved the technical problem described earlier.

In some embodiments, the system utilizes advanced sensor technologies and intelligent systems built for industrial applications. In some embodiments, a power line tower (i.e., utility structure) is configured to be equipped with one or more sensors for detecting proximate objects such as, for example, defective jumper cables, overgrown vegetation, natural conditions (e.g., fires, smoke, etc.), broken switches, and the like. In some embodiments, by leveraging advanced sensing technologies, the system is configured to detect, isolate, intercept, and/or respond to line faults stemming from events such as falling and/or encroaching vegetation, structure tilting, and falling conductors (i.e., power lines). In some embodiments, the system is configured to provide communication and monitoring infrastructure to quickly identify problems on distribution and transmission lines to ensure operational reliability and help with wildfire mitigation. In some embodiments, the tower includes components that configured to generate an electronic message for transmission over any type of communication network to a server. In some embodiments, the server is configured to analyze messages originating from one or more towers to determine if remediation or response is necessary. In some embodiments, the system is configured to generate alerts and provide visualization and/or analysis of the threat analysts and operators once a possible fire threat has been identified.

In some embodiments, by leveraging data from one or more sensors, multi-spectral cameras, and/or fire sensors to confirm threats in proximity to utility infrastructure allows for real-time (or near real-time) tracking, monitoring, and data collection for a rapid, proactive, and measured response.

FIG. 1 shows an overview of the system according to some embodiments. In some embodiments, the tower control box is configured to send a signal to the substation once line interference is detected. In some embodiments, the tower control box is configured to send a signal to real-time automated controllers (RTAC) at the substation once line interference is detected. In some embodiments, the automated controllers are configured to send signals to the supervisory control and data acquisition (SCADA) platform to de-energize the power lines.

In some embodiments, the system includes one or more cameras, light detection sensors, tilt sensors, flame detectors, and control boxes. In some embodiments, the light detection sensors include light detection and ranging (LiDAR) sensors. In some embodiments, The output signals from one or more sensors alert operators to pertinent information regarding each event. In some embodiments, the signals include timestamps and location information. FIG. 2 shows a non-limiting sensor overview according to some embodiments. In some embodiments, the system is beneficial for areas with frequent vegetation encroachment incidents or outages. FIG. 3 shows a non-limiting table summarizing wildfire risk and associated mitigation technology according to some embodiments.

Figure 4:
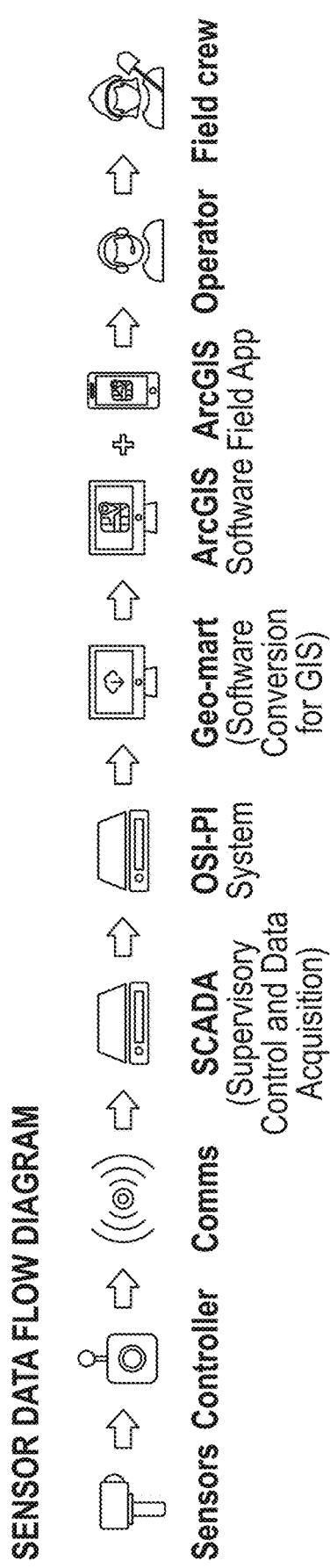
FIG. 4 depicts a data flow diagram according to some embodiments.

In some embodiments, each sensor is configured to output a signal to the controller housed in the control box, which uses preprogrammed logic to initiate warning or alarm signals. In some embodiments, the control is configured to communicate the waring or alarm signals to an operator and/or SCADA through a network data communications system. FIG. 4 depicts a data flow diagram according to some embodiments.

Figure 5:
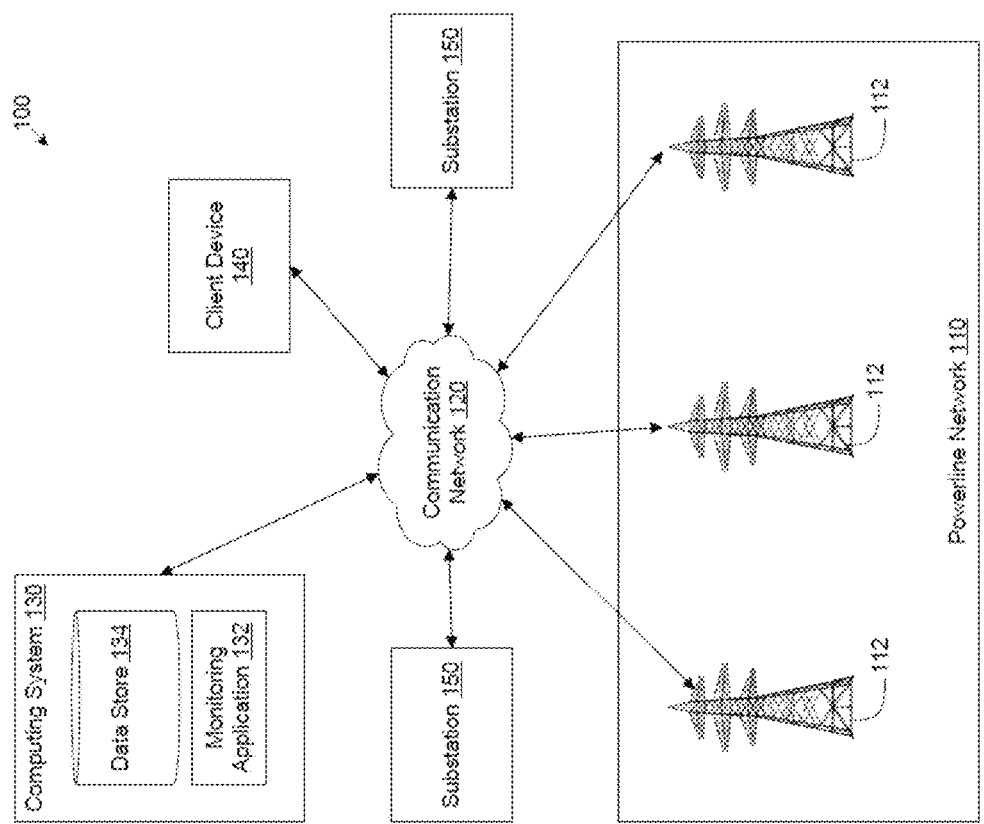
FIG. 5 shows an operating environment according to some embodiments.

FIG. 5 shows an operating environment 100 according to some embodiments. In some embodiments, the operating environment 100 includes a power line network 110. In some embodiments, the power line network 110 is made up of one or more utility structures (e.g., towers) 112. In some embodiments, each tower 112 includes a large vertical structure designed to carry a power line (i.e., conductor) above ground. In some embodiments, a tower 112 may be a transmission tower, a distribution tower, or any other conventional tower that supports an energized power line. In some embodiments, a tower 112 may be a large steel structure used to distribute the power lines of an energy grid over a large geographic area. In some embodiments, power lines supported by several towers 112 form the power line network 110. A tower 112 may also be considered a power pole according to some embodiments.

In some embodiments, each tower 112 is configured to communicate over a communication network 120. In some embodiments, the communication network 120 includes the Internet, intranets, extranets, wide area networks (WANs), local area networks (LANs), fiber optic network, radio frequency network, cellular networks, wired networks, wireless networks, or other suitable conventional networks, or any combination of networks. In some embodiments, endpoints such as, for example, a tower 112, are configured to communicate over the communication network 120 through fiber optic modules, wireless radio modules, cellular communication modules, and other components that facilitate electronic communication over a geographic region.

In some embodiments, the operating environment 100 includes a computing system 130. In some embodiments, a computing system 130 includes a combination of hardware and software. In some embodiments, the computing system 130 includes software programs that may execute in the computing system 130 such as, for example, a monitoring application 132. In some embodiments, the computing system 130 includes a data store 134. In some embodiments, the computing system 130 is configured to be connected to the communication network 120 as an endpoint.

In some embodiments, the computing system 130 may comprise, for example, a server computer or any other conventional system providing computing capability. Alternatively, in some embodiments, the computing system 130 is configured to employ a plurality of computing devices that are configured to be arranged, for example, in one or more server banks or computer banks or other arrangements. In some embodiments, the computing devices are located in a single installation or are distributed among many different geographical locations. For example, the computing system 130 may include a plurality of computing devices that together comprise a hosted computing resource, a grid computing resource and/or any other distributed computing arrangement according to some embodiments. In some embodiments, the computing system 130 may correspond to an elastic computing resource where the allotted capacity of processing, network, storage, or other computing-related resources is configured to vary over time. In some embodiments, the computing system 130 is configured to implement one or more virtual machines that use the resources of the computing system 130. In some embodiments, various software components may be executed on one or more virtual machines.

In some embodiments, various applications and/or other functionality may be executed in the computing system 130. In some embodiments, various data may be stored in the data store 134 or other memory that may be accessible to the computing system 130. In some embodiments, the data store 134 may represent one or more data stores 134. In some embodiments, the data store 134 includes a database. In some embodiments, the data store 134 is configured to store data processed or handled by the monitoring application 132 or data that is processed or handled by other applications executing in the computing system 130.

In some embodiments, the monitoring application 132 may include software that receives communication over the communication network 120. In some embodiments, the monitoring application 132 is configured to receive hazard signals originating from one or more towers 112 and/or one or more sensors 210. In some embodiments, the monitoring application 132 also is configured to receive video data originating from one or more cameras 215 on the one or more towers 112. In some embodiments, the monitoring application 132 is configured to process the data and transmit it over the communication network 120 to an appropriate endpoint. In some embodiments, the monitoring application 132 is configured to generate one or more instructions to de-energize a power line associated with a particular tower 112. In some embodiments, the monitoring application 132 is configured to generate one or more messages and transmit the messages to a client device or other endpoint over the communication network 120. In some embodiments, the monitoring application is configured to alert a particular client device that an object has been detected near a tower 112. The functionality of the monitoring application 132 is described in further detail below according to some embodiments.

In some embodiments, the operating environment 100 includes one or more client devices 140. In some embodiments, a client device 140 allows a user to interact with the components of the computing system 132 over the communication network 120. In some embodiments, a client device 140 may be, for example, a cell phone, laptop, personal computer, mobile device, or any other conventional computing device used by a user. In some embodiments, the client device 140 may be operated by a user and is configured to communicate with the monitoring application 132. For example, the client device 140 may receive alerts from the monitoring application 132 and may receive live data originating from one or more towers 112 according to some embodiments.

In some embodiments, the operating environment 100 may further include one or more substations 150. In some embodiments, a substation 150 includes a facility that is part of a power grid or an electrical generation, transmission, and distribution system. In some embodiments, substations 150 are configured to transform voltage from high to low, or the reverse, or perform other conversions. In some embodiments, electric power may flow through several substations 150 at varying voltage levels. In some embodiments, a substation 150 includes transformers to change voltage levels between high transmission voltages and lower distribution voltages, or at the interconnection of two different transmission voltages. In some embodiments, a substation 150 may be coupled to the power line network such that it helps facilitate the distribution of power across multiple power lines. In some embodiments, a substation 150 includes a communication module configured to communicate over the communication network 120. In this respect, the substation 120 may receive or send messages to other endpoints on the communication network 120 according to some embodiments.

In some embodiments, the substation 150 is configured to de-energize or reenergize a particular power line. In some embodiments, the substation 150 is configured to be controlled in part, by the monitoring application 132 or by user input received at a client device 140. For example, in some embodiments a substation 150 is configured to receive an instruction to energize/de-energize a particular power line associated with a specified tower 112. In some embodiments, the substation 150 is configured to receive an instruction to rebalance the power grid in response to a de-energized power line. In some embodiments, the substation 150 is configured to transmit messages pertaining to the status of a power line that was energized or de-energized. In some embodiments, the substation is configured to serve as an endpoint in the communication network 120.

Figure 6:
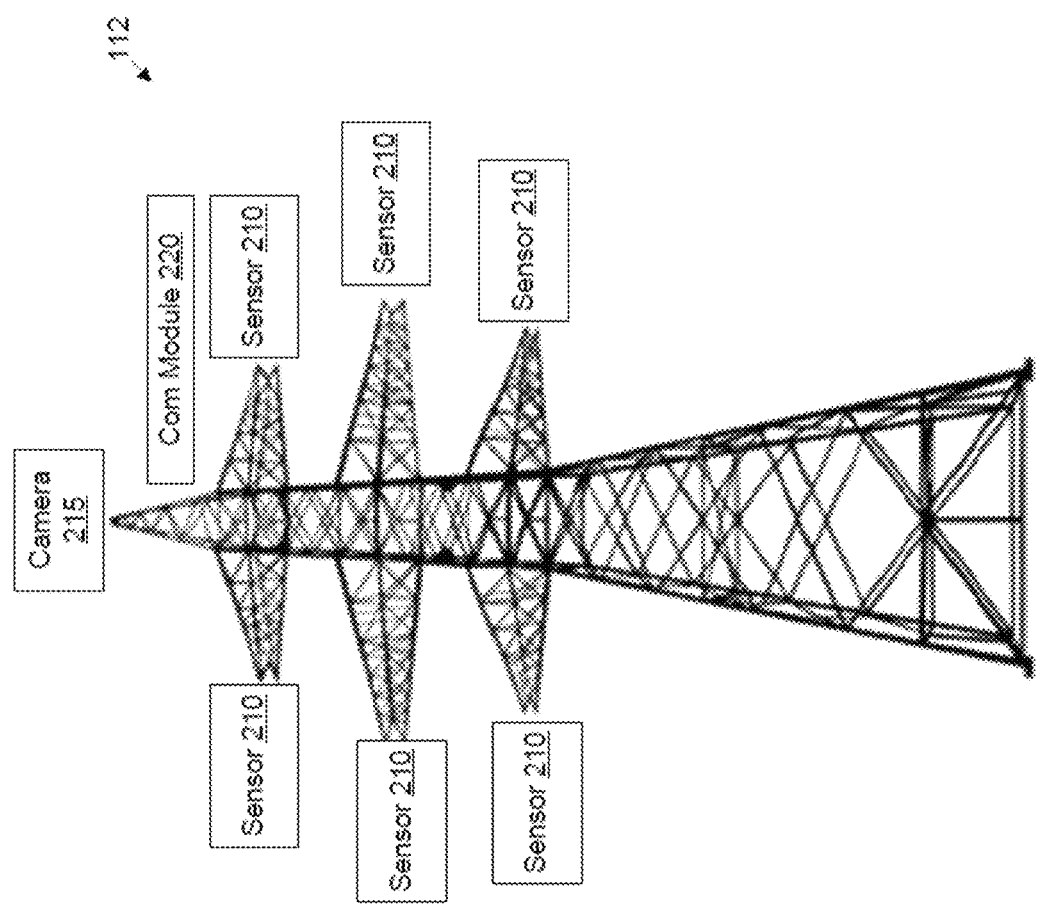
FIG. 6 is a drawing of a tower implemented in the operating environment 100 according to various embodiments.

FIG. 6 is a drawing of a tower 112 implemented in the operating environment 100 according to various embodiments. In some embodiments, the tower 112 is configured to carry or support one or more power lines. In some embodiments, the tower 112 may comprise one or more sensors 210, one or more cameras 215, and a communication module 220.

In some embodiments, a sensor 210 may be a laser, an electromagnetic sensor, a LiDAR, radar, a proximity sensor, or other sensor that detects the presence of nearby objects. In some embodiments, the sensor 210 comprises a laser that is configured to generate or receive a laser beam. For example, in some embodiments, the sensor 210 is configured to detect when an object crosses a beam such that the sensor is tripped or such that the beam is broken or interrupted. In some embodiments, a plurality of sensors 210 is installed around the periphery of the tower 112.

In some embodiments, a camera 215 is configured to be installed on the tower 112. In some embodiments, the camera 215 comprises an infrared sensor to detect images during nighttime. In some embodiments, the camera 215 can be stationary or can be attached to a moveable mount that is remotely controlled. In some embodiments, the camera can be configured to be turned on or off remotely and can provide a real-time video feed in response to commands received from a computing system 130 or client device 140. In some embodiments, the camera is configured to record and store video in response to a sensor being triggered.

In some embodiments, the tower 112 includes a disconnect switch configured to immediate shutoff power if at least a portion of a power line is separated from a utility structure such as tower 112. In some embodiments, if a tower 112 is leaning past a predetermined angle, the angle switch is configured to cut power to the tower 112. In some embodiments, the tower 112 also includes an accelerator switch configured to cut power to the tower 112 if at least a portion of the tower exceeds a predetermined acceleration (e.g., from being moved by wind, impact, and/or gravity). In some embodiments, the switches of a tower may be controlled remotely from signals received over the communication network 120. In some embodiments, the disconnect switch is configured to be pulled apart upon failure of the insulator, insulator hook, and/or power line. In some embodiments, when the disconnect switch exceeds a predetermined load it disconnects and opens a circuit which the system is configured to process as a failure event.

In some embodiments, a tower 112 (or any other utility structure such as a pole) includes two angle switches. In some embodiments, each angle switch is configured to trigger at different angles (e.g., 25° and 50°). In some embodiments, when a utility structure 112 has shifted to past a first angle (e.g., 25°) the system is configured to alert personnel in real-time and/or activate the camera system. In some embodiments, when the system receives a signal that a utility structure 112 has shifted past a second angle (e.g., 50°), the system is configured to send a signal to deenergize the utility structure 112 and activate the camera system.

In some embodiments, the tower 112 includes a communication module 220. In some embodiments, the communication module 220 is configured to enable components coupled to the tower 112 to communicate over the communication network 120. For example, various switches on the tower 112, the camera 215, and the sensors 210 may each be connected to the communication module 220 to allow various tower components to communicate over the communication network 120 according to some embodiments.

In some embodiments, the tower 112 comprises a tower identifier to identify the tower 112. In some embodiments, the tower further comprises a Global Positioning Satellite (GPS) module to determine location or timing data.

Figure 7:
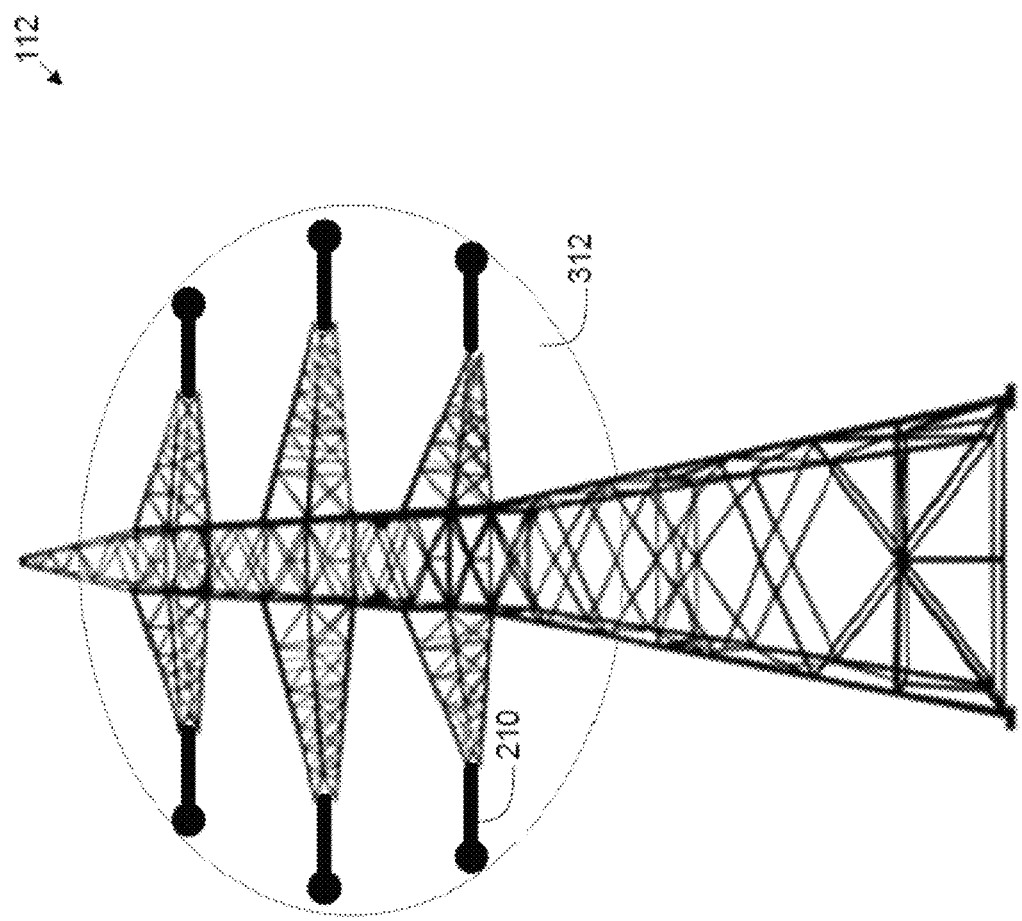
FIG. 7 depicts a field of view monitored by one or more sensors according to some embodiments.

FIG. 7 depicts a field of view 312 monitored by one or more sensors 210 (e.g., one or more cameras and/or one or more light sensors) according to some embodiments. In some embodiments, the tower 112 comprises an array of sensors 210 that form a shield of coverage within the field of view 312 configured to detect intruding objects that penetrate the shield of coverage. In some embodiments, each sensor 210 may comprise a sensor support that distances the sensor away from the tower 112 at a predefined distance. For example, the predefined distance may be five feet according to some embodiments. In some embodiments, the use of a predefined distance creates particular radius, zone, or size of the shield of coverage that expands beyond the edges of the tower 112 at a predetermined distance away from one or more power lines. In some embodiments, by positioning the sensors 210 away from the tower 112 and one or more power lines, the sensors 210 are able to detect potential intrusion before actual intrusion and contact with the tower 112 and/or one or more power lines. In some embodiments, the system is configured to deenergize one or more power lines before contact occurs.

Figure 8:
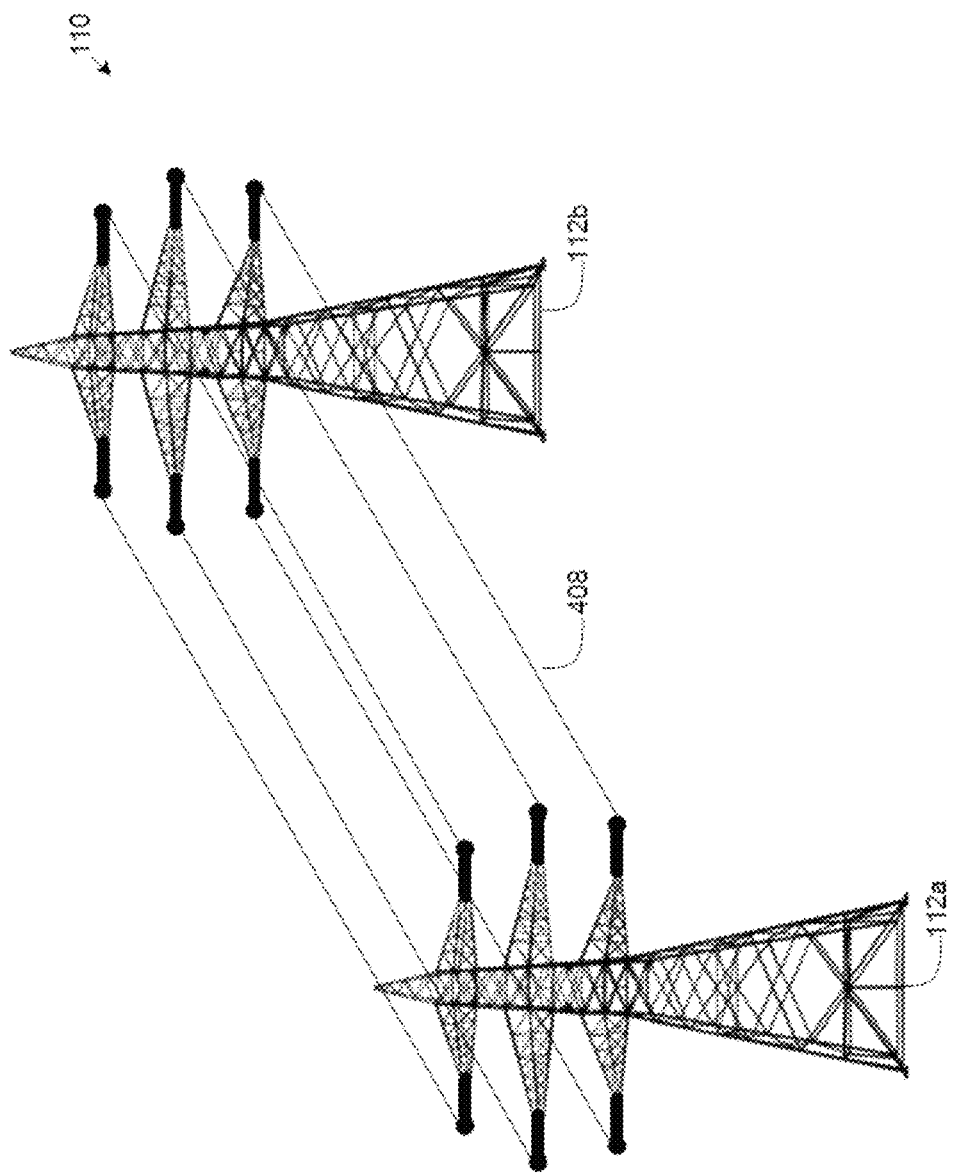
FIG. 8 illustrates one or more light beams spanning between two utility structures according to some embodiments.

FIG. 8 illustrates one or more light beams 408 spanning between two utility structures according to some embodiments. In some embodiments, FIG. 8 depicts a first tower 112a and a second tower 112b. In some embodiments, the first tower 112a is within a line of sight with respect to the second tower 112b. In some embodiments, a sensor installed on the first tower 112a is configured to emit a beam 408 that is received by one or more corresponding sensor installed on the second tower 112b. For example, each sensor is configured to emit and/or receive an electromagnetic signal that forms a beam 408 according to some embodiments. In some embodiments, when a beam 408 is interrupted or otherwise broken, a sensor that receives and/or emits the beam 408 is configured to generate a signal indicating that the beam has been interrupted. The use of several sensors positioned along an outer periphery of a tower 112 creates a three-dimensional shield of coverage to detect proximate objects according to some embodiments.

Figure 9A:
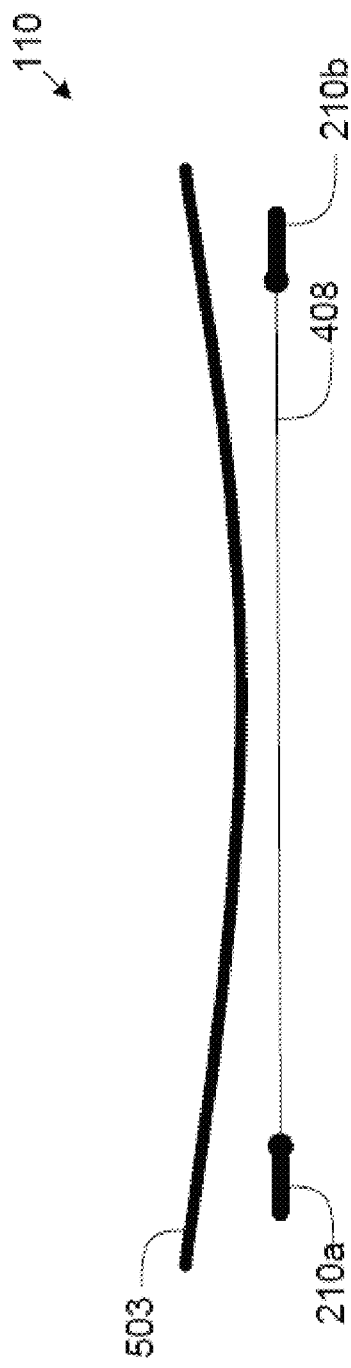
FIGS. 9A and 9B are drawings of detecting a defective power line in the operating environment according to various embodiments.
Figure 9B:
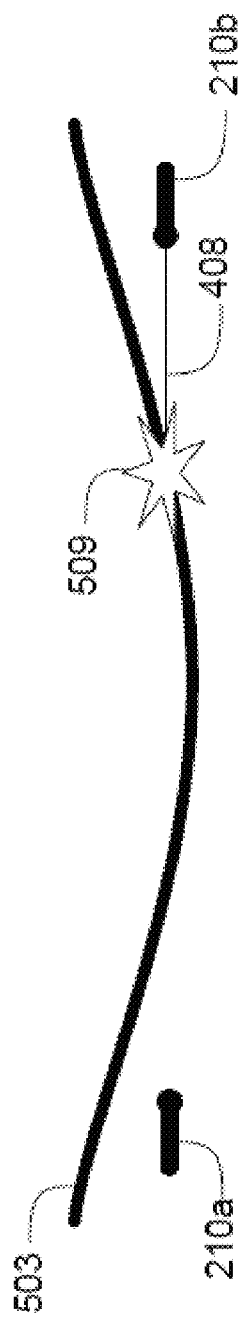

FIGS. 9A and 9B are drawings of detecting a defective power line in the operating environment according to various embodiments. FIG. 9A depicts a first sensor 210a and a second sensor 210b according to some embodiments. In some embodiments, the first sensor 210a and second sensor 210b are configured to be installed on the same tower 112 or on towers 112 within a line of sight. In some embodiments, the first sensor 210a and second sensor 210b together form a beam 408. Also shown in FIG. 9A is a cable 503 which may be a jumper cable or power line according to some embodiments. In some embodiments, the cable 503 may have some natural sagging due to the tension of the cable 503. In some embodiments, the beam 408 is configured to detect whether objects such as the cable 503 have crossed a boundary defined by the beam 408. For example, the beam 408 may be part of a shield of coverage surrounding one or more towers 112 or power lines supported by towers 112 according to some embodiments.

In FIG. 9B, the cable 503 has sagged to the point where it crosses the beam 408 according to some embodiments. In some embodiments, this results in a break point 509 which may be described as a break point event along a line of site. For example, in some embodiments, the first sensor 210a no longer detects the beam 408 because the cable 503 has interrupted the line of sight. In response, the first sensor 210a is configured to generate a signal that is transmitted to the communication module 220 and then conveyed over the communication network 120 to the monitoring application 132 according to some embodiments.

In some embodiments, the signal resulting from a break point event is configured to be formatted as a message that is transmitted over the communication network 120 to the computing system 130. In some embodiments, the message may be a binary indication of whether the bream 408 is broken. In some embodiments, the message may include a timestamp of when the beam was broken. For example, the communication module 220 may insert a timestamp into the message prior to transmitting it over the network according to some embodiments. In some embodiments, the message is configured to include a sensor identifier or tower identifier so that the monitoring application can determine a location.

In some embodiments, the monitoring application 132 is configured to generate an alert and transmit the alert to one or more predefined client devices 140. In some embodiments, the alert may be a push notification, text message, email, phone call, or other conventional electronic communication that is received at the client device 140. In some embodiments, the monitoring application 132 also is configured to generate an instruction to de-energize the tower 112 associated with the sensor 210. In some embodiments, each sensor is associated with a sensor identifier that is embedded into messages generated by the sensor. In some embodiments, the sensor identifier is used to determine a corresponding tower 112 that supports the sensor 210.

Figure 10:
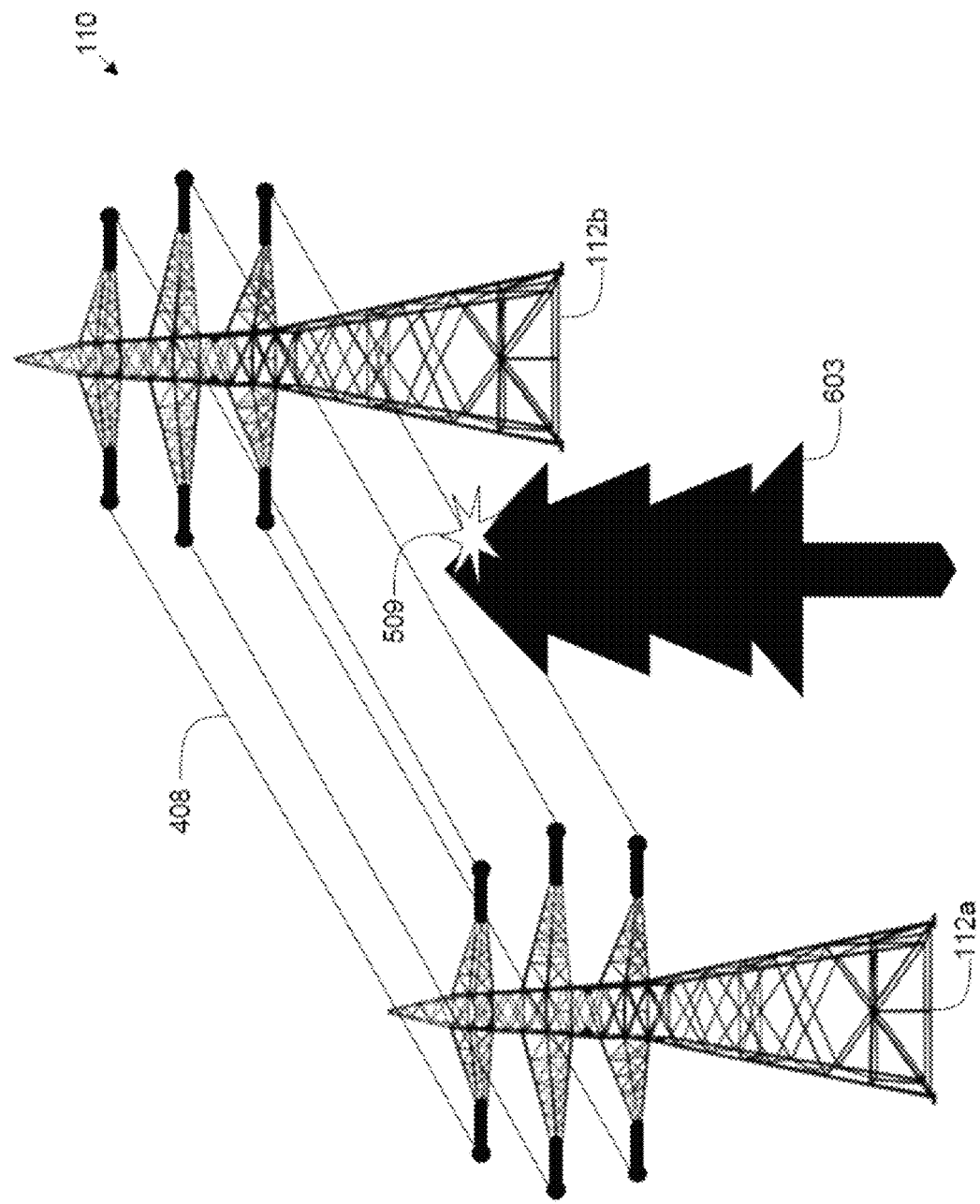
FIG. 10 depicts a hazard breaking a line of site before impacting a power line according to some embodiments.

FIG. 10 depicts a hazard 603 breaking a line of site 509 before impacting a power line 408 according to some embodiments. FIG. 10 depicts an example of overgrown vegetation 603 that encroaches a shield of coverage established by one or more beams 408 according to some embodiments. For example, in some embodiments the beams surround one or more power lines supported by a first tower 112a and second tower 112b. In some embodiments, the beams 408 are configured to detect when objects become proximate to the beams. In some embodiments, when the vegetation 603 grows too close to a power line, it may cross a beam, resulting in a break in the line of site 509.

Although FIG. 10 shows the detection of overgrown vegetation 603, the sensors may be configured to detect other proximate objects such as, for example, downed cables, broken sensors, broken switches, large birds, fires, smoke, and other potentially damaging conditions according to some embodiments. In some embodiments, by detecting proximate objects before they come in contact, a monitoring application 132 may take preemptive measures such as automatically generating notifications to client devices 140 associated with personnel, de-energizing specific power lines carried by towers 112 endangered by proximate objects, and providing a camera feed to client devices 140 to assess other remedial steps.

Figure 11:
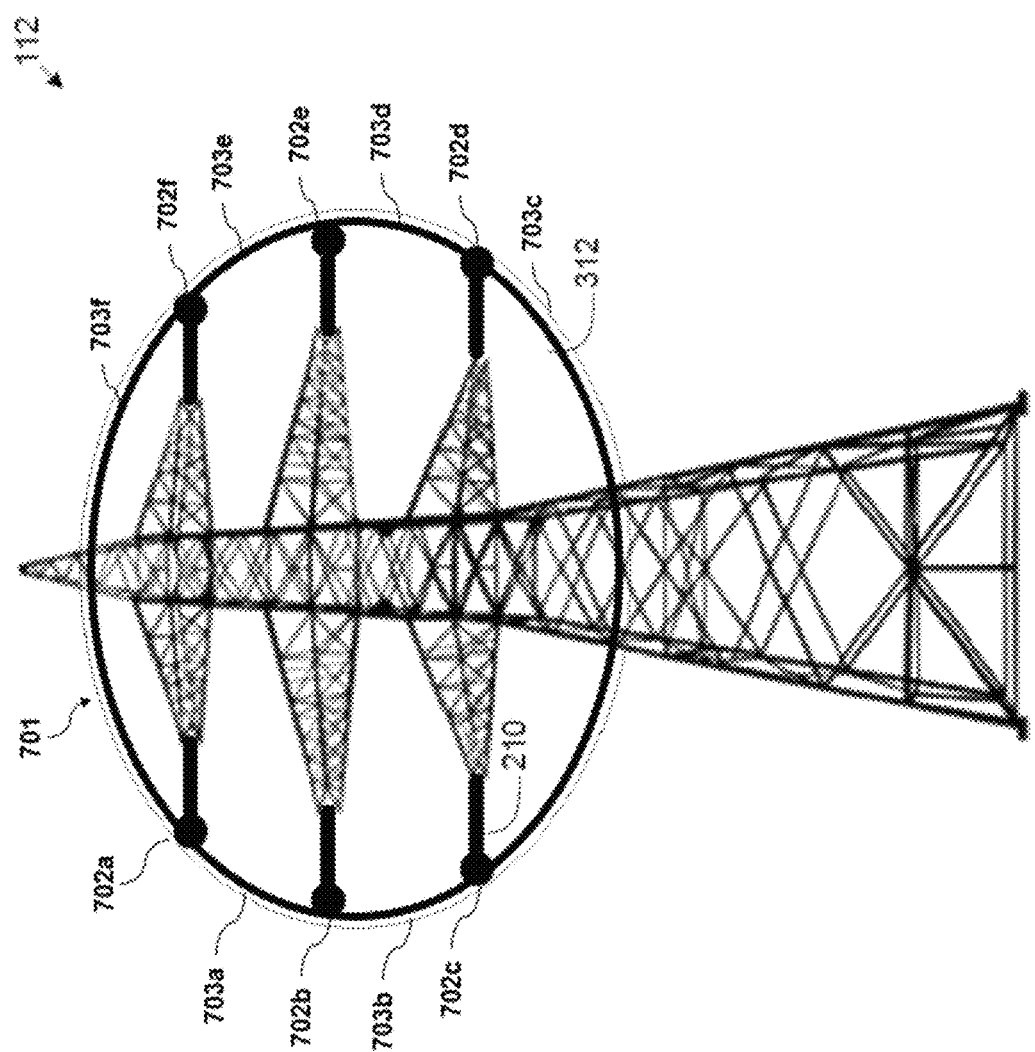
FIG. 11 shows a tower including a continuous sensor system according to some embodiments.

FIG. 11 shows a tower 112 including a continuous sensor system 701 according to some embodiments. In some embodiments, continuous sensor system 701 is a continuous structure defining a perimeter around at least a portion of the tower 112. In some embodiments the continuous structure is a single continuous material (e.g., reflective tape) In some embodiments, continuous sensor system 701 includes a plurality of sensor sections 703a-f connected at nodes 702a-f. In some embodiments, nodes 702a-f include one or more sensors. In some embodiments, each of the plurality of sensor sections 703a-f includes a plurality of perimeter sensors. In some embodiments, the plurality of perimeter sensors are configured to collectively create a sensor curtain (e.g., a light curtain) to detect a hazardous condition occurring between nodes 702a-f.

Figure 12:
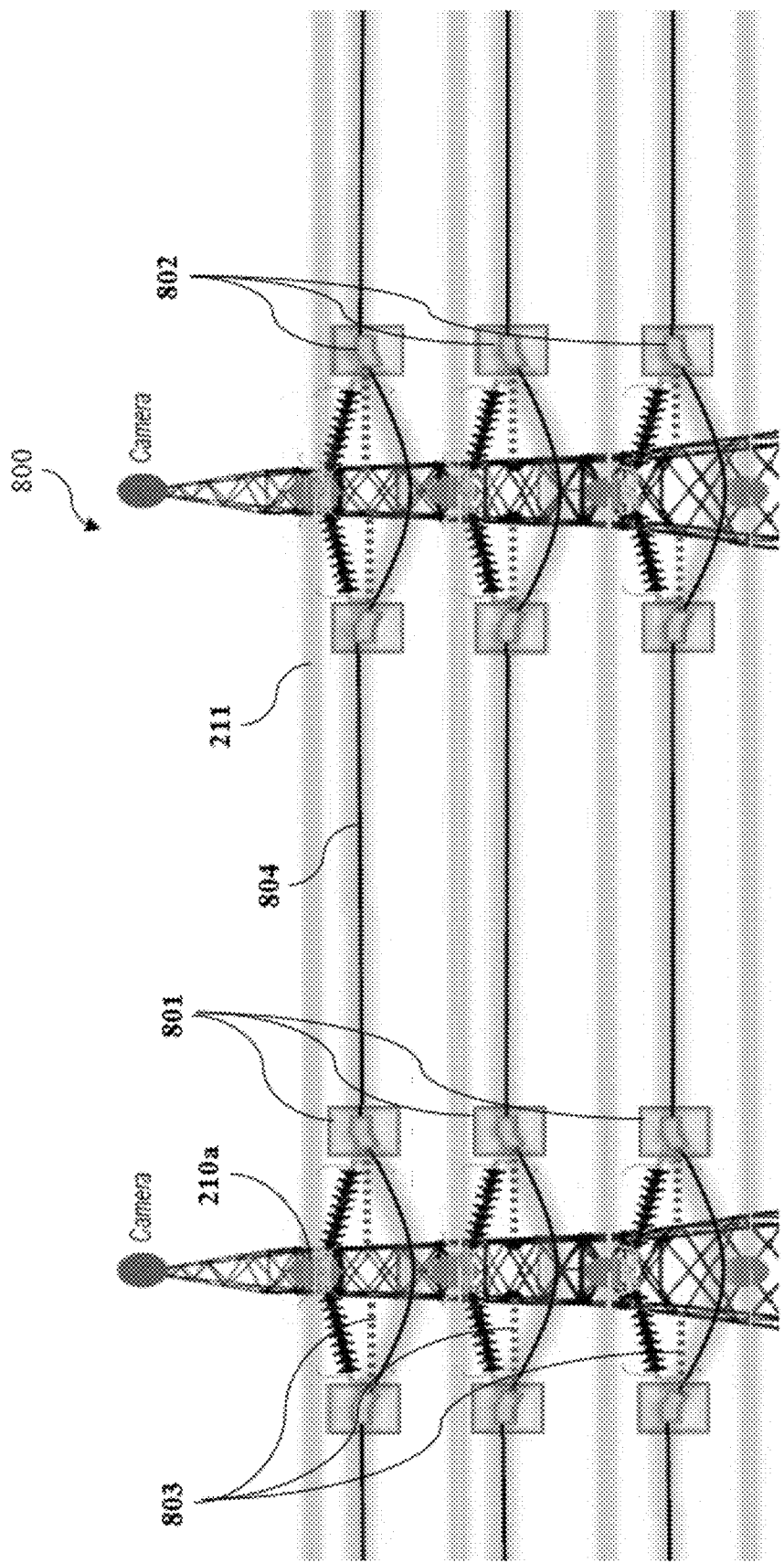
FIG. 12 shows a jumper cable failure detection portion of the system according to some embodiments.

FIG. 12 shows a jumper cable failure detection portion of the system 800 according to some embodiments. In some embodiments, the cable failure detection system 800 includes one or more fire boxes 801. In some embodiments, the cable failure detection system includes one or more arc sensors 802. In some embodiments, the cable failure detection system includes one or more fiber optic cables 803. In some embodiments, the cable failure detection system encloses the jumper cable 805 with the fire box 801 to minimize the impact of arcs/sparks from a failed jumper cable 805 connecting high voltage wires 804 into the surrounding environment. In some embodiments, each fire box 801 includes one or more arc sensors 802 which detects an arc and provides an alert signal to the system. In some embodiments, the one or more fiber optic cables 803 deliver the alert signal to the system. In some embodiments, the system uses one or more conventional signal transmitters (e.g., wireless, radio, etc.) to deliver the alert signal. In some embodiments, the cable failure detection system includes one or more sensors (e.g., 210*a*) configured to detect an object passing between a line of sight 211.

In some embodiments, when a PSPS is instituted, the monitoring application may verify whether a sensor data indicates a clear path before re-energizing the power lines. In some embodiments, the system is configured to re-energize a power line if there is no break point event detected for a predetermined period of time.

Some embodiments include the ability to de-energize a power line before an impact or failure can cause a power line to contact another object or the ground. In some embodiments, planar laser beams form a shield around the power lines. In some embodiments, these beams can be located wherever a utility or regulatory authority deems appropriate. In some embodiments, each of the planar beams are placed at a distance of 3-10 feet from each power line. In some embodiments, each of the planar beams are placed at a distance of 5 feet from each power line. In some embodiments, a predetermined distance provides some embodiments sufficient time to de-energize the power line within ten or more milliseconds to prevent undesirable contact with the damaged or otherwise compromised power line by a moving object. In some embodiments, grid stabilization can quickly take place through either automated or manual intervention. In some embodiments, two or more sensors must be triggered in order to cause of the power line to deenergize. In some embodiments, the monitoring application 132 is configured according to one or more rules to provide remediation. In some embodiments, the monitoring application 132 generates an instruction to de-energize a power line associated with one or more towers 112 in response to a break point event. In some embodiments, the monitoring application 132 is configured to generate and transmit a notification to a predefined recipient in response to a break point event. In some embodiments, the monitoring application 132 records and stores camera data in response to a break point event. In some embodiments, the monitoring application 132 is configured to forward real-time camera data to a client device 140 in response to a break point event.

In some embodiments, the system includes a fire detection system. In some embodiments, the fire detection system comprises one or more heat sensors. In some embodiments, a heat sensor is one or more of a thermal imaging camera, infrared camera, a negative temperature coefficient (NTC) thermistor, resistance temperature detector (RTD), thermocouple, and semiconductor-based sensor. In some embodiments, the system includes one or more heat sensors attached to a tower 112 in a predetermined location. In some embodiments, a predetermined location is at the base of the tower 112. In some embodiments, a predetermined location is adjacent one or more power lines (e.g., within 10 ft). In some embodiments, one or more sensors 210 include one or more heat sensors.

Figure 13:
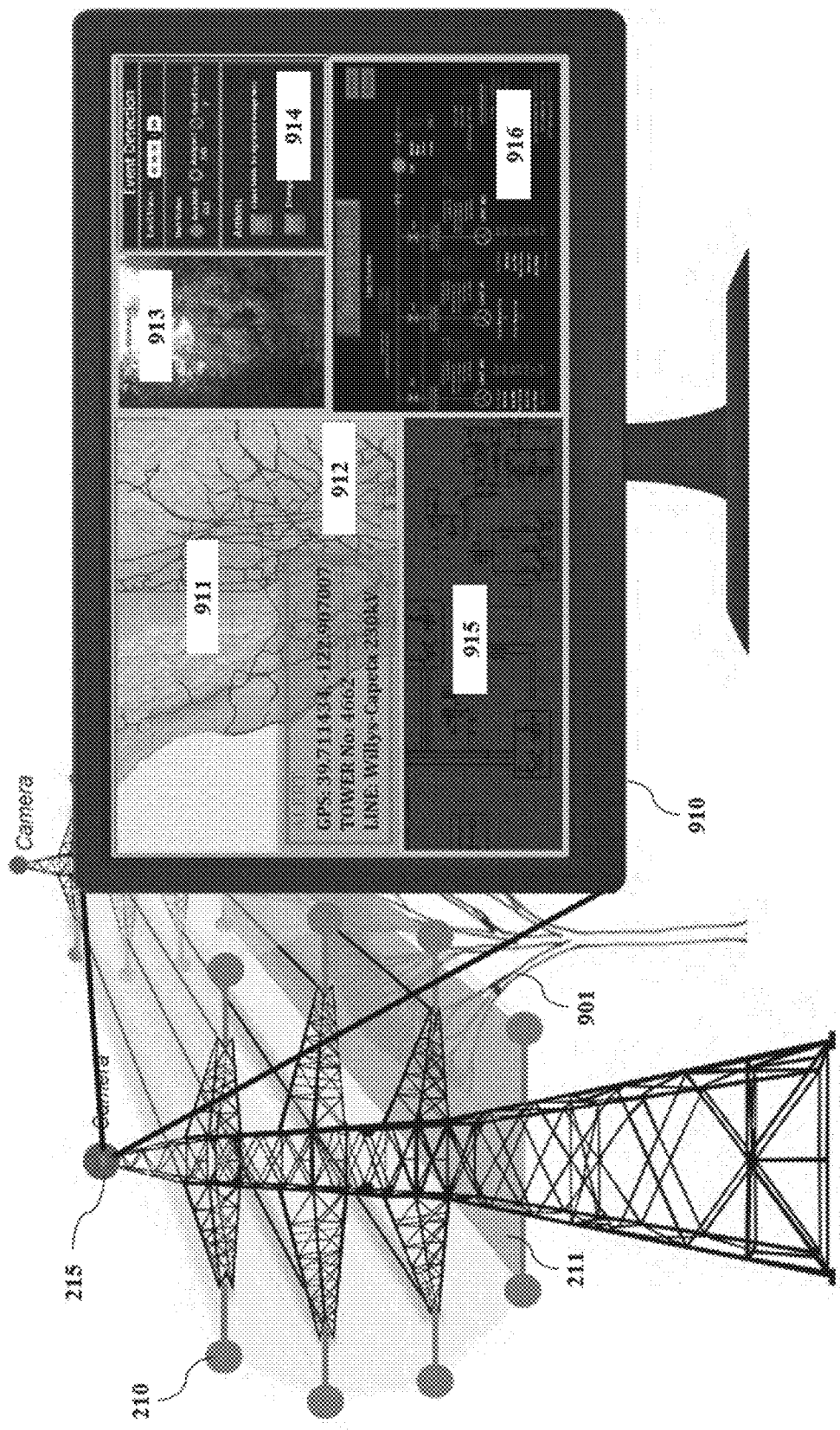
FIG. 13 illustrates a command center display portion of the system according to some embodiments.

FIG. 13 illustrates a command center display portion of the system according to some embodiments. In some embodiments, the command center comprises a SCADA platform. In some embodiments, when a hazard (e.g., tree branch 901) breaches a line of site 211 monitored by one or more sensors 211, 215, one or more signals are sent to a remote command center display 910. In some embodiments, the remote command center display is configured to display one or more of: a map 911 showing the location of the hazard, coordinates 912 of the hazard, a picture 913 of the hazard, a response planning window 914, structural and/or electrical drawings 915, and power plant operations panel 916, as non-limiting examples.

In some embodiments, the system includes the utility structure. In some embodiments, the one or more sensors are placed on a utility structure (as used herein, a utility structure is any structure that supports current carrying conductors) below the conductors (also referred to as power lines) which improve safety by eliminating the possibility of the sensors falling on the conductors. In some embodiments, the system includes one or more 3 dimensional (3D) LiDAR sensors below conductors. In some embodiments, a 3D LiDAR sensor can replace two 2D LiDAR sensors which reduces weight. In some embodiments, a 2D LiDAR sensor is configured to scan within a single plane (XY plane) while a 3D LiDAR is configured to scan a 3D space by emitting light in multiple planes (XYZ planes). In some embodiments, one or more sensors will be embedded into a composite crossarm. In some embodiments, the one or more crossarms are at least partially hollow and/or are configured to enable internal routing of cables to one or more sensors and/or control boxes. In some embodiments, the system is configured to not interfere with climbing space on a utility structure (pole, tower, etc.) In some embodiments, the system is configured to enable a person to climb past one or more sensors and/or control boxes.

Figure 14:
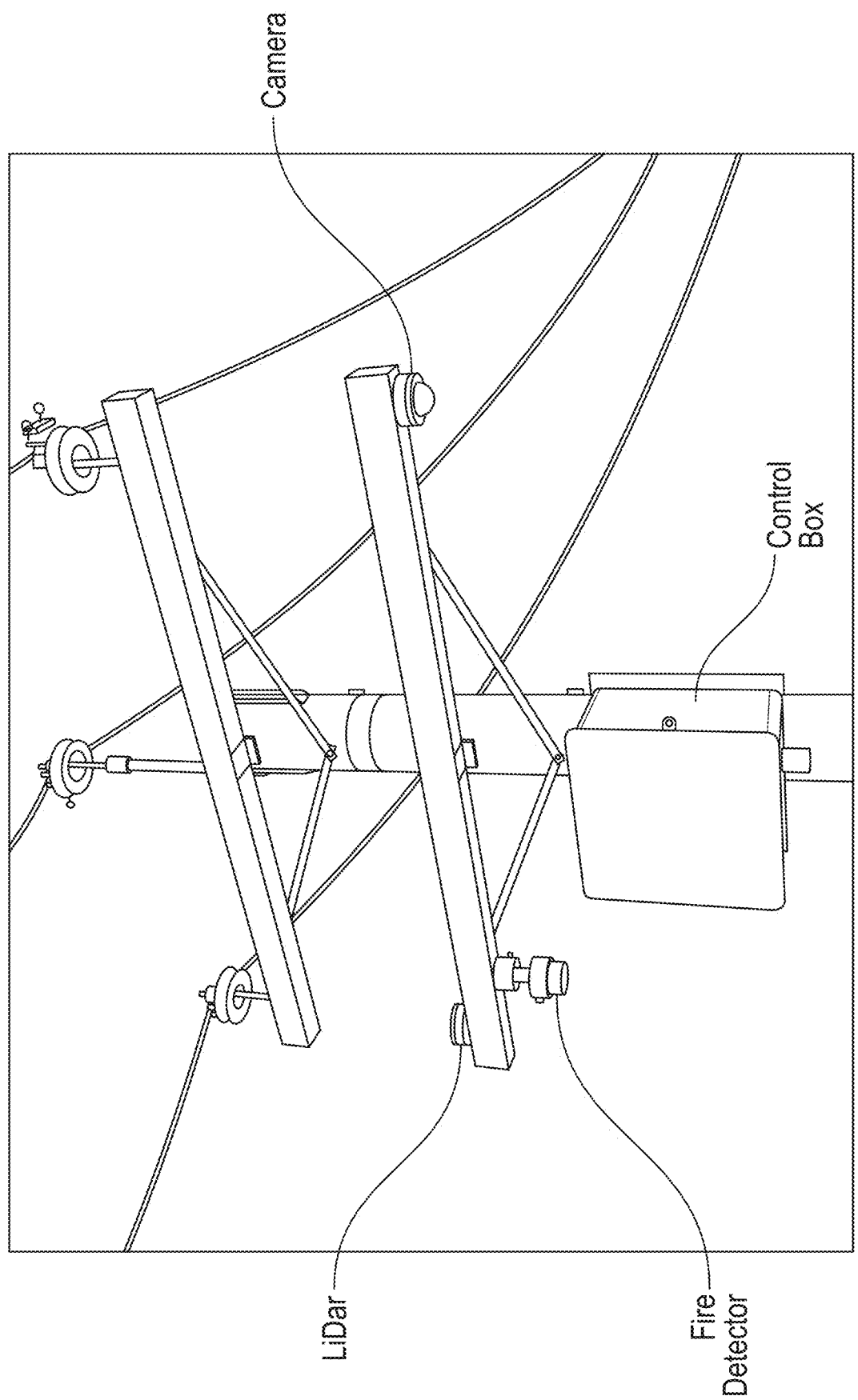
FIG. 14 shows a non-limiting example of a composite cross-arm and raised control box deployed on a utility structure in the form of a composite pole and configured to enable an operator to climb past the control box according to some embodiments.

FIG. 14 shows a non-limiting example of a composite cross-arm and raised control box deployed on a utility structure in the form of a composite pole and configured to enable an operator to climb past according to some embodiments. In some embodiments, the system includes a composite system hardened pole to support one or more sensors and or one or more electrical utility components (conductors, transformers, switches, brackets, sensor arms, etc.). In some embodiments, one or more sensors and/or control boxes are mounted on one or more sensor arms coupled to the utility structure and extending substantially parallel to the ground.

Figure 15:
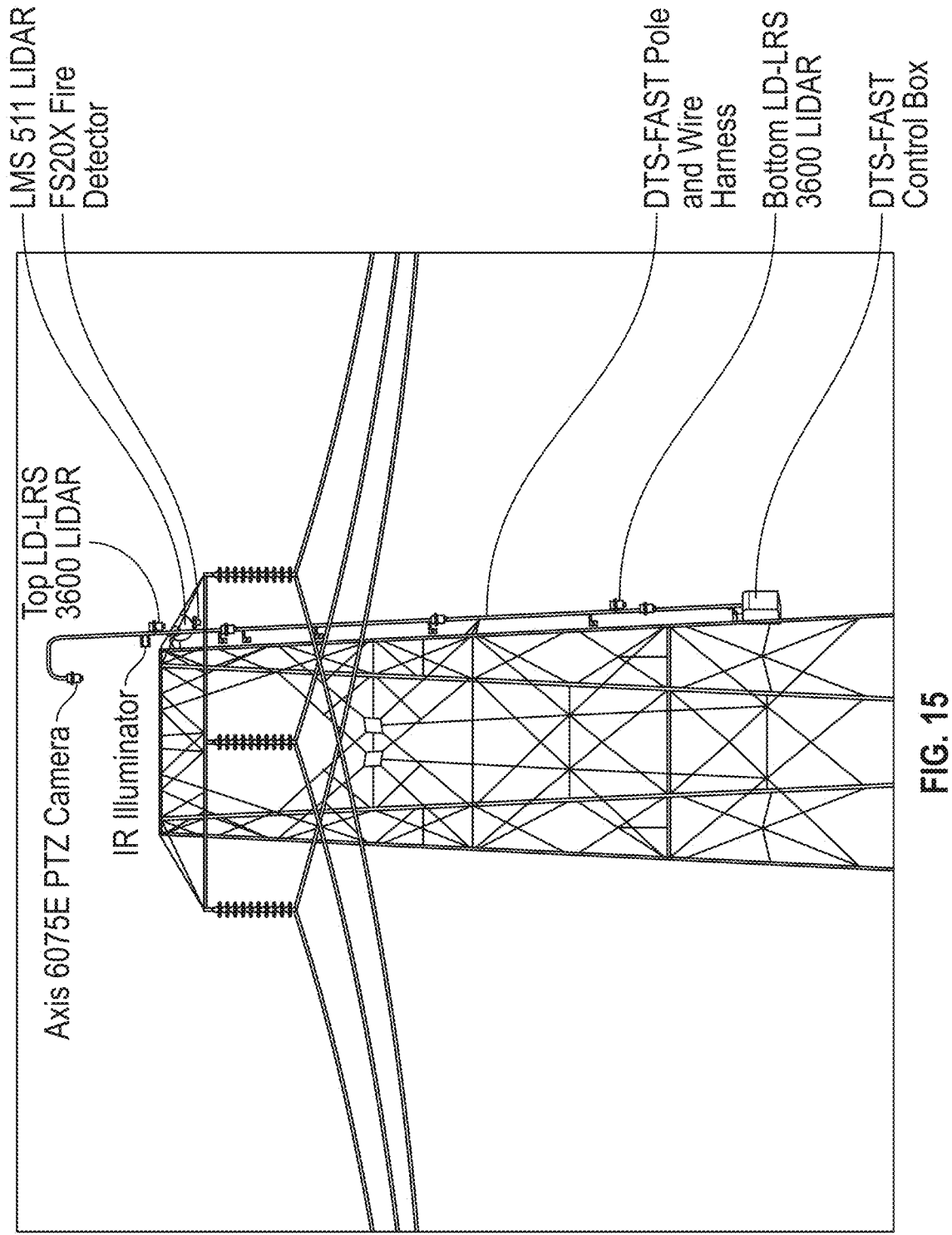
FIG. 15 shows a non-limiting example of the system implemented on a utility structure in the form of a transmission tower with one or more sensors positioned above and below conductors according to some embodiments.

In some embodiments, the system includes one or more 2 dimensional (2D) and/or 3D LiDAR sensors. In some embodiments, the system includes one or more sensors placed above conductors. In some embodiments, one or more LiDAR sensors are positioned above conductors. In some embodiments, one or more LiDAR sensors are positioned below conductors. FIG. 15 shows a non-limiting example of the system implemented on a utility structure in the form of a transmission tower with one or more sensors positioned above and below conductors according to some embodiments.

Figure 16:
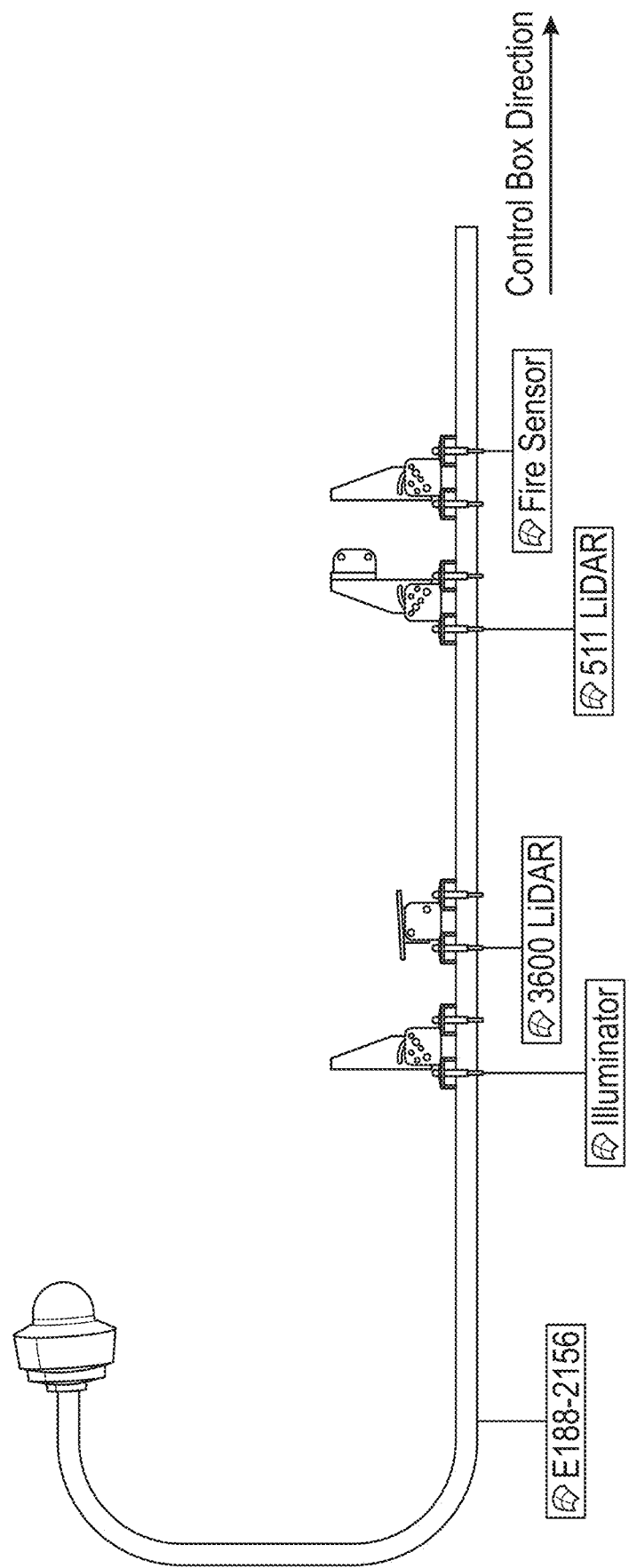
FIG. 16 shows non-limiting examples of clamping brackets deployed at various angles, as well as a non-limiting example sensor arrangement according to some embodiments.

In some embodiments, the system includes one or more clamping brackets configured to secure one or more system components (e.g., sensors, support structures, control boxes, wiring harnesses, etc.) to a utility structure. In some embodiments, the system includes one or more articulating brackets. In some embodiments, one or more clamping brackets include one or more articulating brackets. In some embodiments, one or more sensor brackets include articulating brackets. FIG. 16 shows non-limiting examples of clamping brackets deployed at various angles, as well as a non-limiting example sensor arrangement according to some embodiments. From left to right the sensors include a camera, an illuminator, a LiDAR, a second LiDAR, and a fire sensor.

Figure 17:
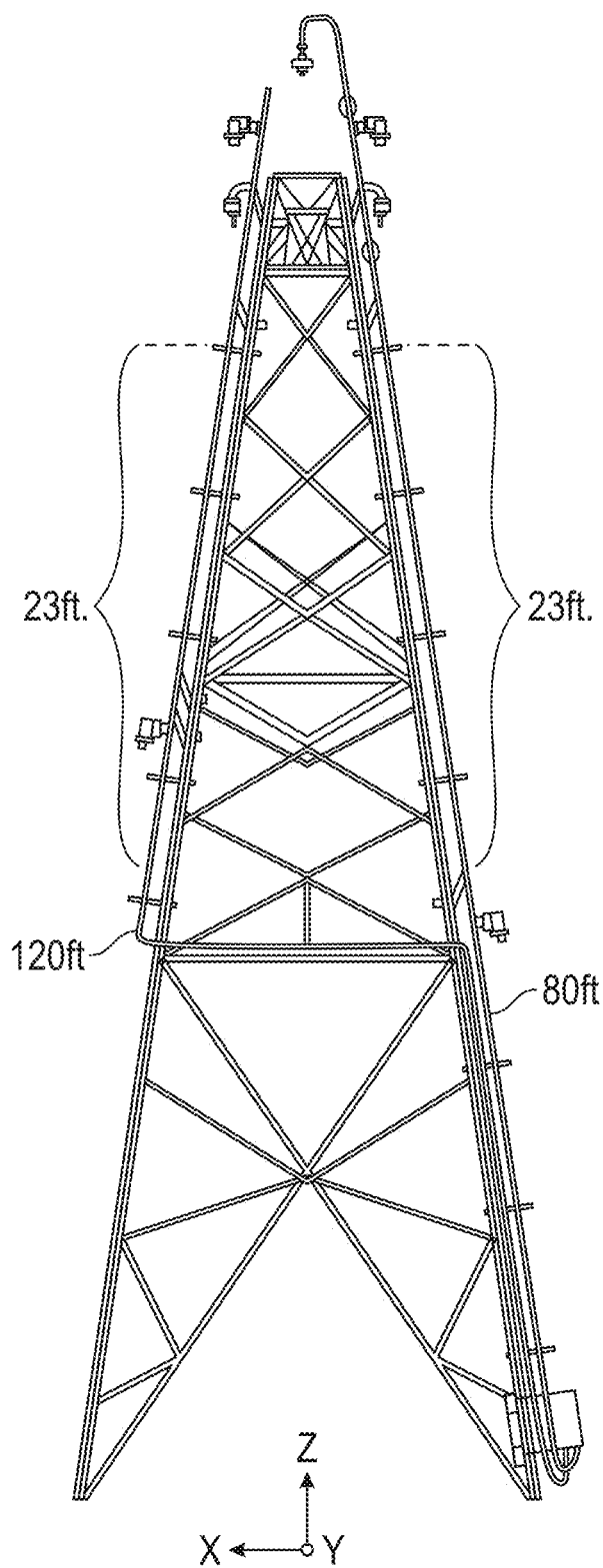
FIG. 17 shows a non-limiting example wiring harness configuration according to some embodiments.

In some embodiments, the system includes wiring harnesses. In some embodiments, a wiring harness houses the cables required to power and connect to the sensors for alarms and for configuration. In some embodiments, while the cables and connectors are ruggedized, the harness is configured to provide additional protection from UV degradation and harsh weather conditions. Grouping the cables into one harness provides ease of installation and removal according to some embodiments. In some embodiments, one or more wiring harnesses utilize separate connectors to the control box for each sensor. In some embodiments, one or more wiring harnesses consolidate all the connections into one heavy duty plugin connector. In some embodiments, the system includes one or more wiring harness configured to secure and/or route electrical and/or signal cables to one or more sensors and/or control boxes. In some embodiments, the one or more wiring harnesses include or are run through at least a portion of one or more conduits configured to house one or more signal and/or electrical cables. In some embodiments, one or more conduits are not electrically conductive (e.g., not aluminum). In some embodiments, one or more conduits are fiberglass. In some embodiments, the system includes at least one wire harness that connects the sensors to a controller and network switch inside the control box. In some embodiments, the wire harness shields and protects the data and power cables required to power, configure, and operate the sensors. FIG. 17 shows a non-limiting example wiring harness configuration according to some embodiments. In some embodiments, in some embodiments the system includes a main wiring harness and a secondary wiring harness. In some embodiments, one or more wiring harnesses are configured to enable one or more LiDAR sensors to be spaced less than or equal to 30 feet from each other.

Figure 18:
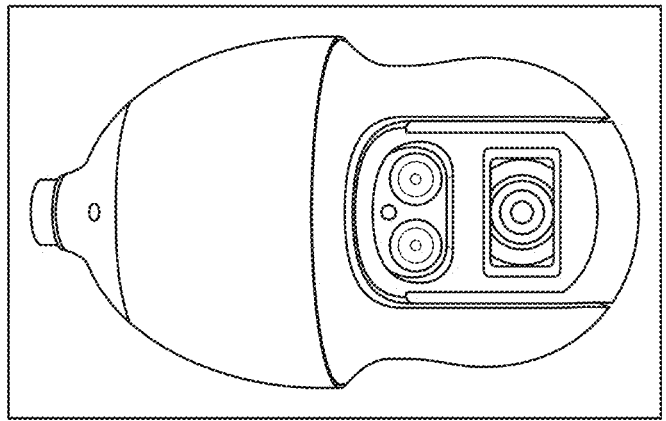
FIG. 18 shows a non-limiting example of a camera according to some embodiments.

In some embodiments, one or more cameras include a pan-tilt-zoom (PTZ) camera. In some embodiments, one or more pan-tilt-zoom (PTZ) cameras are configured to provide real-time visual monitoring of a conductor (power) line. In some embodiments, one or more cameras are positioned to look down at a conductor and at any potentially encroaching vegetation. In some embodiments, a camera allows operators to quickly validate or inspect assets. In some embodiments, a camera (e.g., PTZ camera) includes infrared (IR) illuminators for nighttime inspections. In some embodiments, the camera includes a XNP-6550RH PTZ camera. In some embodiments, the camera includes advanced digital image stabilization (DIS) technology and/or a built-in gyroscopic sensor to reduce motion blur caused by wind or vibration. In some embodiments, surface mount technology IR LEDs are built into the camera and provide a wide angle of uniform IR light across the field of view for a wider image capture area. In some embodiments, the camera includes lens distortion correction technology to prevent curving of straight lines near the edge of the camera's field of view. In some embodiments, one or more cameras are configured to give operators full control to survey the surrounding areas and zoom to specific objects for quick, remote inspection. FIG. 18 shows a non-limiting example of a camera according to some embodiments.

In some embodiments, light detection and ranging (LiDAR) sensors are configured to monitor the health of the conductor line as well as detecting encroaching falling vegetation. In some embodiments, these sensors are configured to sense if vegetation is near the conductor line or for falling conductors. In some embodiments, LiDAR uses light and time-of-flight measuring technology for non-contact distance measurements. In some embodiments, the amount of time it takes an emitted beam of light to return to the sensor, as well as the amount of light that is reflected and returned, provides an indication of how far away and how large the object is. In some embodiments, the LiDAR sensors include 2-dimensional sensors that provide an indication of distance and angle on a single plane and are used for object detection both in identifying large objects approaching energized lines such as branches or falling trees, as well as monitoring the position of the energized lines.

Figure 19:
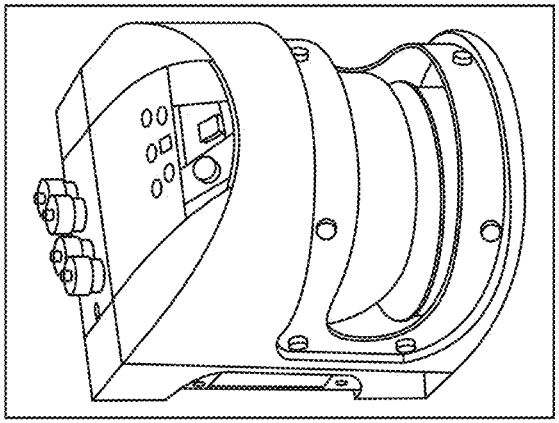
FIG. 19 illustrates non-limiting example LiDAR sensor according to some embodiments.

FIG. 19 illustrates a non-limiting example LiDAR sensor according to some embodiments. In some embodiments, the LiDAR sensor is an outdoor, non-contact optical distance measurement sensor that provides contour data in two dimensions, and internal and external processing for long distance, high precision detection. In some embodiments, the unit provides detection using a monitoring field to identify object infringement on energized line conductors. In some embodiments, when an object infringes on the monitoring field, the unit sends an alarm via digital output. In some embodiments, the unit is configured to scan at 25 cycles per second at an angular resolution of 0.1667° per cycle. In some embodiments, the interlaced function offsets the start angle of each subsequent cycle after the first, achieving a fine angular resolution of 0.042° and providing coverage in gaps from the first scan cycle.

In some embodiments, the device is installed approximately 40 m distance between structures to account for detection of objects with low remission. In some embodiments, the system is configured to filter objects of inconsequential size. In some embodiments, the response time is set at 10 ms allowing for 4 scan cycles at 25 Hz before confirming detection. In some embodiments, no delay timer is set for this sensor.

In some embodiments, the light detection sensor (e.g., LiDAR sensor) is configured to provide line conductor position monitoring where the light detection sensor monitors the line conductor position and sends an alarm when the conductors have fallen out of the monitoring field. In some embodiments, for this application, a reverse logic is used: when an object, in this case the line conductor, infringes on the monitoring field, no alarm is sent; however, when the object is removed, the unit transmits a digital output. In some embodiments, program logic includes a delay time of 8000 ms where the object has been fully removed from the monitoring field before the unit sends a signal to the controller. In some embodiments, the light detection sensor provides fine angular resolution which allows for accurate and precise detection of a small line conductor. In some embodiments, to aid in reliability of detection, the unit is installed approximately 2 meters from the conductor.

In some embodiments, the system includes a flame (fire) detector which is configured to detect a nearby fire (i.e., within line of sight). In some embodiments, the flame conductor includes an industrial photoelectric fire sensor configured to detect fires at the base of an electrical structure. In some embodiments, the flame detector includes a combination of IR sensors, ultraviolet (UV) sensors, and visible light sensors. In some embodiments, the flame detector is configured to provide a signal to the controller of fires in early smoldering stages where UV and IR light is emitted but smoke is not. In some embodiments, the photoelectric sensor is not limited by wind like conventional ionization smoke detectors that require smoke particles to enter the open chamber of the detector. In some embodiments, the fire detector provides a defense for the DTS-FAST system in the event other sensors did not detect an ignition source, or when an external fire has encroached on an associated structure. In some embodiments, upon detection and verification of a fire, the fire detector sends an output signal to the controller, which then sends a signal to one or more SCADA systems.

Figure 20:
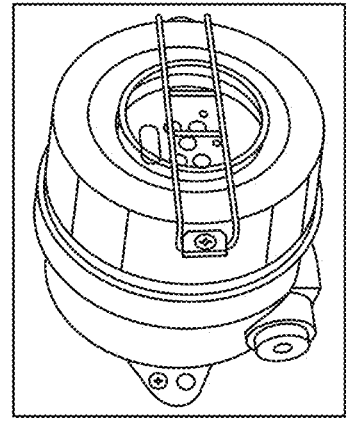
FIG. 20 shows a non-limiting example fire detector according to some embodiments.

FIG. 20 shows a non-limiting example fire detector according to some embodiments. In some embodiments, the FS20X is an industrial multi-spectrum electro-optical flame detector that detects fire and flame using integrated IR and UV sensing technologies. In some embodiments, the system includes a FS20X to detect fires underneath transmission towers and distribution poles. In some embodiments, the system is configured to use a combination of one or more light sensors (e.g., UV, IR, and visible light sensors) to prevent false alarms caused by arcs or corona discharges and sunlight. In some embodiments, the fire detector includes at least three internal relays: alarm; verified alarm that operates after the verify timer is exceeded; and a fault relay to indicate sensor irregularities such as abnormal voltage input power, temperature, sensor failure, communication failure, and obstructed optical window.

In some embodiments, a tilt sensor is configured to measure the angle of any component of the infrastructure as an indication a tower or pole is about to fall. In some embodiments, the system is configured to shut down power to a tower or pole that is about to fall. In some embodiments, the tilt sensor includes an inclinometer. In some embodiments, the tilt sensor is configured to monitor the angle of an electrical structure on which it is installed. In some embodiments, for transmission towers, the inclinometer provides an alarm when the structure has been knocked down. In some embodiments, for distribution poles, the inclinometer is configured to provide real time angle of the pole to the controller. In some embodiments, the controller is configured to send an alert when the pole (tower) has leaned past a pre-determined angle and/or when it has completely fallen. In some embodiments, the tilt sensor is installed on a wooden pole. In some embodiments, the tilt sensor is configured to enable engineers to optimize LiDAR configurations for monitoring and detection based on the current angle of the structure relative to the energized lines (conductor, power, and electrical lines).

Figure 21:
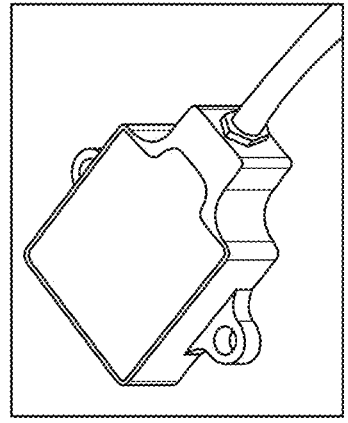
FIG. 21 shows a non-limiting example tilt sensor according to some embodiments.

FIG. 21 shows a non-limiting example tilt sensor according to some embodiments. In some embodiments, a tilt sensor includes a DAS Inclinometer. In some embodiments, the tilt sensor includes a dual-axis tilt sensor used to measure angles in both the pitch and roll axes. In some embodiments, the tilt sensor is configured to provide precision measurements with low temperature drift. In some embodiments, the tilt sensor is installed in one or more control boxes, wherein it is protected from external conditions. In some embodiments, the tilt sensor is configured to provide the angle of a (wooden) utility pole in real-time via analog output to a controller. In some embodiments, when the controller receives a measured angle from the inclinometer greater than or equal to 25° but less than 50°, it is programmed to output a warning. In some embodiments, the controller sends an alarm when it receives a measured angle of 50° or more.

In some embodiments, the system includes an ultrasonic sensor. In some embodiments, the ultrasonic sensor is configured to monitor and send signals to the controller regarding line conductor position. In some embodiments, the ultrasonic sensor is configured to measure position within a range up to 10 m. In some embodiments, ultrasonic sensor detection is not affected by environmental conditions such as fog, rain, snow. In some embodiments, the system includes a radar sensor. In some embodiments, the radar sensor is configured to monitor and send signals to the controller regarding line conductor position in a range up to 100 m. In some embodiments, radar sensor detection is not affected by environmental conditions such as fog, rain, snow. In some embodiments, the system includes a weather sensor (e.g., an Anemoscope or other weather sensors). In some embodiments, the weather sensor is configured to measure wind speed and/or direction.

Figure 22:
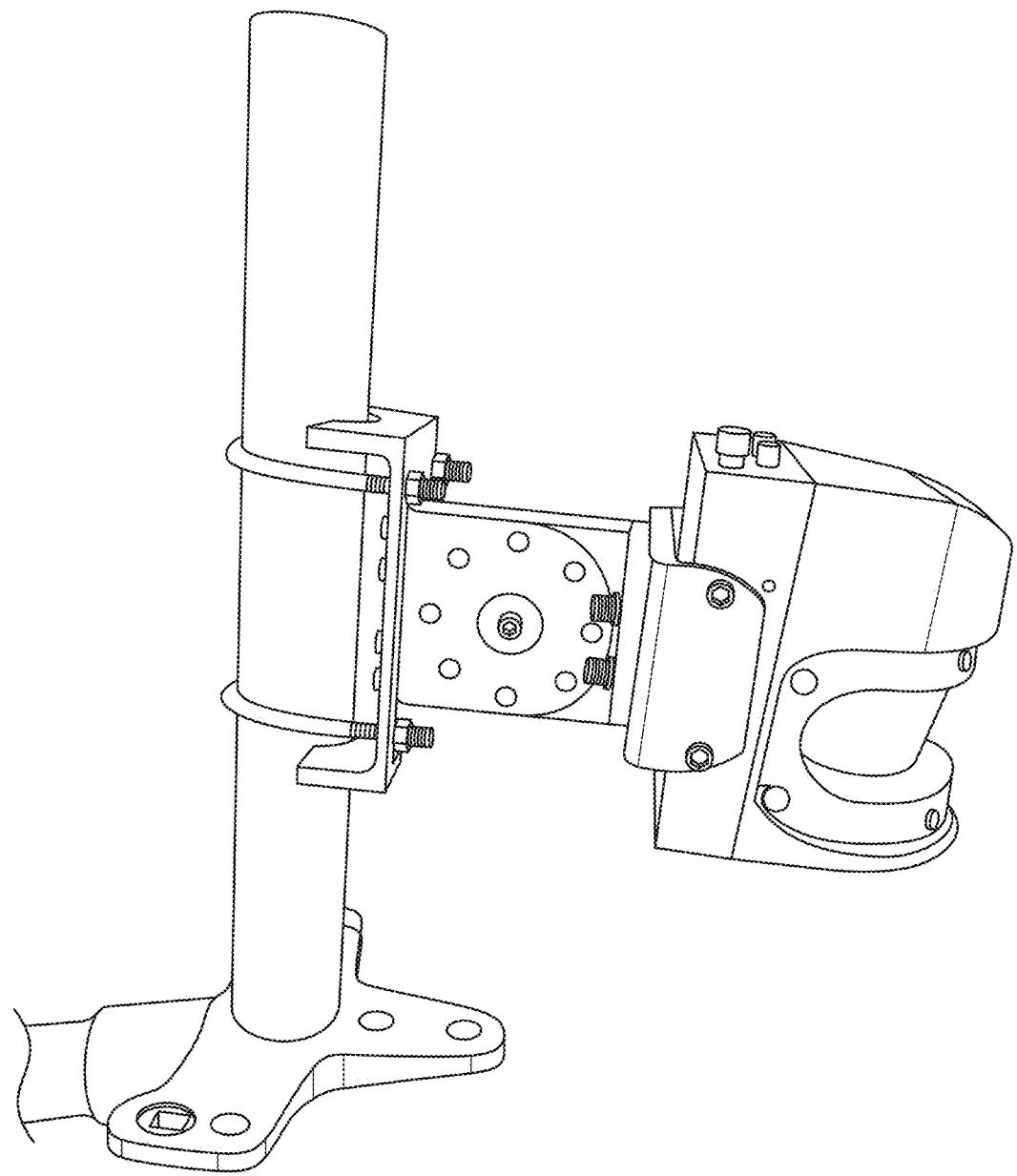
FIG. 22 illustrates a custom LiDAR bracket according to some embodiments.

In some embodiments, the system includes one or more brackets. In some embodiments, one or more brackets include articulating brackets configured to provide sensor adjustability. In some embodiments, brackets used to secure one or more sensors and/or control boxes to a utility structure comprise various angles and articulation points that are not available in the current marketplace. In some embodiments, one or more brackets comprise one or more adjustable sections configured to enable one or more sensors to be directed in any direction. FIG. 22 illustrates a custom LiDAR bracket according to some embodiments.

Figure 23:
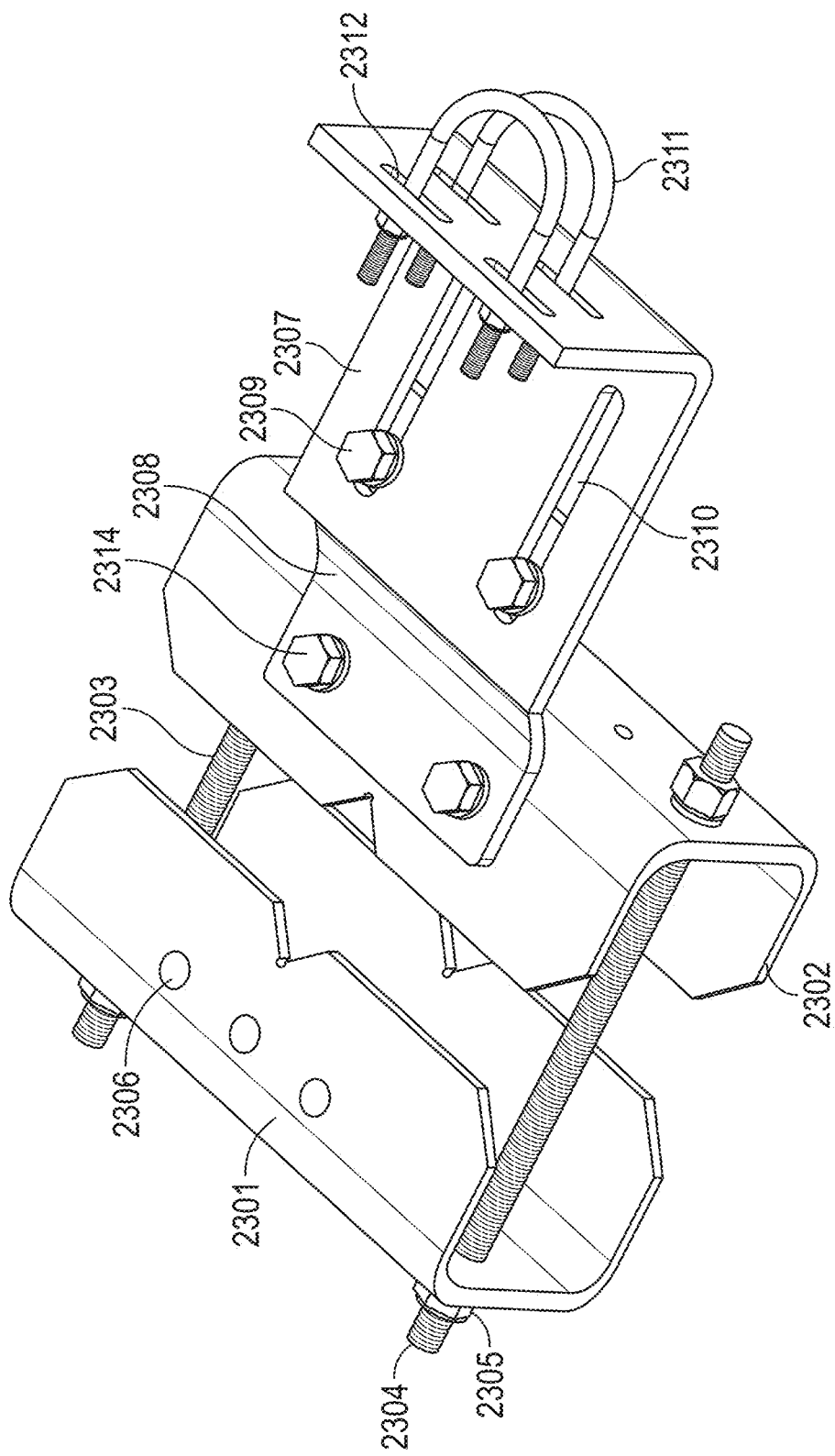
FIG. 23 shows a non-limiting example clamping bracket according to some embodiments.

In some embodiments, a bracket includes a first half clamp 2301 and a second half clamp 2302. In some embodiments, the first half clamp 2301 is secured to the second half clamp 2302 by one or more adjustable half clamp fasteners 2303. In some embodiments, an adjustable half clamp fastener 2303 includes one or more threaded rods 2304 and/or one or more threaded nuts 2305. In some embodiments, one or more half clamps are configured to secure a clamping bracket to a utility structure (e.g., pole, tower, etc.) In some embodiments, one or more half clamps include one or more extension bracket mounts 2306. In some embodiments, one or more extension brackets 2308 are secured to one or more half clamps via one or more extension bracket fasteners 2314 (e.g., threaded nuts and bolts). In some embodiments, the extension bracket 2308 includes an adjustable platform 2307 configured to attach to an extension bracket 2308 via one or more adjustable platform fasteners 2309. In some embodiments, the adjustable platform 2307 includes one or more platform slots 2310 configured to enable the adjustable platform 2307 to move toward and/or away from one or more half clamps. In some embodiments, the adjustable platform 2307 is configured to be guided by the one or more adjustable platform fasteners 2309 within the one or more platform slots 2310. In some embodiments, the adjustable platform 2307 includes one or more support structure mounts 2311 (e.g., pole, conduit mounts). In some embodiments, the adjustable platform 2307 includes one or more support structure slots 2312 configured to couple to the one or more support structure mounts 2311. In some embodiments, the one or more support structure slots 2312 are configured to enable the one or more support structure mounts 2311 to move parallel to one or more half clamps and/or perpendicular to the adjustable platform 2307. FIG. 23 shows a non-limiting example clamping bracket according to some embodiments.

Figure 24:
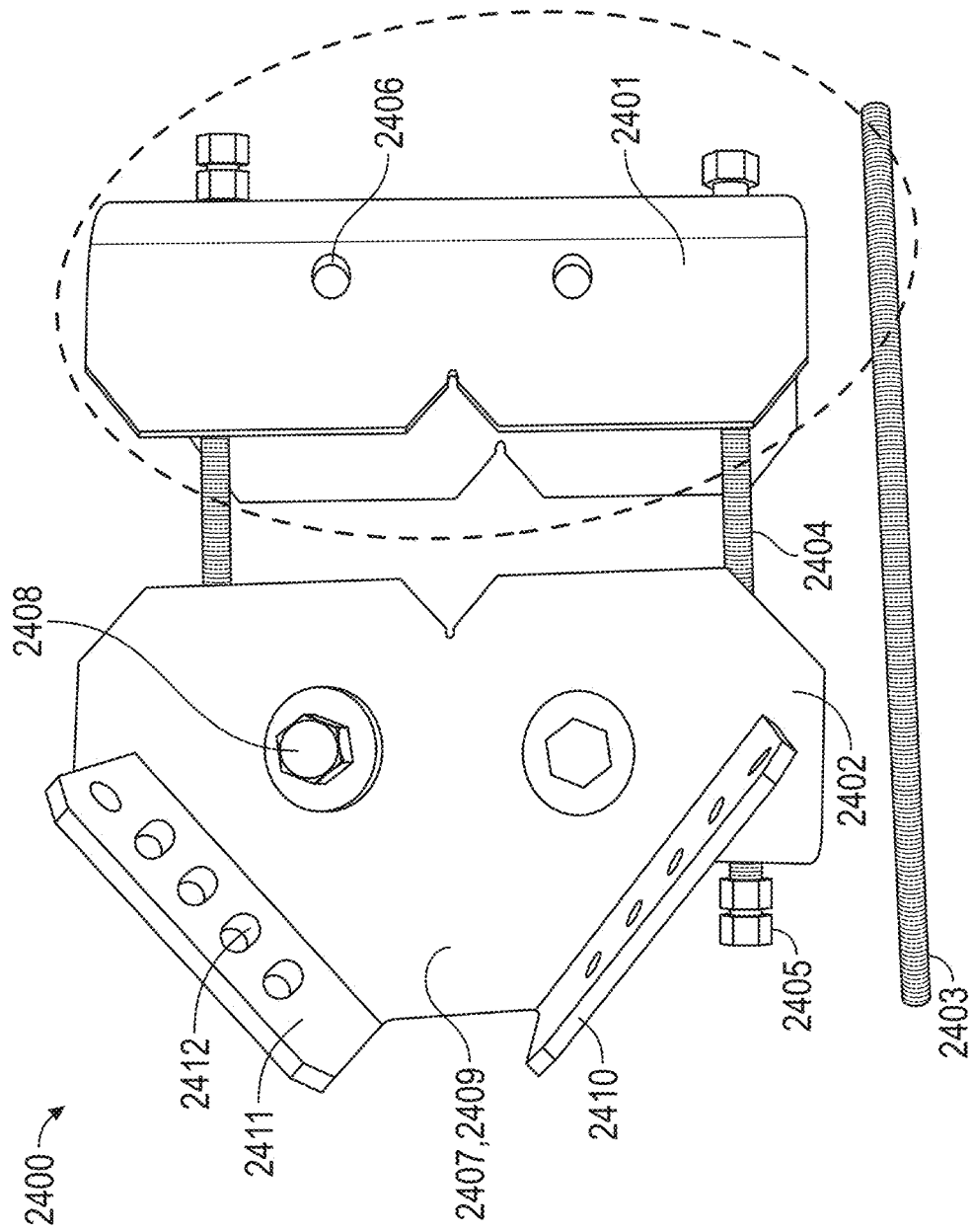
FIG. 24 shows another non-limiting example clamping bracket 2400 according to some embodiments.

FIG. 24 shows another non-limiting example clamping bracket 2400 according to some embodiments. In some embodiments, a bracket includes a first half claim 2401 and a second half clamp 2402. In some embodiments, the first half clamp 2401 is secured to the second half clamp 2402 by one or more adjustable half clamp fasteners 2403. In some embodiments, an adjustable half clamp fastener 2403 includes one or more threaded rods 2404 and/or one or more threaded nuts 2405. In some embodiments, one or more half clamps include one or more extension bracket mounts 2406. In some embodiments, one or more extension brackets 2407 are secured to one or more half clamps via one or more extension bracket fasteners 2408 (e.g., threaded nuts and bolts). In some embodiments, an extension bracket 2407 includes a control box mount 2409 configured to couple to one or more control boxes. In some embodiments, the control box mount includes a first wall mount 2410 and a second wall mount 2411.

In some embodiments, the first wall mount 2410 extends away from the one or more extension bracket mounts 2406. In some embodiments, the first wall mount 2410 and the second wall mount 2411 are arranged on the control box mount 2409 at an angle relative to each other. In some embodiments, the angle is between 30 and 60 degrees. In some embodiments, the first wall 2410 mount and/or the second wall mount 2411 comprise one or more wall mount slots 2412. In some embodiments, the one or more wall mounts slots are configured to enable a fastener to secure the first wall mount and/or the second wall mount to a control box (e.g., a control box wall).

Figure 25:
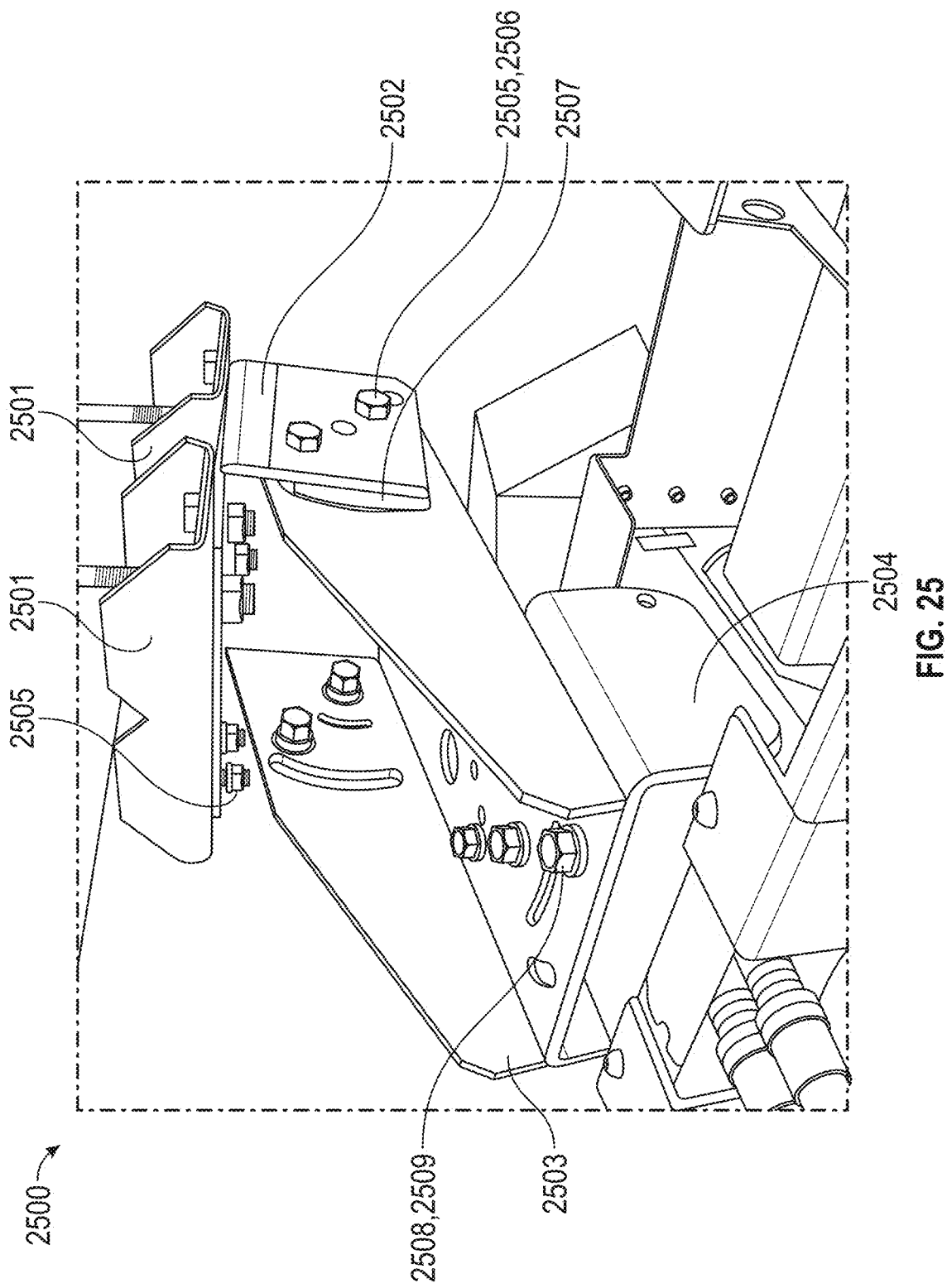
FIG. 25 shows a non-limiting example articulating bracket according to some embodiments.

In some embodiments, an articulating bracket 2500 includes one or more utility structure clamps 2501, an articulating base 2502, an articulating arm 2503, and/or an articulating sensor mount 2504. In some embodiments, the one or more utility structure clamps 2501 include one or more utility structure mounts 2505 configured to couple to one or more utility structure fasteners (e.g., threaded u-rings and nuts). In some embodiments, the one or more utility structure fasteners are configured to couple the utility structure clamps 2501 (and the articulating brackets) to a utility structure. In some embodiments, the utility structure clamps 2501 are configured to couple to the articulating base 2502 using one or more base fasteners (e.g., nuts and bolts). In some embodiments, the articulating base 2502 is configured to couple to the articulating arm 2503. In some embodiments, the articulating base 2502 is configured to enable the articulating arm 2503 to rotate about a pivot point 2505. In some embodiments, the pivot point includes one or more arm fasteners 2506. In some embodiments, the articulating arm 2503 is configured to be held in a rotated position by one or more base fasteners 2506. In some embodiments, the articulating arm comprises one or more curved slots 2507. In some embodiments, the one or more curved slots 2507 are configured to guide the rotation of the articulating arm 2503. In some embodiments, one or more base fasteners 2506 are configured to interface with the one or more curved slots 2507 to guide the rotation of the articulating arm 2503. In some embodiments, the articulating arm 2503 is configured to couple to the sensor mount 2504 via one or more sensor mount fasteners. In some embodiments, the articulating arm 2503 is configured to enable the sensor mount 2504 to rotate. In some embodiments, one or more pivot points 2508 on the articulating arm and/or one or more curved slots are configured to interface with one or more sensor mount fasteners 2509 (e.g., nuts and bolts) to guide the sensor mount rotation. In some embodiments, the sensor mount 2504 is configured to be locked into position using one or more sensor mount fasteners 2509. FIG. 25 shows a non-limiting example articulating bracket according to some embodiments.

Figure 26:
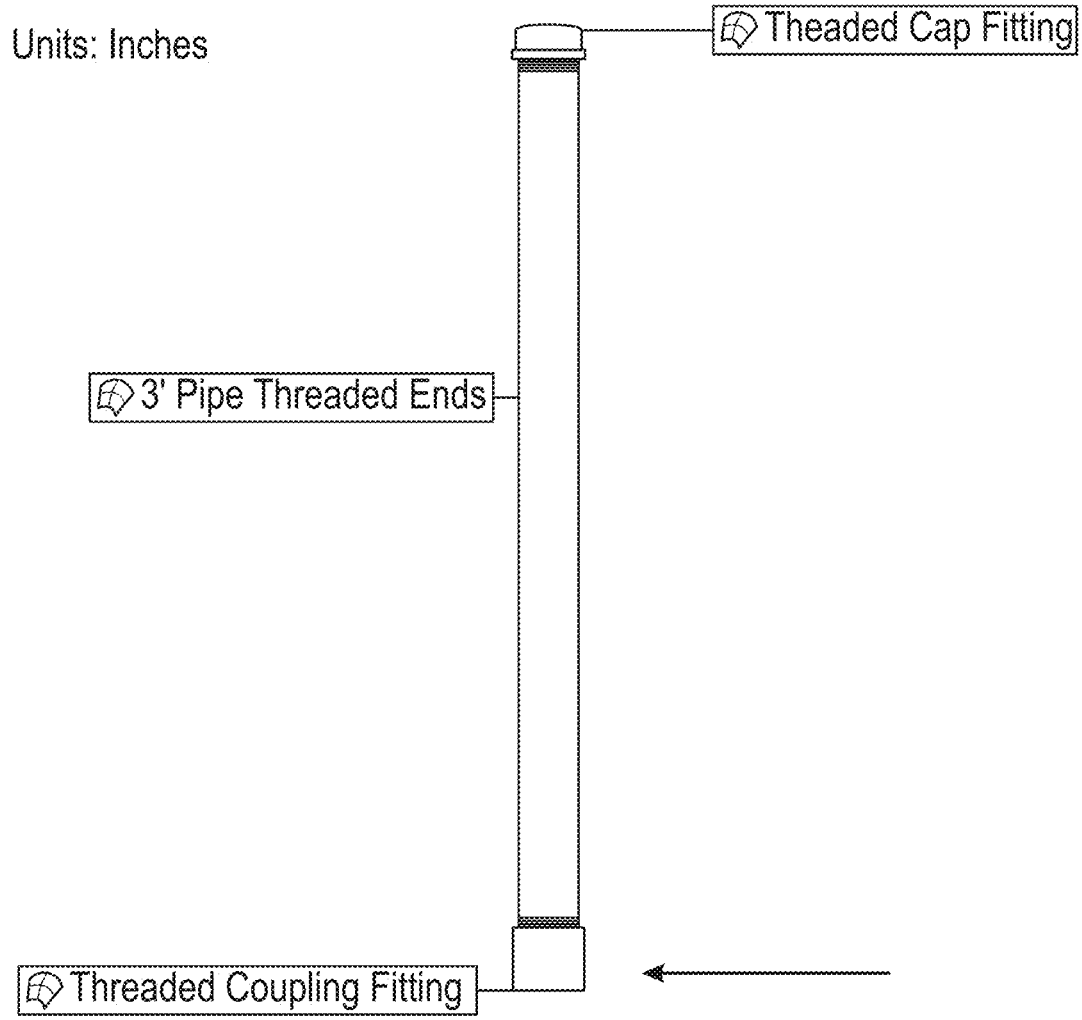
FIG. 26 shows non-limiting examples of an antenna mount configured to secure one or more brackets in position according to some embodiments.
Figure 27:
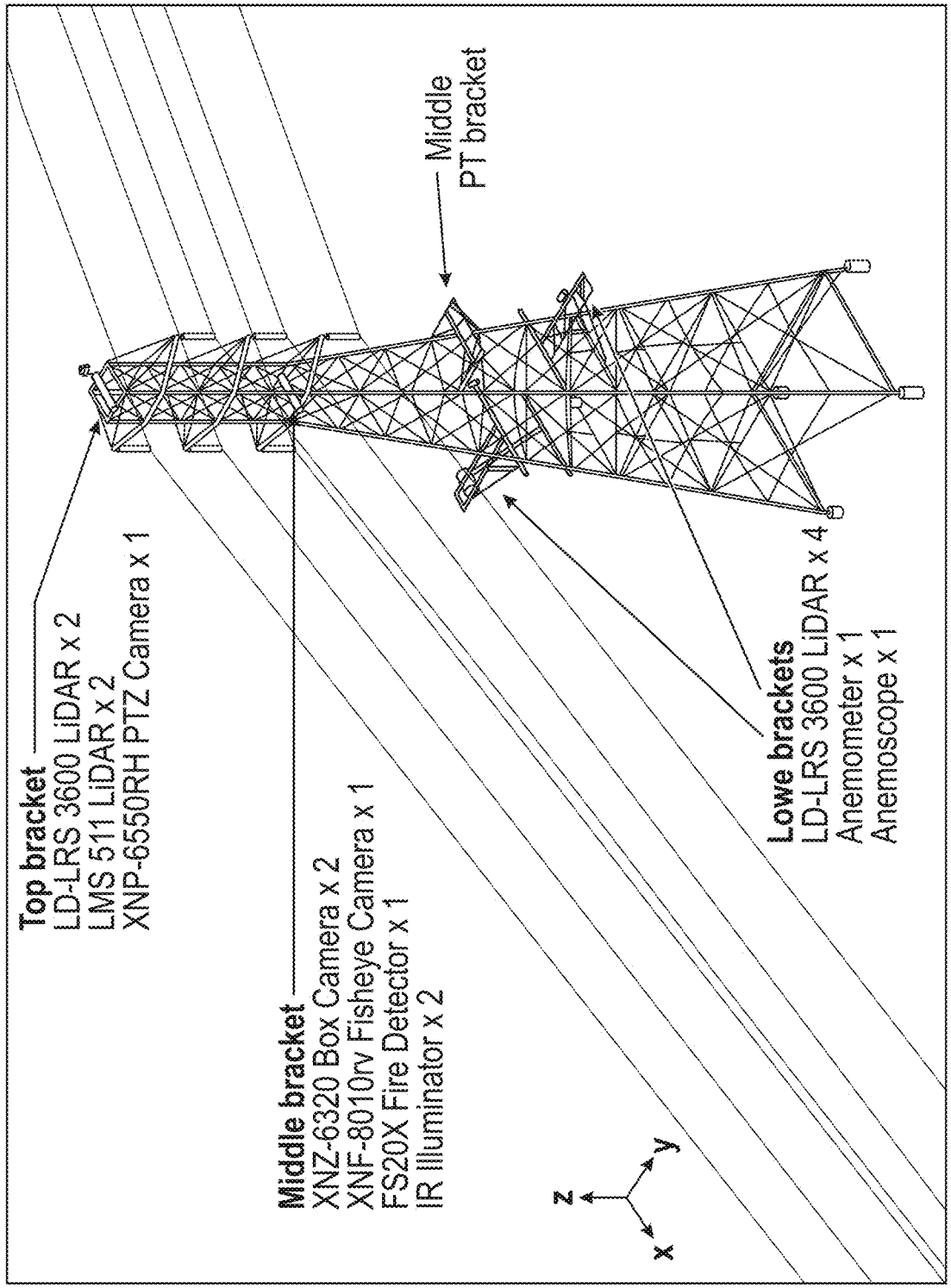
FIG. 27 shows one or more brackets deployed on a utility structure in the form of a transmission tower according to some embodiments.

In some embodiments, system components include one or more sensors, mounting brackets and/or pole (any reference to a specific type of mounting structure, e.g., pole, is also a reference to a general mounting structure), wiring harness, and control boxes. In some embodiments, the sensors are placed on a mounting structure and/or positioned based on their application with specially designed bracketry that allows full range of motion for optimal positioning to provide maximum coverage for detection. In some embodiments, one or more brackets are configured to mount on a single mounting structure configured be installed on a PG&E asset (e.g., transmission tower or distribution pole), allowing for quick installations and removals. FIG. 26 shows non-limiting examples of an antenna mount configured to secure one or more brackets in position according to some embodiments. FIG. 27 shows one or more brackets deployed on a utility structure in the form of a transmission tower according to some embodiments.

In some embodiments, the system includes one or more control boxes. In some embodiments, the control box houses one or more of the controller, networking, communications, and electrical equipment, providing protection to these sensitive components from extreme environments. In some embodiments, one or more control boxes are configured to provide temperature control for the equipment it houses, ensuring they remain within their operating temperature. In some embodiments, one or more control boxes include transmission control boxes are sized larger to accommodate the higher number of sensors, and/or distribution control boxes sized smaller due to their lower number of sensors and to reduce weight which reduces loading on wood poles.

In some embodiments, one or more control boxes receive 120 VAC from potential transformers and/or use power supply units to provide 24 VDC power to its components and to the sensors. In some embodiments, A backup power supply (e.g., battery system) provides auxiliary (e.g., up to 72 hours) of backup power to one or more sensors during power outage events. In some embodiments, each control box version progressively improves reliability through upgrades to their electrical and protection components based on lessons learned from previous versions.

Figure 28:
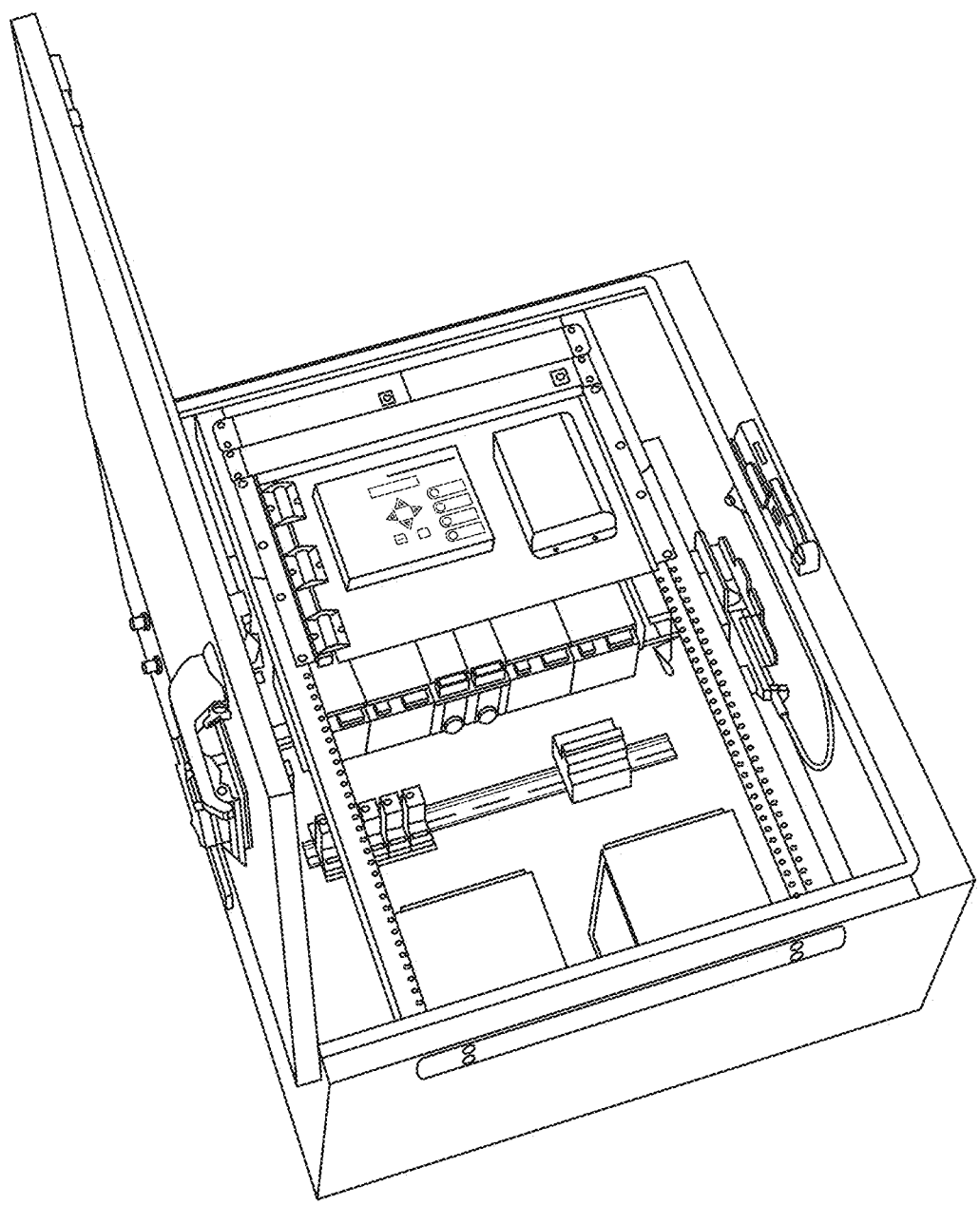
FIG. 28 illustrates a non-limiting example control box according to some embodiments.
Figure 29:
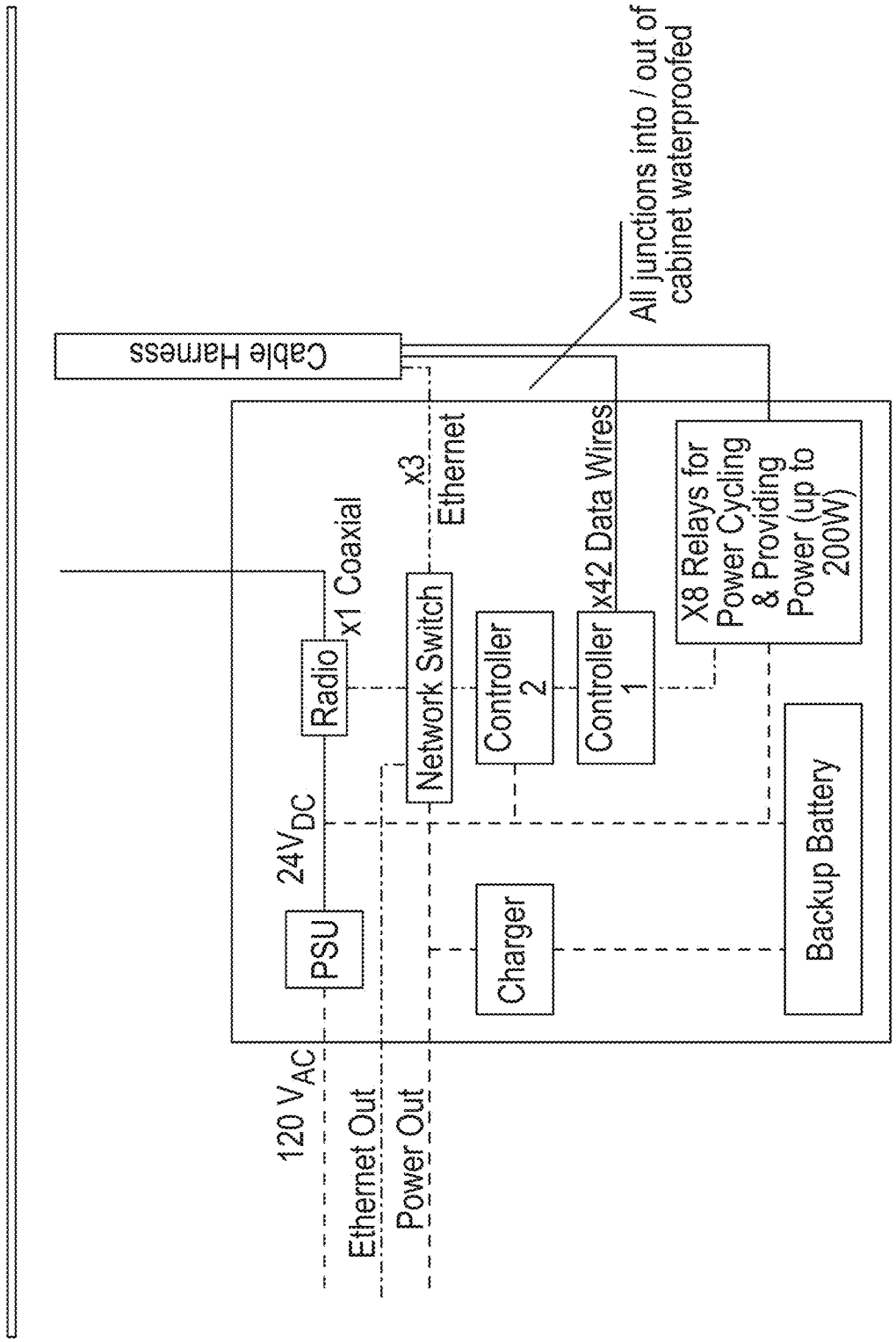
FIG. 29 shows a non-limiting example control box diagram according to some embodiments.

In some embodiments, one or more control boxes are optimized for the large quantity of sensors installed on transmission towers, with, as a non-limiting example, 42 digital Inputs and 8 analog inputs. In some embodiments, one or more control boxes are configured to enable more than 1 monitoring field per sensor, an increased 4-6 monitoring fields per sensor, and health monitoring of one or more sensors. FIG. 28 illustrates a non-limiting example control box according to some embodiments. FIG. 29 shows a non-limiting example control box diagram according to some embodiments.

In some embodiments, a control box includes networking equipment to process the signals from each sensor and communicate with each sensor from a remote location (e.g., substation). In some embodiments, a control box is positioned at the base of a transmission tower/distribution pole and receives/processes the signals from one or more sensors listed herein and communicates those signals back to a substation (in the case of transmission implementation) or through the SCADA network (for distribution implementations). In some embodiments, upon detection, the sensors send output signals to the controller, which uses programmed logic to determine whether a warning or trip signal is sent to SCADA systems for operator intervention. In some embodiments, the controller is configured to providing information on what has been detected as well as the location at which the detection occurred.

In some embodiments, the system includes communication infrastructure. In some embodiments, the communication infrastructure includes wireless and or wired communication systems. In some embodiments, one or more utility structure (e.g., towers, poles) sensors communicate via hard wires to the local control box. In some embodiments, the system includes one or more of a control relay, network switch gear, and a radio transmitter. In some embodiments, the system includes a control relay that processes the signals within network switch gear and a radio transmitter for one or more locations depending on the environment. In some embodiments, the system includes various wireless communications such as microwaves, FAN (Field Area Networks), 900-MHz public frequencies, and cellular.

In some embodiments, the system includes two separate communication networks: 1) SEL communications network used to transmit system signals from one or more transmission towers to a substation and/or into a system SCADA network, and 2) PSC communications network used to provide internet connectivity for cameras. In some embodiments, the SEL communications network includes a SEL 3060A 900 MHz radio and employs a primary-secondary cluster design in which towers with direct line-of-sight to the substation act as primary towers for communications. In some embodiments, towers with line-of-sight to other primary towers can serve as primary towers. In some embodiments, secondary towers that have no direct link to the substation rely on the primary tower as a bridge to the substation. In some embodiments, the system is configured to utilize point-to-multipoint communication, where a primary tower is configured to bridge the data from all secondary towers within its cluster, allowing full system communication back to the substation despite a challenging and irregular terrain.

In some embodiments, the system is configured to identify one or more towers that have lost communication. In some embodiments, one or more cameras are on a different communication network than one or more other sensors. As a non-limiting example, Digital Path's camera network is completely separated from SEL's communications pathways, so the cameras will remain available for Operators to perform inspections on the transmission line in real-time.

In some embodiments, a communications network includes one or more DIGI cellular radio and point-to-multipoint radios to transmit sensor signals from a utility structure to one or more distribution servers. In some embodiments, a communication network includes cloud bridge to cellular radio communications to provide connectivity for camera use with one or more servers.

In some embodiments, sensor signals are transmitted to one or more servers by a cellular radio. In some embodiments, one or more distribution poles include a DIGI radio transmitting data via, as a non-limiting example 4G LTE cellular communications. In some embodiments, in environments where cellular coverage is limited or unavailable, the system includes a point-to-multipoint communications topology will be used whereby the secondary poles will communicate with the primary pole through radio-to-radio communication, and the primary pole will communicate with the distribution servers via 4G cellular communication.

In some embodiments, a communications network includes one or more primary towers and/or one or more secondary towers. In some embodiments, the one or more primary towers are configured to communication with one or more secondary towers, system servers, SCADA systems, and/or other primary towers. In some embodiments, one more secondary towers are configured to communication with one or more other secondary towers and/or one or more primary towers. In some embodiments, one or more secondary towers are configured to communication with two or more primary towers. In some embodiments, one or more secondary towers are configured to communicate with one or more primary towers via one or more other secondary towers. In some embodiments, one or more primary towers are configured to communicate with one or more other primary towers via one or more secondary towers. In some embodiments, this arrangement creates an overlapping communication network configured to enable communication of one or more primary and/or secondary towers upon loss of communication to one or more primary and/or secondary towers.

Figure 30:
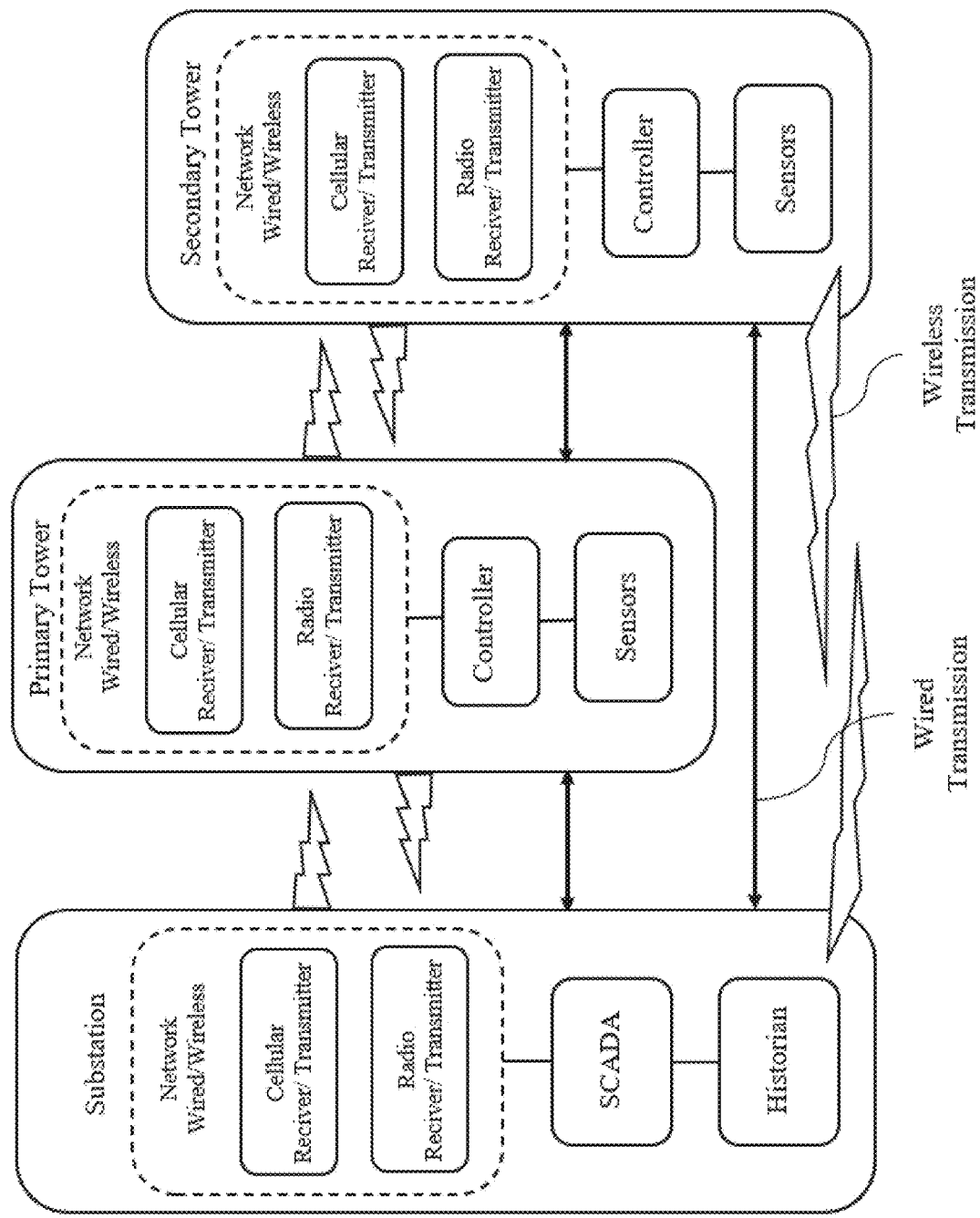
FIG. 30 shows a non-limiting example communication relay overview according to some embodiments.
Figure 31:
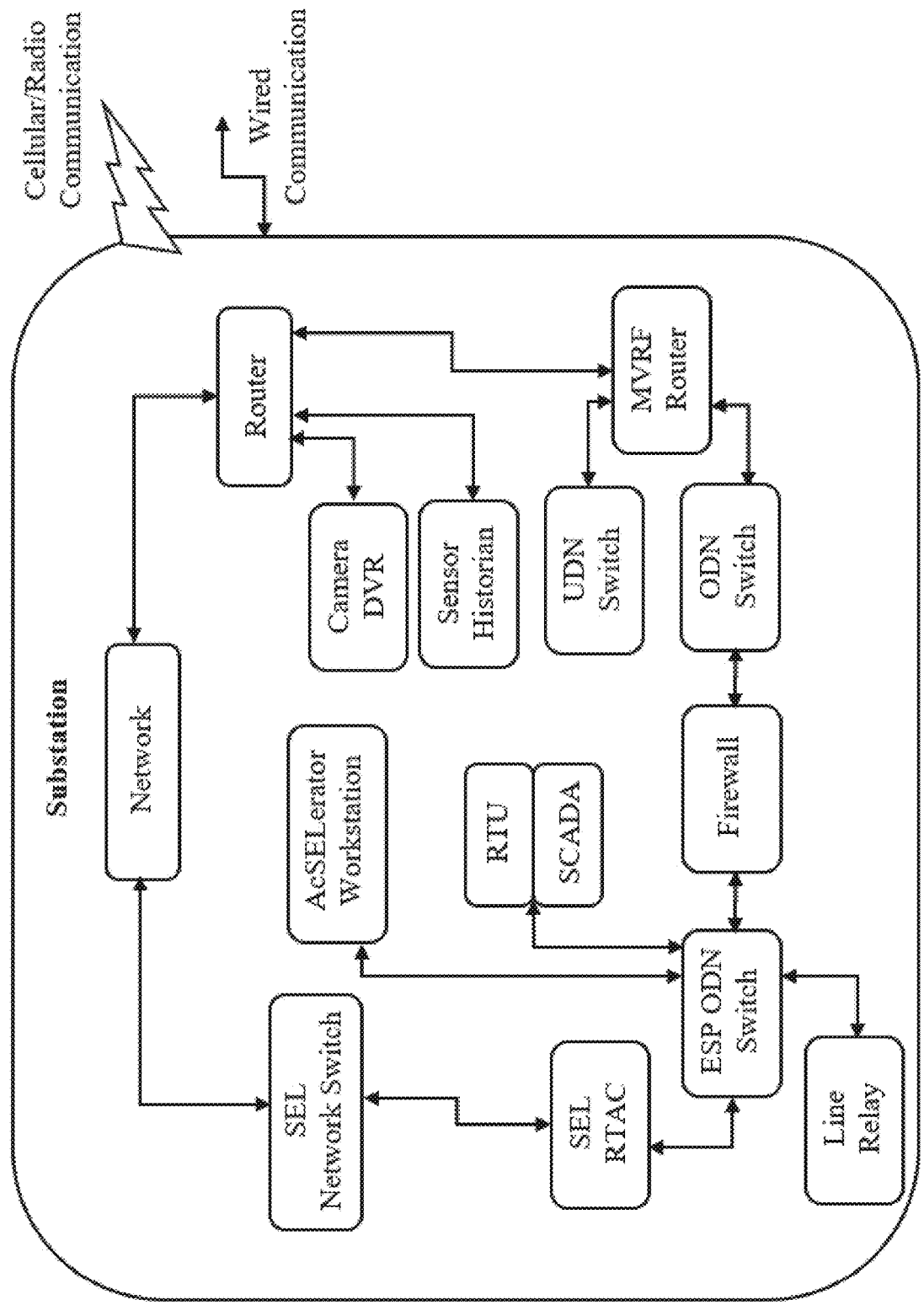
FIG. 31 shows illustrates a non-limiting arrangement of system components within a substation according to some embodiments.
Figure 32:
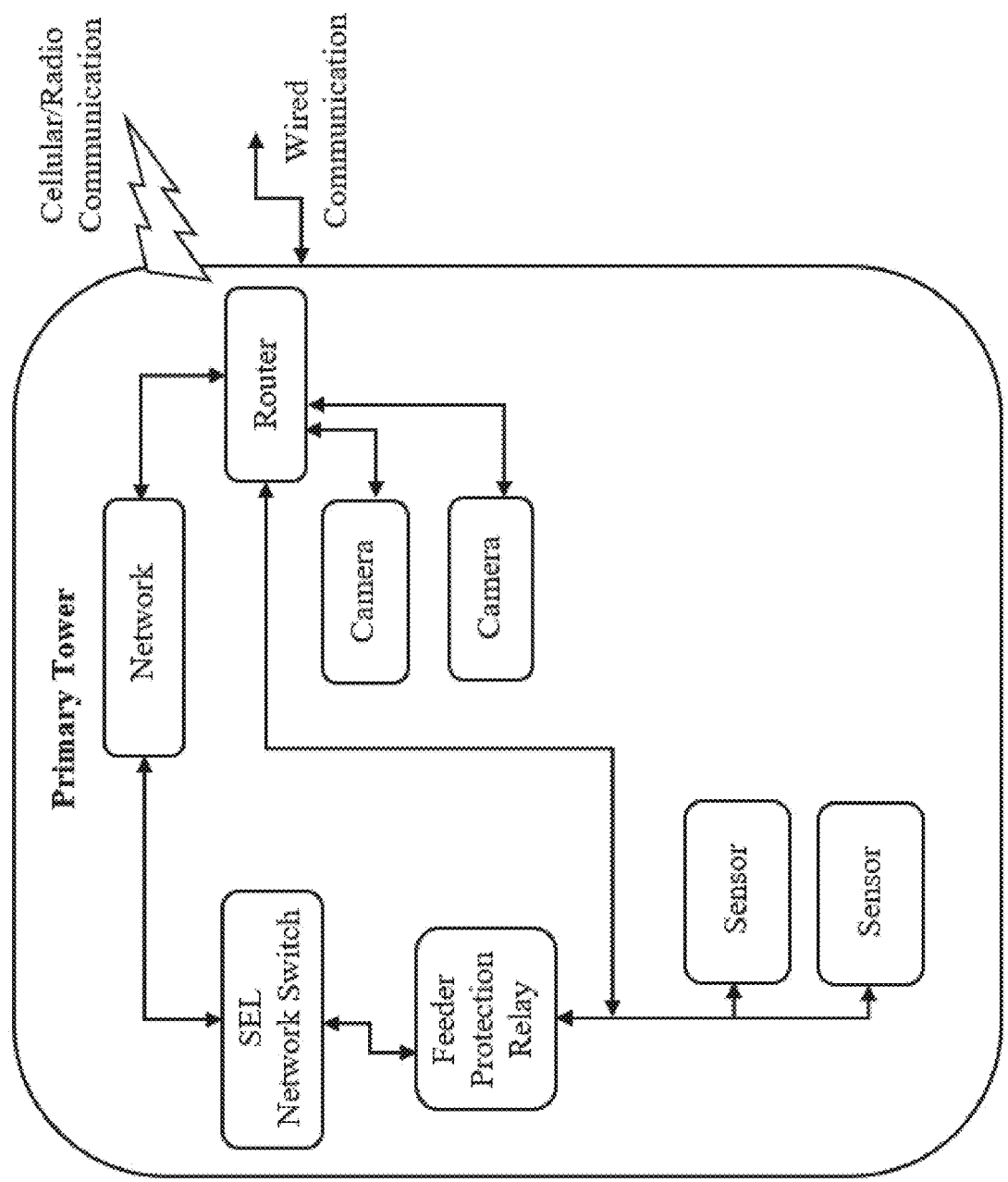
FIG. 32 shows a non-limiting example of system components withing a primary tower according to some embodiments.
Figure 33:
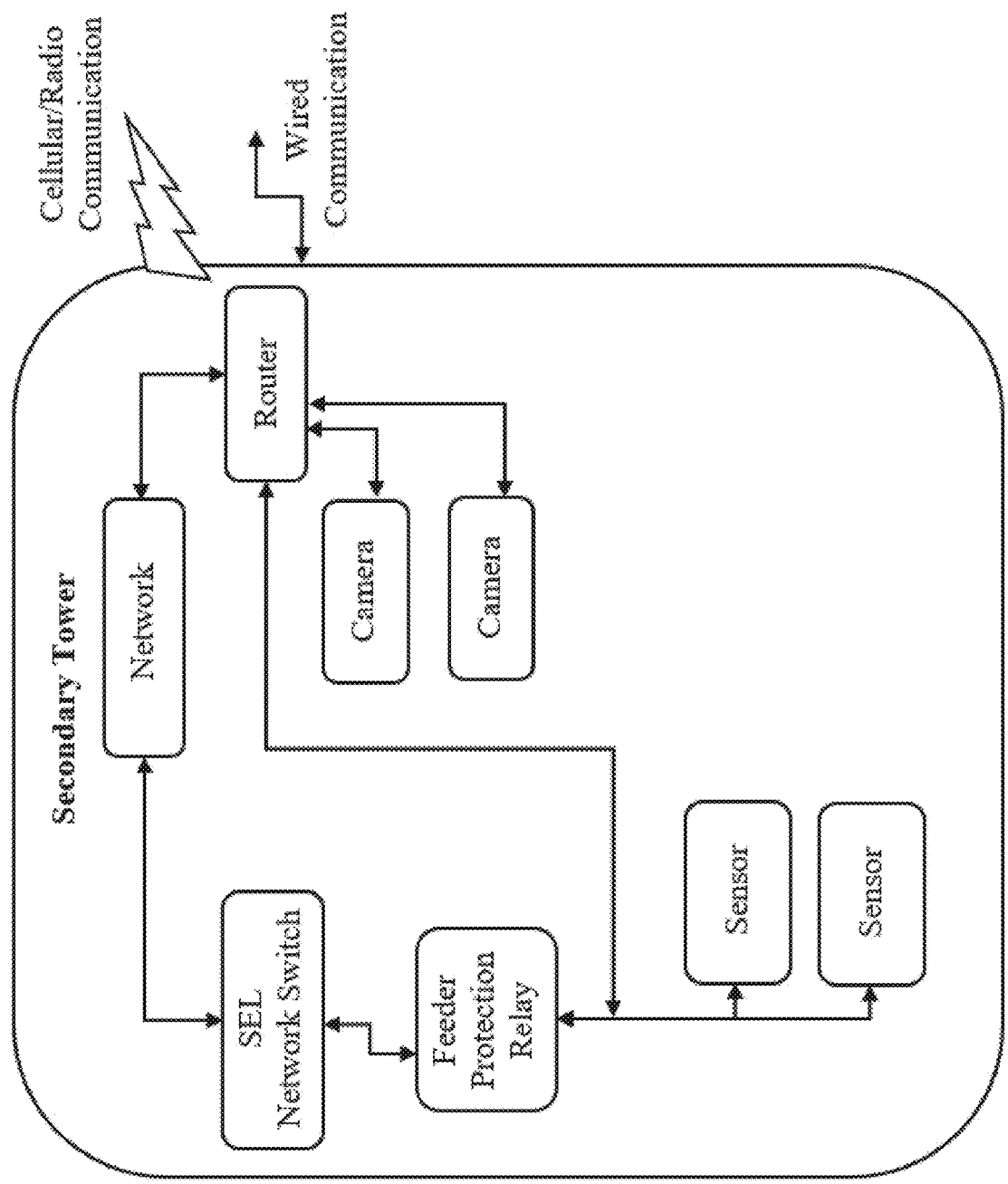
FIG. 33 shows a non-limiting example of system components withing a secondary tower according to some embodiments.
Figure 34:
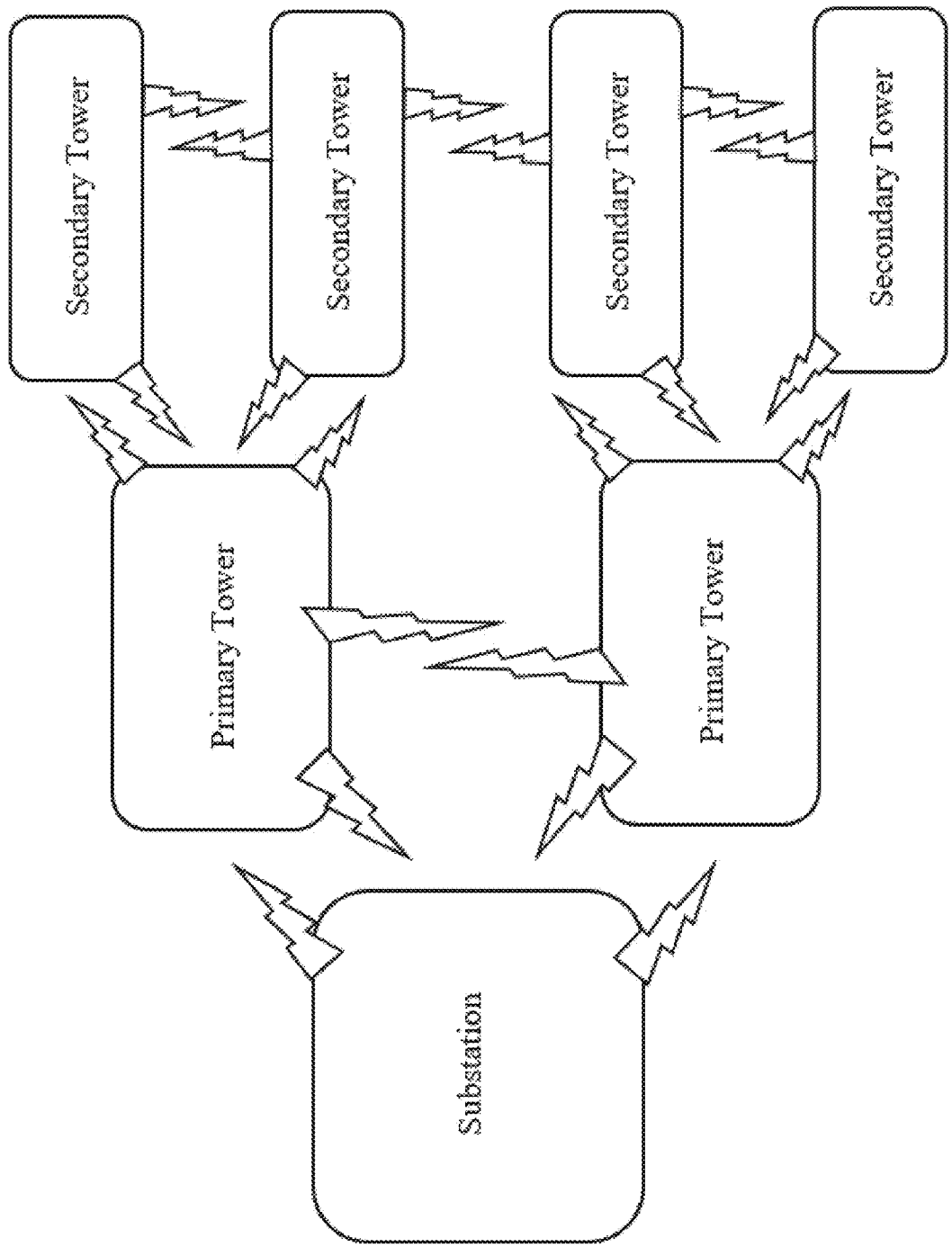
FIG. 34 shows a non-limiting wireless communication arrangement between a substation, primary towers, and secondary towers according to some embodiments.
Figure 35:
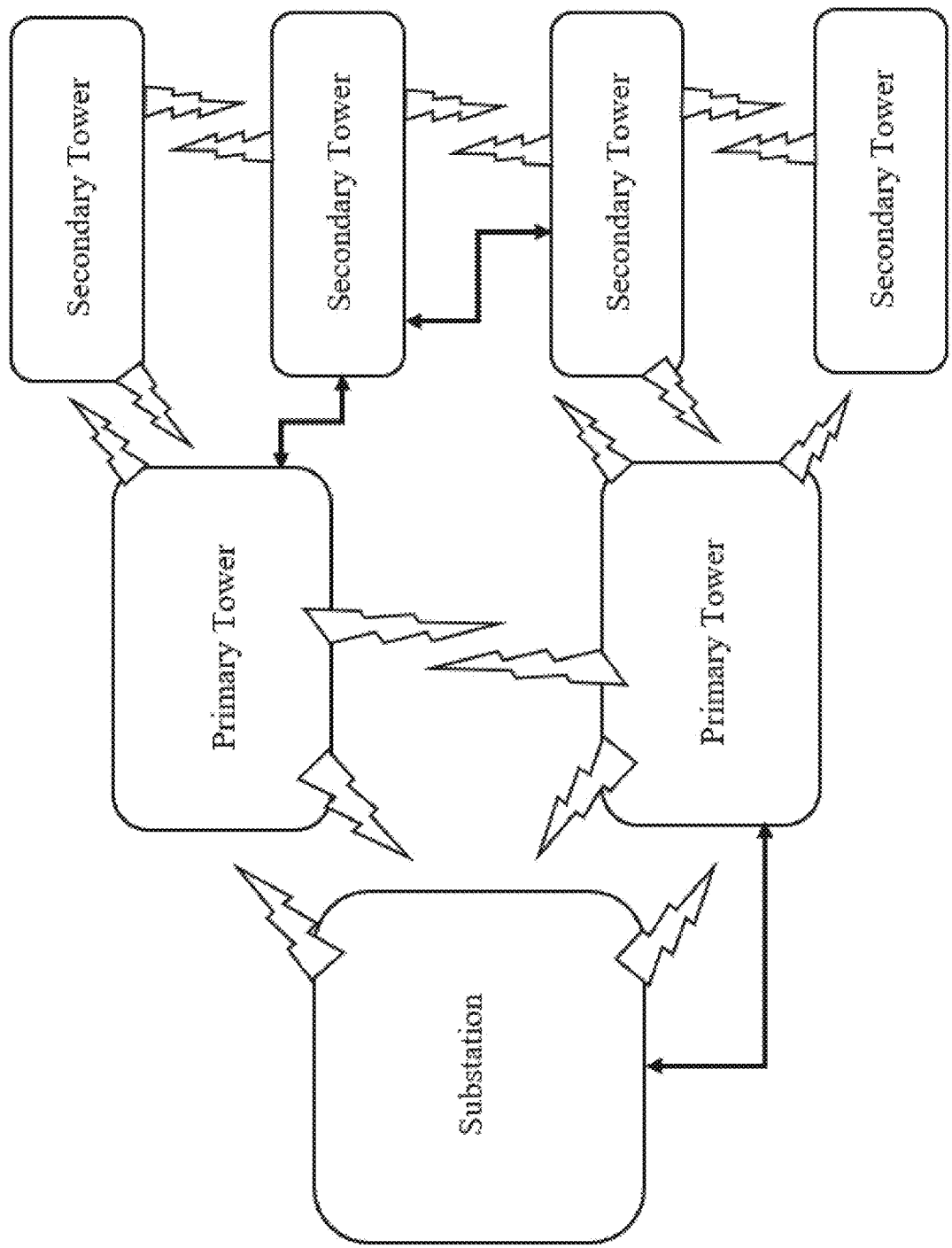
FIG. 35 shows a non-limiting wired and wireless communication arrangement between a substation, primary towers, and secondary towers according to some embodiments.

FIG. 30 shows a non-limiting example communication relay overview according to some embodiments. In some embodiments, the substation is in communication with a primary and/or secondary tower through a wired and/or wireless connection. FIG. 31 shows illustrates a non-limiting arrangement of system components within a substation according to some embodiments. FIG. 32 shows a non-limiting example of system components withing a primary tower according to some embodiments. FIG. 33 shows a non-limiting example of system components withing a secondary tower according to some embodiments. FIG. 34 shows a non-limiting wireless communication arrangement between a substation, primary towers, and secondary towers according to some embodiments. FIG. 35 shows a non-limiting wired and wireless communication arrangement between a substation, primary towers, and secondary towers according to some embodiments. In some embodiments, these non-limiting examples are not intended to be all inclusive of communication arrangements but are instead intended to illustrate that wired and/or wireless communication can be established between multiple utility structures such that a loss of one communication channel will not result in a complete loss of signals from one or more towers.

Figure 37:
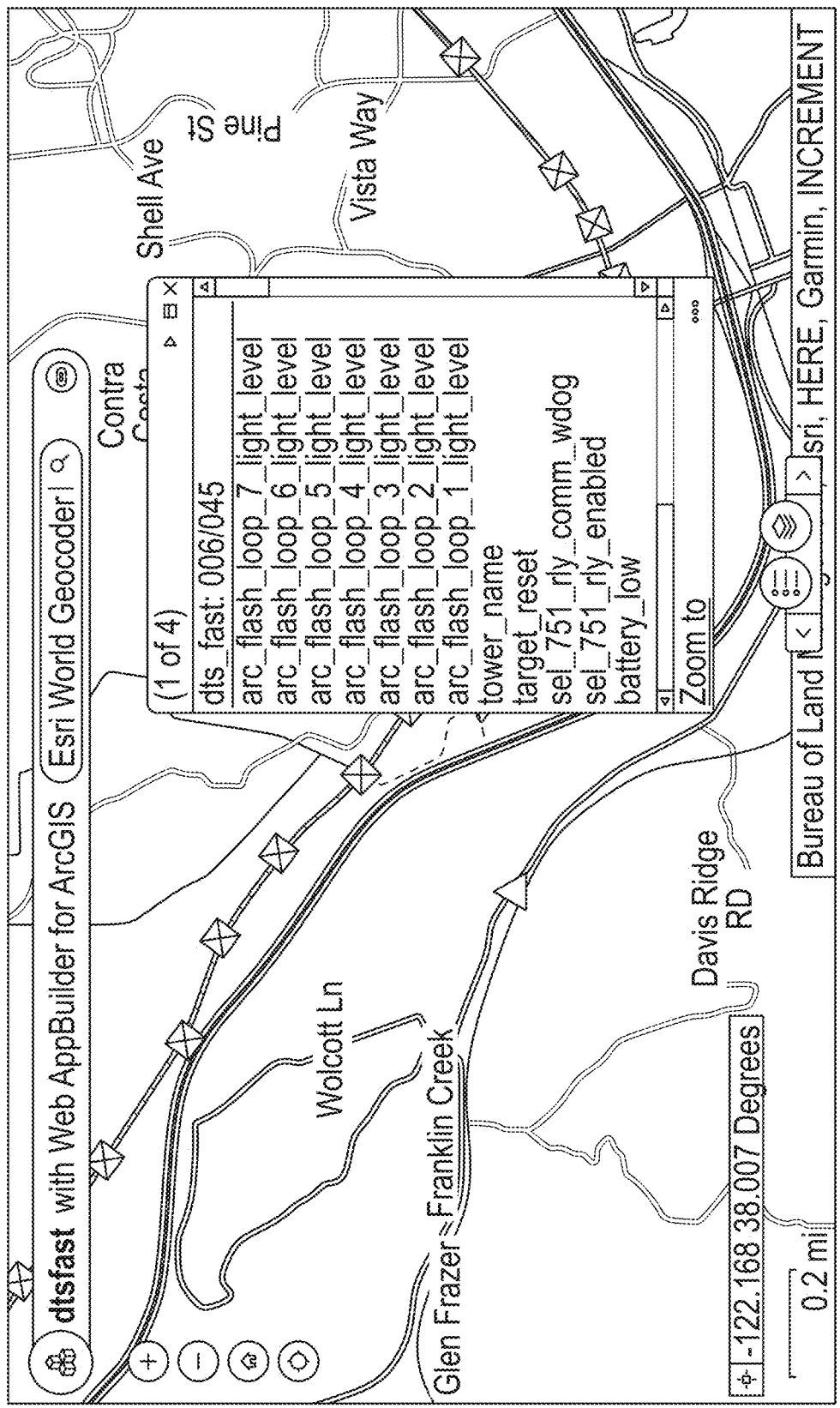
FIG. 37 shows a non-limiting example of real time SCADA telemetry according to some embodiments.

In some embodiments, all system data flows securely. In some embodiments, one or more signals from one or more sensors are transmitted to a substation and/or server as read only data. In some embodiments, the system is configured to transmit the read only data to a SCADA or EMS and then leverage enterprise servers to transmit to (PI) data historian for data analysis and storage. In some embodiments, the data historian comprises program instruction configured to implement (near real time) notifications and/or operational situational awareness. In some embodiments, the system includes Web and mobile applications configured to generate a display (e.g., PI Visions) to enable field operators to access one or more sensor feeds, stored data, and/or analyzed data. FIG. 36 shows a sample PI Vision display according to some embodiments. FIG. 37 shows a non-limiting example of real time SCADA telemetry according to some embodiments.

Figure 38:
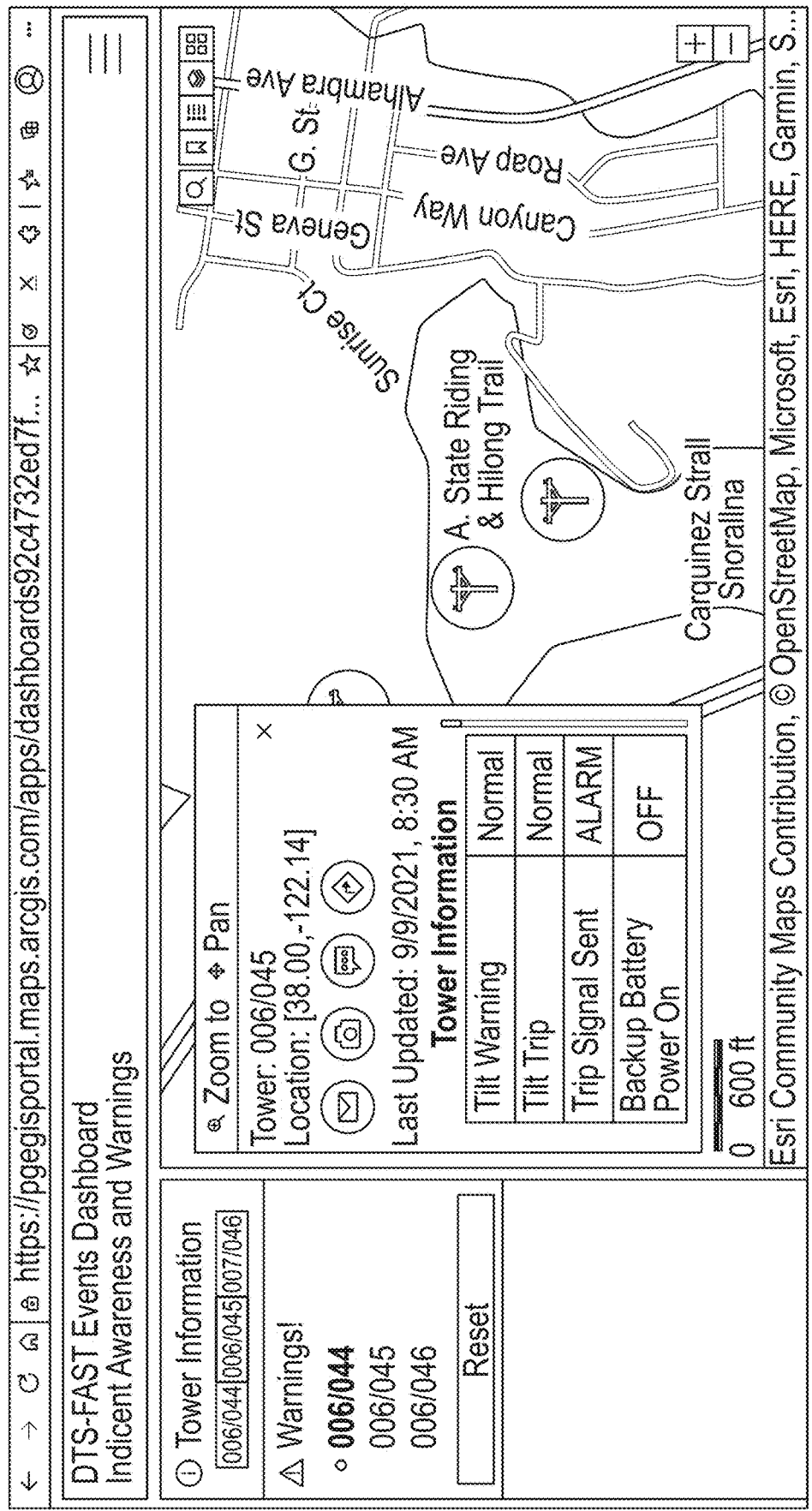
FIG. 38 shows a notifications dashboard according to some embodiments.

FIG. 38 shows a notifications dashboard according to some embodiments. In some embodiments, the system is configured to deliver alarm and/or warning notifications a mobile web application, email, and/or text. In some embodiments, the system includes artificial intelligence (AI) configured to identify changes in the environment and/or send out an alert when changes are detected. In some embodiments, the system is configured to enable an operator to classify an image as correct or incorrect. In some embodiments, the system is configured to use one or more classified images as training sets for the AI.

Figure 39:
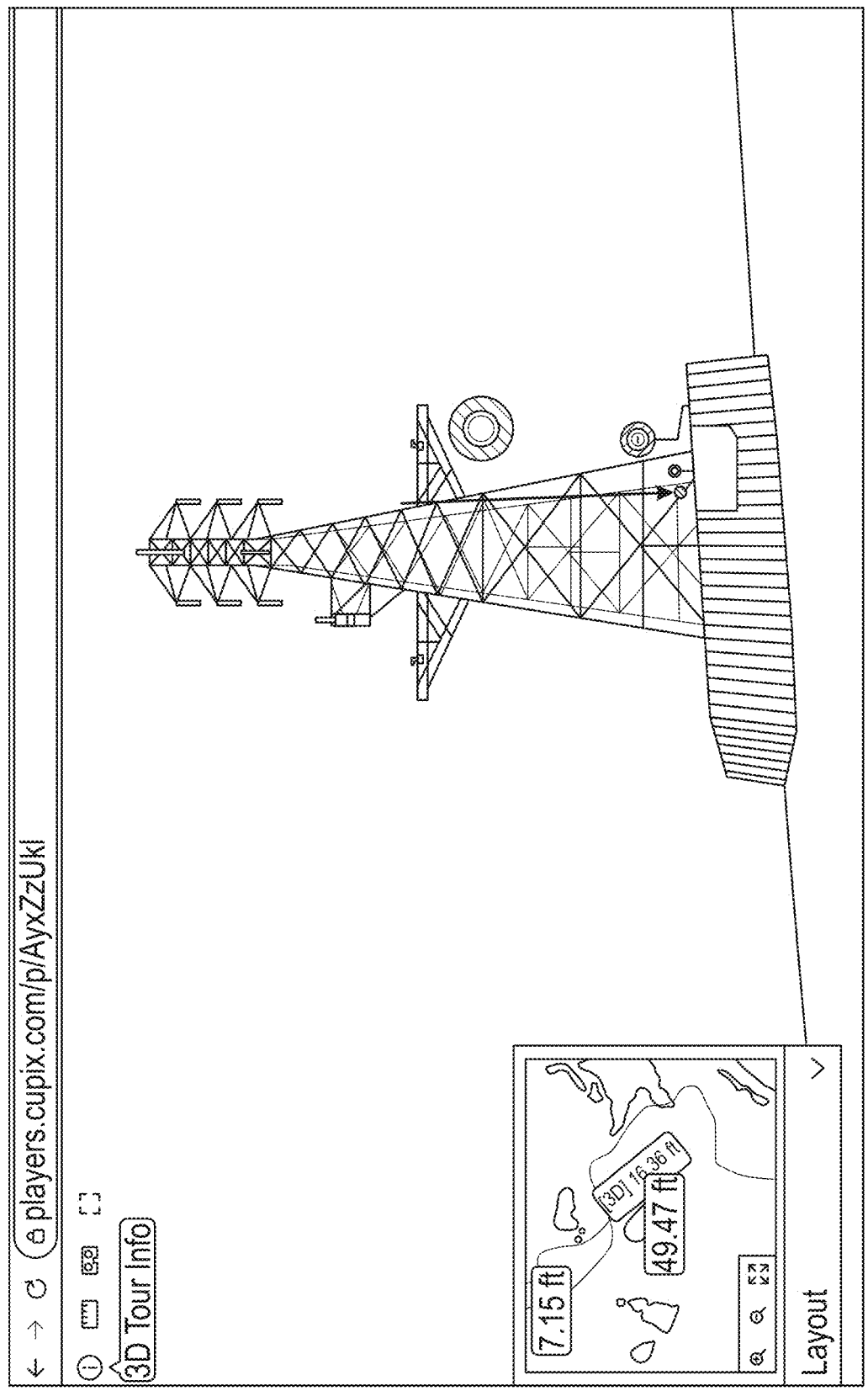
FIG. 39 shows a non-limiting example of a maneuverable virtual image according to some embodiments.

In some embodiments, the system includes a maneuverable virtual image of one or more utility structures and surrounding terrain. In some embodiments, the system Includes one or more scanned images of the utility structure and the surrounding terrain. In some embodiments, the one or more scanned images enable a user to have a 360° walking experience of the terrain. In some embodiment's, a maneuverable virtual image of one or more utility structures and surrounding terrain enable post construction situational awareness and operations. FIG. 39 shows a non-limiting example of a maneuverable virtual image according to some embodiments.

In some embodiments, the system includes one or more computers comprising one or more processors and one or more non-transitory computer readable media. In some embodiments, the one or more non-transitory computer readable media includes instructions stored there one that when executed by the one or more processors implement one or more instruction steps and/or computer configurations. In some embodiments, the programming instructions are configured to generate a three-dimensional (3D) image. In some embodiments, three-dimensional imaging is an essential aspect of the overall system design build and/or monitoring system. In some embodiments, accurate 3D renderings of each tower and pole structure are created using LiDAR geosystems scanning technologies. In some embodiments, these 3D renderings include accurate structural measurements with geospatial data for tower or pole's surrounding environment. This information is used for the following purposes: engineering structural analyses; wind and loading analyses; design planning and development; placement and positioning of sensors and equipment; configuration of sensor detection fields; and various other advanced applications. In some embodiments, due to the varying structure types on transmission and distribution lines, mounting structures and brackets for equipment positioning and support, as well as design builds and installations are customized for each structure type.

In some embodiments, the instructions are configured to generate a simulation platform that enables a user to virtually mockup devices on a pole/tower and identify any risks or issues. In some embodiments, the simulation platform is configured to enable a user to vary the placement of devices and/or the structure of a tower/pole. In some embodiments, instructions cause the computer to identify limitations in terms of field of view and/or interference with an articulation of a bracket, as non-limiting examples. In some embodiments, the three-dimensional simulation helps to expedite the overall design process.

Figure 40:
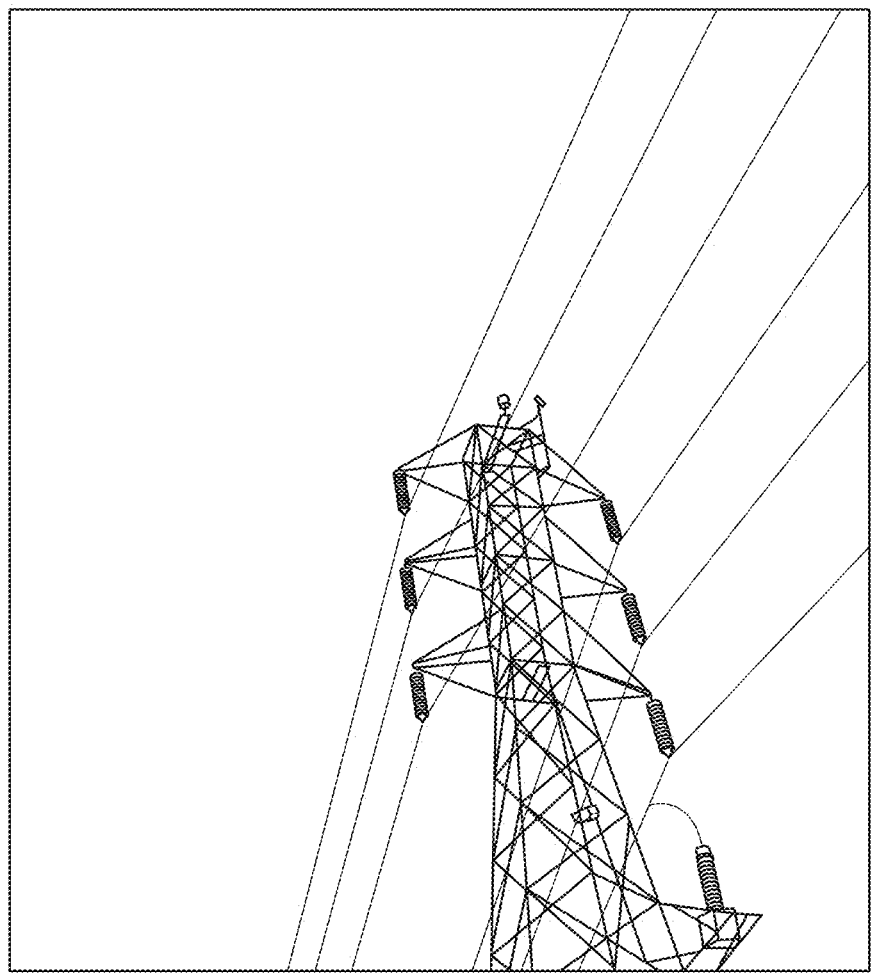
FIG. 40 depicts drone imaging according to some embodiments.

In some embodiments, the system includes one or more high fidelity cameras and/or drones to create a virtual tour which can be easily accessed through web browser and shared for collaboration with internal and external team members. In some embodiments, the system includes a 360° virtual capture of a tower which drastically reduces jobsite visits. In some embodiments, the system is configured to generate a 3D rendering of a utility structure and its surrounding environment based on the virtual capture. FIG. 40 depicts drone imaging according to some embodiments.

In some embodiments, the virtual capture includes a surrounding area and/or route to the utility structure. In some embodiments, the system is configured to identifying vegetation that obstructed access roads and staging areas within the virtual capture. In some embodiments, the system is configured to notify personnel to remove any obstructions. In some embodiments, the system is configured to analyze the virtual capture and implement communications RF path analysis to identify optimal towers for direct line of sight communication to the substation.

Figure 41:
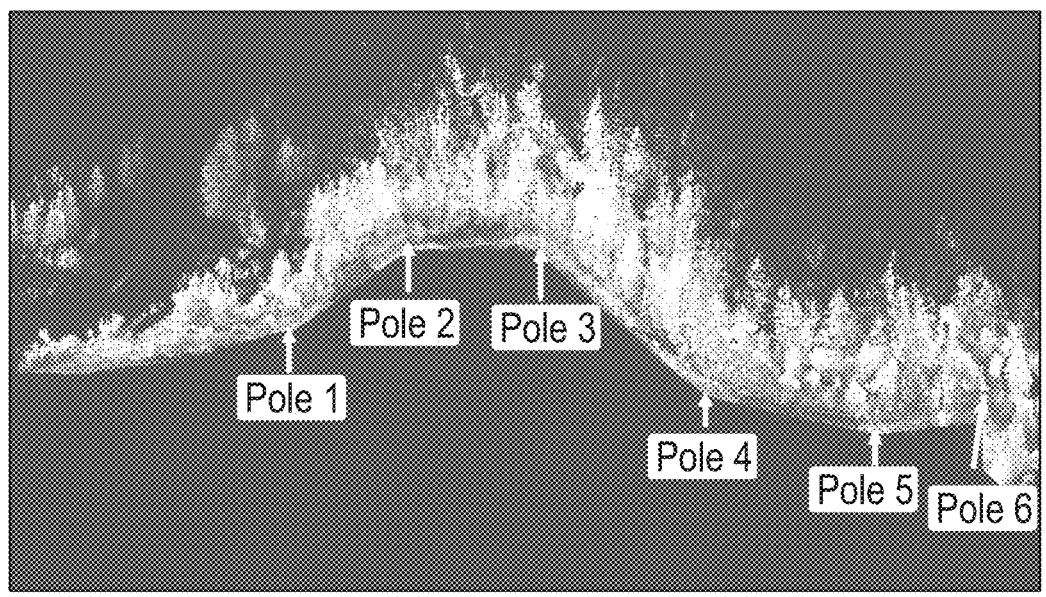
FIG. 41 shows a point cloud implemented in a simulation platform according to some embodiments.

In some embodiments, the system is configured to transform one or more images into point cloud data. In some embodiments, point cloud data includes a set of data points in space. In some embodiments, the points may represent a 3D shape or object within one or more images. In some embodiments, program instruction causes one or more drones to capture a plurality of points on the external surfaces of a utility structure and surrounding vegetation. In some embodiments, instructions execute a measurement between one or more points. In some embodiments, the system is configured to output the one or more points into the simulation platform. In some embodiments, as the output of 3D scanning processes, point clouds are used for many purposes, including to create 3D CAD models for manufactured parts and for a multitude of visualization, animation, rendering, and mass customization applications. FIG. 41 shows a point cloud implemented in a simulation platform according to some embodiments.

In some embodiments, the system is configured to execute a pre-alignment of LiDAR units to maximize coverage area and/or maximize coverage overlap, such that the edge of one monitoring field overlaps with the edge of another monitoring field. Once this is done, the LiDAR units can be aligned physically to correspond with the virtual rendering, saving significant days of construction time and rework/adjustments and improving safety by limiting time exposed to hazards in the field. In some embodiments, the system is configured analyze and display optimal sensor placement to identify and maximize coverage areas. In some embodiments, the system is configured to generate surrounding topography data and spatial information based on one or more captured images. In some embodiments, the system is configured to generate precise dimensions of tower geometry from one or more captured images, which helps with reverse engineering in the event where historical PG&E drawings may not be readily available or are out-of-date or incorrect.

Figure 42:
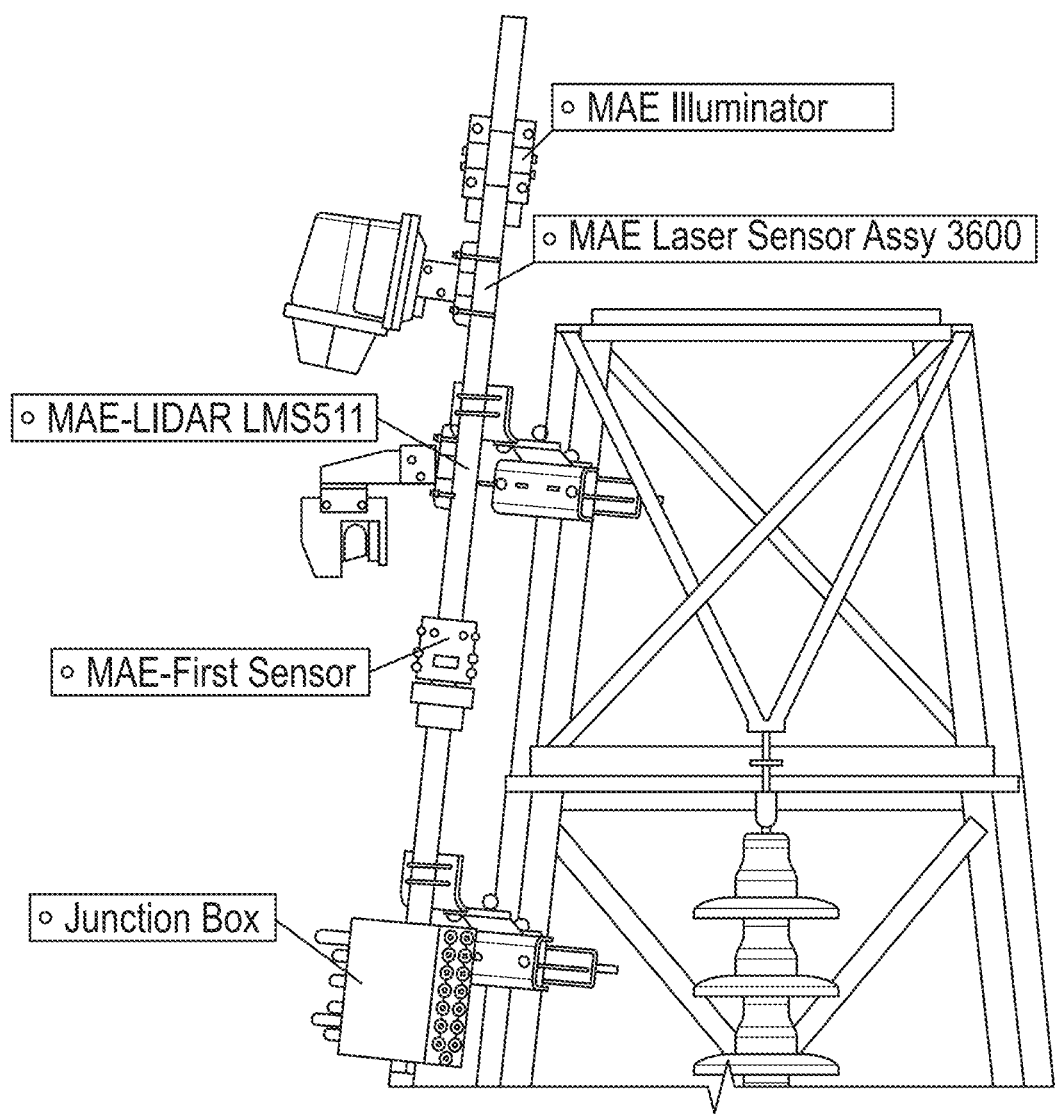
FIG. 42 depicts a non-limiting example of system components including articulated brackets arranged in a simulation platform on a 3D model utility structure generated from one or more captured images according to some embodiments.

In some embodiments, the system uses virtual imaging and software applications extensively. In some embodiments, 3D imaging allows for simulation of sensor placement and articulation, and field of view analysis for any potential interferences. In some embodiments, these models provide invaluable insight in that not all towers or poles are identical: they all vary in height, dimensions, and geometry. FIG. 42 depicts a non-limiting example of system components including articulated brackets arranged in a simulation platform on a 3D model utility structure generated from one or more captured images according to some embodiments.

Figure 43:
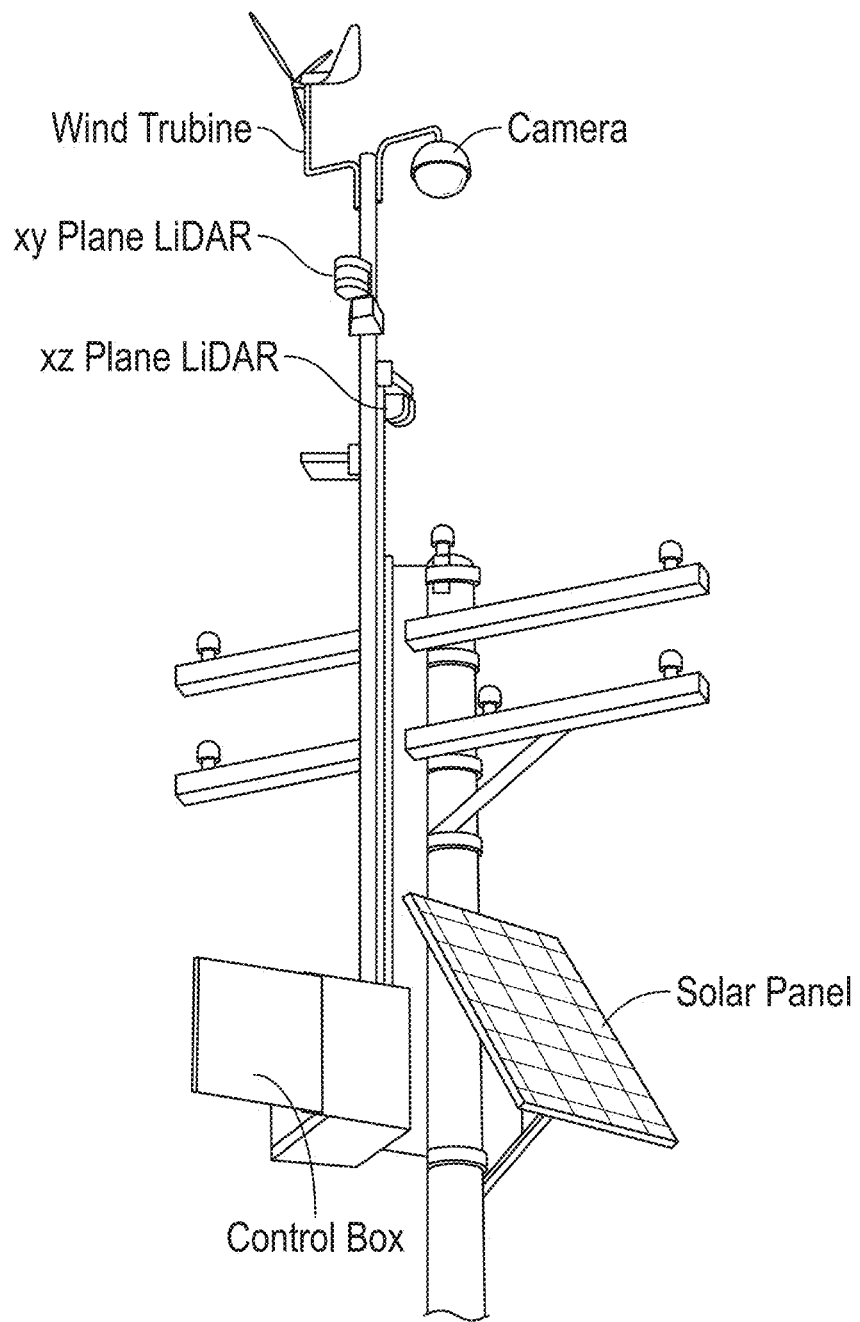
FIG. 43 shows the system with solar and/or wind power supplies for one or more sensors and/or controllers according to some embodiments.
Figure 44:
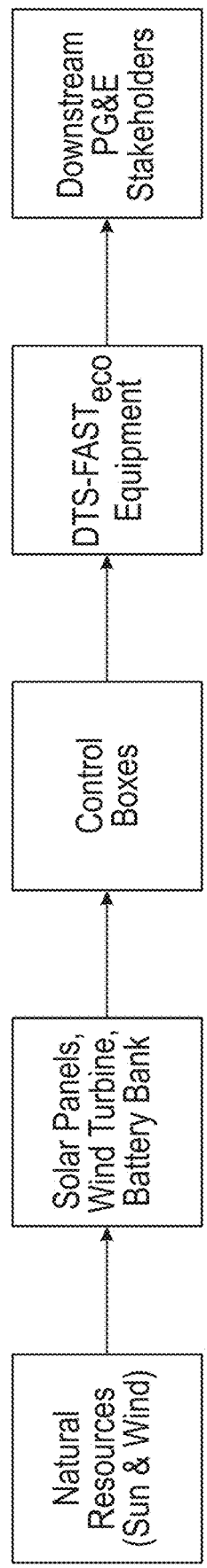
FIG. 44 shows a system power supply flow diagram according to some embodiments.
Figure 45:
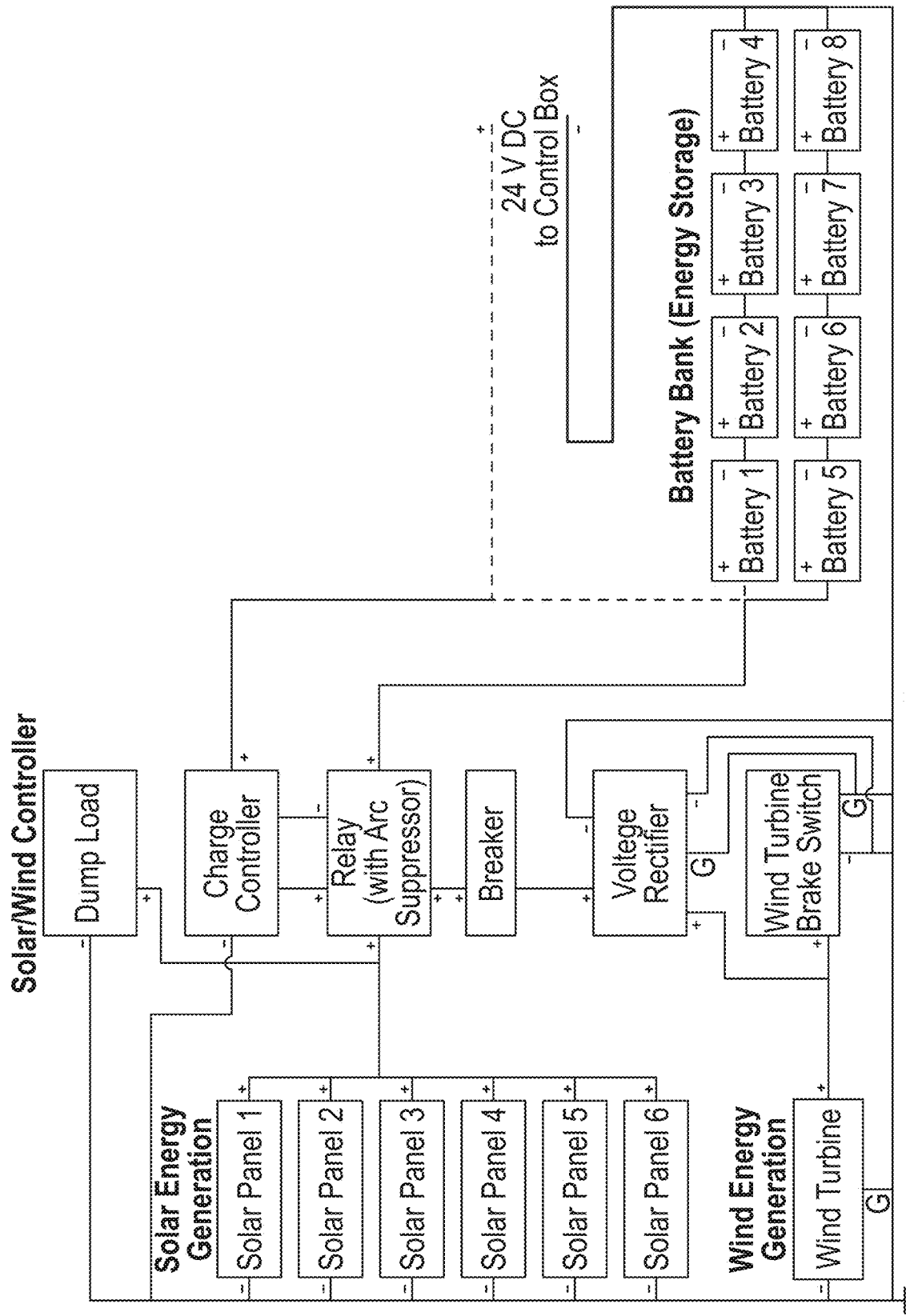
FIG. 45 shows a system power supply circuit flow diagram according to some embodiments.

In some embodiments, the system is configured to be implemented on structures without an available power source. FIG. 43 shows the system with solar and/or wind power supplies for one or more sensors and/or controllers according to some embodiments. FIG. 44 shows a system power supply flow diagram according to some embodiments. FIG. 45 shows a system power supply circuit flow diagram according to some embodiments.

Figure 46:
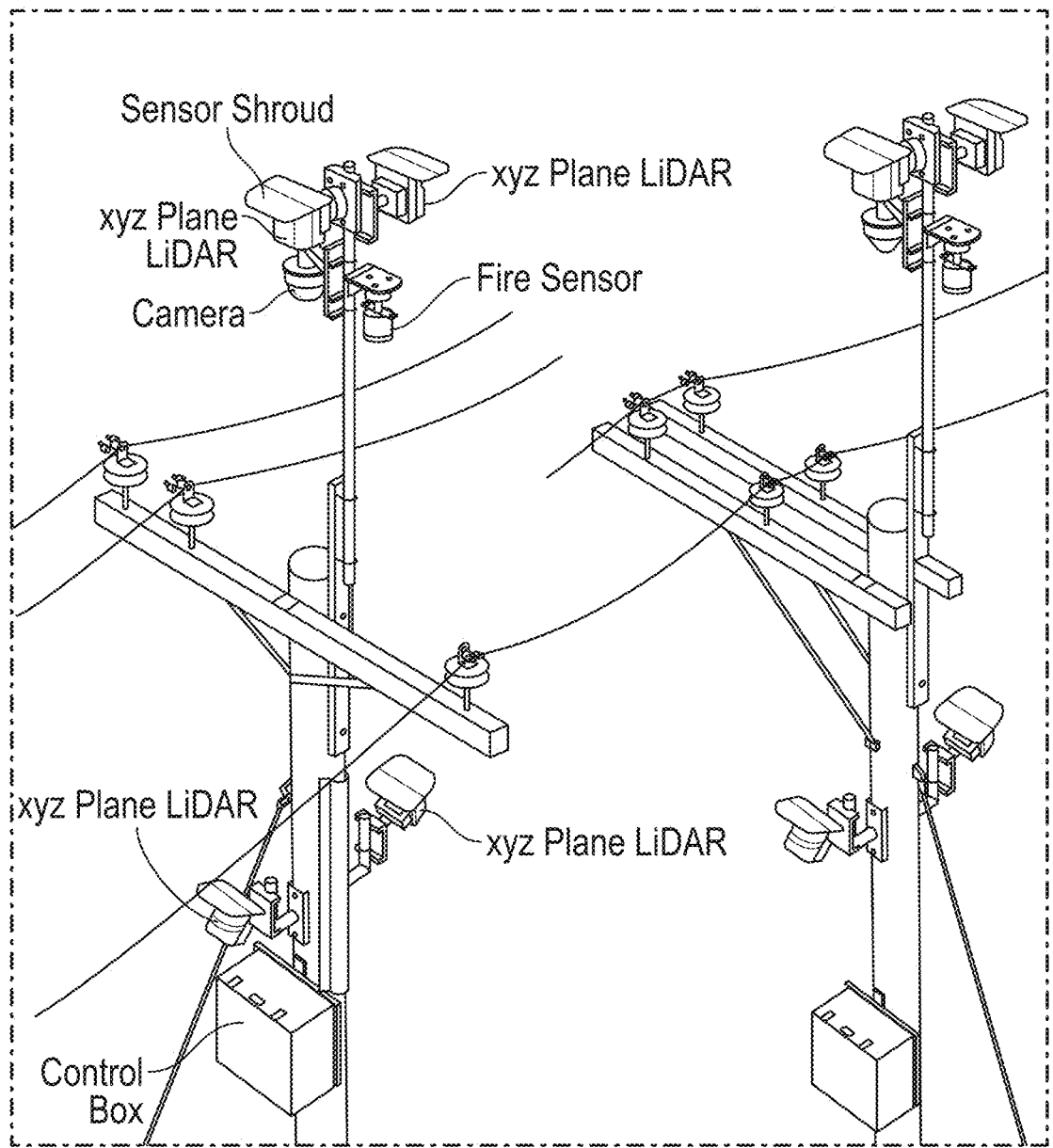
FIG. 46 shows a non-limiting example system implementation between two poles according to some embodiments.

In some embodiments, the system includes one or more top mounting structures (i.e., mounting poles) configured to couple to a power line pole and/or transmission tower. In some embodiments, the one or more top mounting structures are configured to enable sensor monitoring from above one or more power line structures (e.g., poles, transmission towers). In some embodiments, monitoring above a conductor line increases climbing space on the power line structure. In some embodiments, removing the bottom half of sensor conduit and placing it on the top half of a pole fixes the climbing space issue. FIG. 46 shows a non-limiting example system implementation between two poles according to some embodiments.

Figure 47:
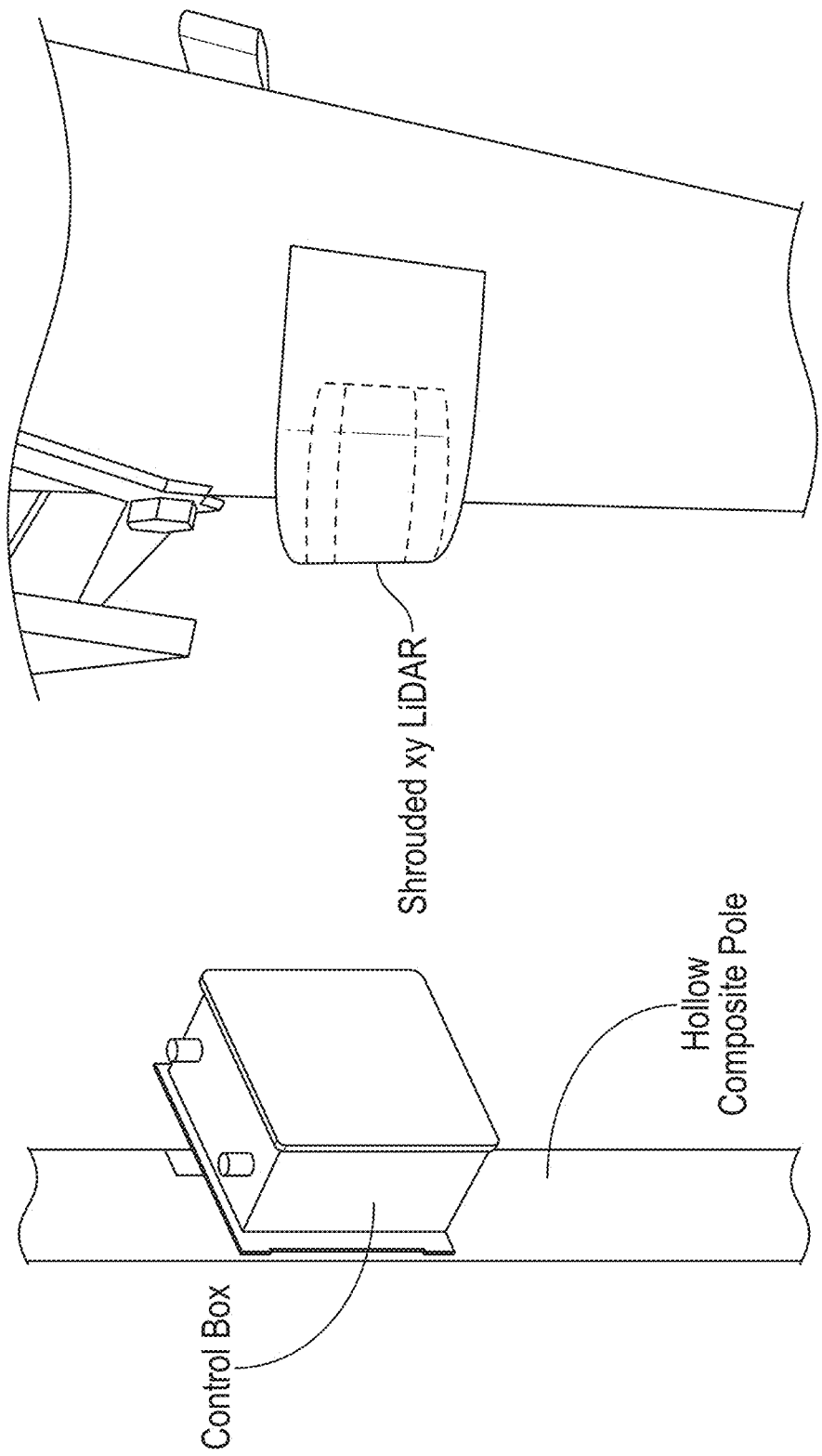
FIG. 47 illustrates a control box and a shrouded sensor mounted to a composite pole enabling internal wiring according to some embodiments.

In some embodiments, the system includes a (composite) pole that is at least partially hollow. In some embodiments, the system includes cables routed internally in a pole. In some embodiments, the system is configured not to obstruct climbing space as all cables will be run internally of the (composite) pole. FIG. 47 illustrates a control box and a shrouded sensor mounted to a composite pole enabling internal wiring according to some embodiments.

Figure 48:
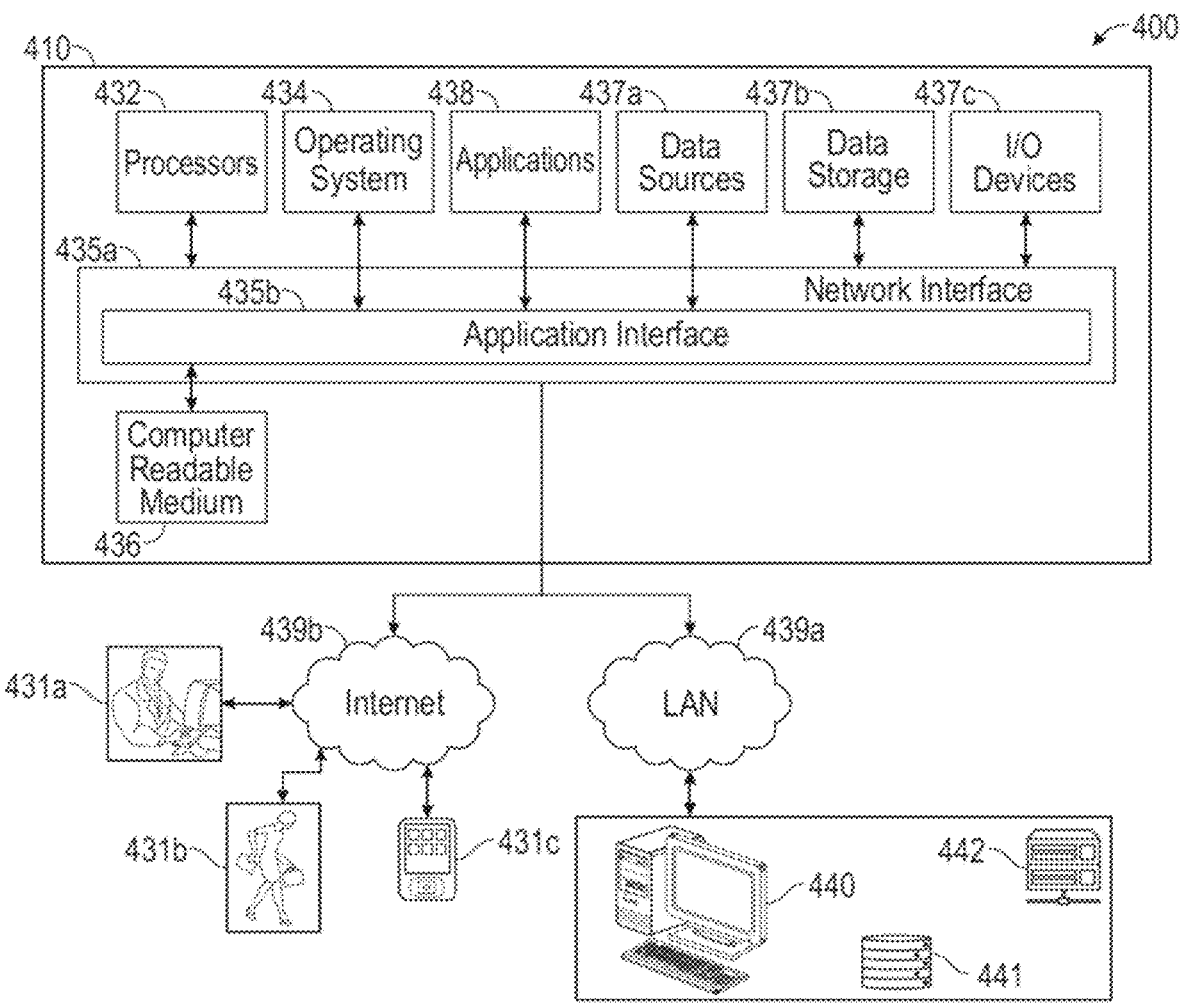
FIG. 48 illustrates a computer system 410 enabling or comprising the systems and methods in accordance with some embodiments of the system.

FIG. 48 illustrates a computer system 410 enabling or comprising the systems and methods in accordance with some embodiments of the system. In some embodiments, the computer system 410 can operate and/or process computer-executable code of one or more software modules of the aforementioned system and method. Further, in some embodiments, the computer system 410 can operate and/or display information within one or more graphical user interfaces (e.g., HMIs) integrated with or coupled to the system.

In some embodiments, the computer system 410 can comprise at least one processor 434. In some embodiments, the at least one processor 434 can reside in, or coupled to, one or more conventional server platforms (not shown). In some embodiments, the computer system 410 can include a network interface 435a and an application interface 435b coupled to the least one processor 434 capable of processing at least one operating system 434. Further, in some embodiments, the interfaces 435a, 435b coupled to at least one processor 434 can be configured to process one or more of the software modules (e.g., such as enterprise applications 438). In some embodiments, the software application modules 438 can include server-based software and can operate to host at least one user account and/or at least one client account, and operate to transfer data between one or more of these accounts using the at least one processor 434.

With the above embodiments in mind, it is understood that the system can employ various computer-implemented operations involving data stored in computer systems. Moreover, the above-described databases and models described throughout this disclosure can store analytical models and other data on computer-readable storage media within the computer system 410 and on computer-readable storage media coupled to the computer system 410 according to various embodiments. In addition, in some embodiments, the above-described applications of the system can be stored on computer-readable storage media within the computer system 410 and on computer-readable storage media coupled to the computer system 410. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 410 can comprise at least one computer readable medium 436 coupled to at least one of at least one data source 437a, at least one data storage 437b, and/or at least one input/output 437c. In some embodiments, the computer system 410 can be embodied as computer readable code on a computer readable medium 436. In some embodiments, the computer readable medium 436 can be any data storage that can store data, which can thereafter be read by a computer (such as computer 440). In some embodiments, the computer readable medium 436 can be any physical or material medium that can be used to tangibly store the desired information or data or instructions and which can be accessed by a computer 440 or processor 434. In some embodiments, the computer readable medium 436 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 436 can transmit or carry instructions to a remote computer 440 and/or at least one user 431, including a router, private or public network, or other transmission or channel, both wired and wireless. In some embodiments, the software application modules 438 can be configured to send and receive data from a database (e.g., from a computer readable medium 436 including data sources 437a and data storage 437b that can comprise a database), and data can be received by the software application modules 438 from at least one other source. In some embodiments, at least one of the software application modules 438 can be configured within the computer system 410 to output data to at least one user 431 via at least one graphical user interface rendered on at least one digital display.

In some embodiments, the computer readable medium 436 can be distributed over a conventional computer network via the network interface 435a where the system embodied by the computer readable code can be stored and executed in a distributed fashion. For example, in some embodiments, one or more components of the computer system 410 can be coupled to send and/or receive data through a local area network ("LAN") 439a and/or an internet coupled network 439b (e.g., such as a wireless internet). In some embodiments, the networks 439a, 439b can include wide area networks ("WAN"), direct connections (e.g., through a universal serial bus port), or other forms of computer-readable media 436, or any combination thereof.

In some embodiments, components of the networks 439a, 439b can include any number of personal computers 440 which include for example desktop computers, and/or laptop computers, or any fixed, generally non-mobile internet appliances coupled through the LAN 439a. For example, some embodiments include one or more of personal computers 440, databases 441, and/or servers 444 coupled through the LAN 439a that can be configured for any type of user including an administrator. Some embodiments can include one or more personal computers 440 coupled through network 439b. In some embodiments, one or more components of the computer system 410 can be coupled to send or receive data through an internet network (e.g., such as network 439b). For example, some embodiments include at least one user 431a, 431b, is coupled wirelessly and accessing one or more software modules of the system including at least one enterprise application 438 via an input and output ("I/O") 437c. In some embodiments, the computer system 410 can enable at least one user 431a, 431b, to be coupled to access enterprise applications 438 via an I/O 437c through LAN 439a. In some embodiments, the user 431 can comprise a user 431a coupled to the computer system 410 using a desktop computer, and/or laptop computers, or any fixed, generally non-mobile internet appliances coupled through the internet 439b. In some embodiments, the user can comprise a mobile user 431b coupled to the computer system 410. In some embodiments, the user 431b can connect using any mobile computing 431c to wireless coupled to the computer system 410, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of environmental protection by improving hazardous condition monitoring of remote utility structures. The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the additional meaning to the following terms:

"Substantially" and "approximately" when used in conjunction with a value encompass a difference of 5% or less of the same unit and/or scale of that being measured. In some embodiments, "substantially" and "approximately" are defined as presented in the specification in accordance with some embodiments.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

The use of and/or, in terms of "A and/or B," means one option could be "A and B" and another option could be "A or B." Such an interpretation is consistent with the USPTO Patent Trial and Appeals Board ruling in ex parte Gross, where the Board established that "and/or" means element A alone, element B alone, or elements A and B together.

As used herein, some embodiments recited with term "can" or "may" or derivations there of (e.g., the system display can show X) is for descriptive purposes only and is understood to be synonymous with "configured to" (e.g., the system display is configured to show X) for defining the metes and bounds of the system.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless a explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for monitoring electrical utility structures comprising:
    one or more sensors,
    one or more utility structures,
    one or more conductors, and
    one or more communication networks;
    wherein the one or more conductors are configured to transmit electrical energy greater than 1000 volts;
    wherein the one or more utility structures are coupled to at least a portion of the one or more conductors;
    wherein the one or more sensors are coupled to the one or more utility structures;
    wherein the one or more sensors are configured to monitor a proximate area to the one or more utility structures;
    wherein the one or more sensors are configured to generate one or more hazard signals when a hazard is detected in the proximate area;
    wherein the one or more utility structures include a first utility structure and a second utility structure;
    wherein the one or more hazard signals include a first structure hazard signal and a second structure hazard signal;
    wherein the first utility structure is configured to generate the first structure hazard signal;
    wherein the second utility structure is configured to generate the second structure hazard signal;
    wherein the system is configured to send the second structure hazard signal from the second utility structure to the first utility structure via the one or more communication networks;
    wherein the one or more communication networks include a first communication network and a second communication network;
    wherein the first utility structure comprises the first communication network;
    wherein the second utility structure comprises the second communication network; and
    wherein the system is configured to send the second structure hazard signal from the second communication network to the first communication network.

2. The system of claim 1,
    wherein the one or more utility structures comprise a third utility structure;
    wherein the one or more communication networks include a third communication network;
    wherein the third utility structure comprises the third communication network;
    wherein the third utility structure is configured to generate a third structure hazard signal; and
    wherein the system is configured to send the third structure hazard signal to the first communication network.

3. The system of claim 1,
    further comprising:
        a supervisory control and data acquisition system (SCADA);
        a SCADA communication network;
    wherein the first communication network is configured to transmit the second structure hazard signal to the SCADA communication network; and
    wherein the SCADA communication network is configured to send a second structure response signal to deenergize the one or more conductors to the first communication network;
    wherein the first communication network is configured to receive the second structure response signal from the SCADA communication network; and
    wherein the first communication network is configured to transmit the received second structure response signal to the second communication network.

4. The system of claim 3,
    wherein the second communication network is configured to receive the second structure response signal from the first communication network; and
    wherein the second utility structure is configured to deenergize the one or more conductors in response to the second structure response signal.

5. The system of claim 2,
    wherein the third communication network is configured to send the third structure hazard signal to the second communication network;
    wherein the third communication network is not configured to send the third structure hazard signal to the first communication network; and
    wherein the second communication network is configured to relay the third structure hazard signal to the first communication network.

6. The system of claim 5,
    further comprising:
        a supervisory control and data acquisition system (SCADA);
        a SCADA communication network;
    wherein the first communication network is configured to transmit the third structure hazard signal to the SCADA communication network; and
    wherein the SCADA communication network is configured to send a third structure response signal to deenergize the one or more conductors to the first communication network;
    wherein the first communication network is configured to relay the third structure response signal to the second communication network; and
    wherein the second communication network is configured to relay the third structure response signal to the third communication network.

7. The system of claim 6,
    wherein the third utility structure is configured to deenergize the one or more conductors in response to the third structure response signal.

8. A system for monitoring electrical utility structures comprising:
    one or more sensors,
    one or more utility structures,
    one or more conductors, and
    one or more controllers;
    wherein the one or more conductors are configured to transmit electrical energy greater than 1000 volts;
    wherein the one or more utility structures are coupled to at least a portion of the one or more conductors;
    wherein the one or more sensors are coupled to the one or more utility structures;
    wherein the one or more sensors are configured to monitor a proximate area to the one or more utility structures;
    wherein the one or more sensors are configured to generate one or more hazard signals when a hazard is detected in the proximate area; and
    wherein the one or more controllers are configured to automatically deenergize the one or more utility structures in response to the one or more hazard signals.

9. The system of claim 8,
    wherein the one or more controllers are coupled to the one or more utility structures.

10. The system of claim 8,
wherein the one or more utility structures are a plurality of utility structures;
wherein each of the plurality of utility structures include a controller; and
wherein each controller is configured to automatically deenergize a respective one of the plurality of utility structures in response to the one or more hazard signals.

11. A system for monitoring electrical utility structures comprising:
one or more sensors,
one or more utility structures, and
one or more conductors;
wherein the one or more conductors are configured to transmit electrical energy greater than 1000 volts;
wherein the one or more utility structures are coupled to at least a portion of the one or more conductors;
wherein the one or more sensors are coupled to the one or more utility structures;
wherein the one or more sensors are configured to monitor a proximate area to the one or more utility structures;
wherein the one or more sensors are configured to generate one or more hazard signals when a hazard is detected in the proximate area; and
wherein the one or more sensors include one or more LiDAR sensors configured to detect an object passing through a spacial plane.

12. The system of claim 11,
wherein the one or more sensors include one or more cameras configured to transmit photographic images.

13. The system of claim 12,
wherein the one or more sensors include one or more fire detectors configured to identify if an area is above a predetermined temperature.

14. The system of claim 13,
further comprising one or more tilt sensors configured determine if the one or more utility structures have moved beyond a predetermined angle and/or have been exposed beyond a predetermined force.

15. The system of claim 14,
wherein the one or more utility structures includes a first utility structure;
wherein the first utility structure includes a first communication network;
wherein the first communication network comprises a cellular network and a radio network; and
wherein the cellular network is configured to send and/or receive signals at a higher electromagnetic frequency than the radio network.

16. The system of claim 15,
wherein the cellular network is configured to send images from the one or more cameras;
wherein the radio network is not configured to send images from the one or more cameras; and
wherein the first communication network is configured to be accessed remotely via the cellular network even upon loss of the radio network.

17. A system for monitoring electrical utility structures comprising:
one or more sensors,
one or more utility structures, and
one or more conductors;
wherein the one or more conductors are configured to transmit electrical energy greater than 1000 volts;
wherein the one or more utility structures are coupled to at least a portion of the one or more conductors;
wherein the one or more sensors are coupled to the one or more utility structures;
wherein the one or more sensors are configured to monitor a proximate area to the one or more utility structures;
wherein the one or more sensors are configured to generate one or more hazard signals when a hazard is detected in the proximate area; and
wherein the one or more utility structures includes a first utility structure;
wherein the first utility structure includes a first communication network;
wherein the first communication network comprises a cellular network and a radio network; and
wherein the cellular network is configured to send and/or receive signals at a higher electromagnetic frequency than the radio network.

\* \* \* \* \*